(12) United States Patent
Fleming et al.

(10) Patent No.: US 12,189,452 B2
(45) Date of Patent: Jan. 7, 2025

(54) METHODS AND APPARATUS TO IMPROVE USER EXPERIENCE ON COMPUTING DEVICES

(71) Applicant: Intel Corporation, Santa Clara, CA (US)

(72) Inventors: Kristoffer Fleming, Chandler, AZ (US); Melanie Daniels, Folsom, CA (US); Paul Diefenbaugh, Portland, OR (US); Aleksander Magi, Portland, OR (US); Lawrence Falkenstein, Hillsboro, OR (US); Raoul Rivas Toledano, Beaverton, OR (US); Vishal Sinha, Portland, OR (US); Deepak Samuel Kirubakaran, Hillsboro, OR (US); Venkateshan Udhayan, Portland, OR (US); Marko Bartscherer, Chula Vista, CA (US); Kathy Bui, Hillsboro, OR (US)

(73) Assignee: Intel Corporation

( * ) Notice: Subject to any disclaimer, the term of this patent is extended or adjusted under 35 U.S.C. 154(b) by 415 days.

(21) Appl. No.: 17/129,465

(22) Filed: Dec. 21, 2020

(65) Prior Publication Data

US 2021/0109585 A1  Apr. 15, 2021

(51) Int. Cl.
*G06F 1/3231* (2019.01)
*G06F 1/3234* (2019.01)
(Continued)

(52) U.S. Cl.
CPC .......... *G06F 1/3231* (2013.01); *G06F 1/3234* (2013.01); *G06N 20/00* (2019.01);
(Continued)

(58) Field of Classification Search
CPC ..... G06F 1/3231; G06F 1/3234; G06N 20/00; G06V 40/10; G10L 15/1815; G10L 15/22;
(Continued)

(56) References Cited

U.S. PATENT DOCUMENTS

| 3,581,974 A | 6/1971 | Freeman |
| D324,036 S | 2/1992 | Wakasa |

(Continued)

FOREIGN PATENT DOCUMENTS

| CN | 102197349 | 9/2011 |
| CN | 102231255 A | 11/2011 |

(Continued)

OTHER PUBLICATIONS

Chin, "Alexa on Windows 10 Hands-On: Useful, with 1 Big Catch", Laptop Magazine, Nov. 14, 2018, available at https://www.laptopmag.com/articles/alexa-windows-10-hands-on (retrieved May 6, 2019), 6 pages.

(Continued)

*Primary Examiner* — Zhipeng Wang
(74) *Attorney, Agent, or Firm* — Hanley, Flight & Zimmerman, LLC

(57) ABSTRACT

Methods and apparatus to improve user experience on computing devices are disclosed. An example computing device includes an image sensor. The example computing device further includes wireless communication circuitry. The example computing device also includes an operations controller to cause the wireless communication circuitry to switch between different operation modes based on an analysis of image data generated by the image sensor. Different ones of the operation modes to consume different amounts of power.

25 Claims, 12 Drawing Sheets

(51) Int. Cl.

| | | |
|---|---|---|
| *G06N 20/00* | (2019.01) | |
| *G06V 40/10* | (2022.01) | |
| *G10L 15/18* | (2013.01) | |
| *G10L 15/22* | (2006.01) | |
| *G10L 15/30* | (2013.01) | |
| *H04N 23/65* | (2023.01) | |
| *H04W 52/02* | (2009.01) | |
| *G10L 15/08* | (2006.01) | |

(52) U.S. Cl.
CPC .......... *G06V 40/10* (2022.01); *G10L 15/1815* (2013.01); *G10L 15/22* (2013.01); *G10L 15/30* (2013.01); *H04N 23/65* (2023.01); *H04W 52/0254* (2013.01); *G10L 2015/088* (2013.01)

(58) Field of Classification Search
CPC .............. G10L 15/30; G10L 2015/088; H04N 5/23241; H04W 52/0254
See application file for complete search history.

(56) References Cited

U.S. PATENT DOCUMENTS

| | | | |
|---|---|---|---|
| 5,173,940 | A | 12/1992 | Lantz et al. |
| D359,275 | S | 6/1995 | Yamazaki |
| D376,791 | S | 12/1996 | Schreiner |
| D388,774 | S | 1/1998 | Giuntoli |
| D389,129 | S | 1/1998 | Guintoli |
| 5,835,083 | A | 11/1998 | Nielsen |
| D433,024 | S | 10/2000 | Oross |
| D434,773 | S | 12/2000 | Suzuki |
| D444,462 | S | 7/2001 | Tsuji |
| D449,307 | S | 10/2001 | Amano et al. |
| D453,508 | S | 2/2002 | Shibata |
| D454,126 | S | 3/2002 | Bliven et al. |
| D462,967 | S | 9/2002 | Suzuki |
| 6,591,198 | B1 | 7/2003 | Pratt |
| D478,089 | S | 8/2003 | Yokota |
| D480,089 | S | 9/2003 | Skinner et al. |
| 6,657,647 | B1 | 12/2003 | Bright |
| 6,760,649 | B2 | 7/2004 | Cohen |
| D494,161 | S | 8/2004 | Sawaquchi |
| D495,692 | S | 9/2004 | Whitehorn et al. |
| D504,129 | S | 4/2005 | Loew et al. |
| D517,542 | S | 3/2006 | Lee et al. |
| D518,042 | S | 3/2006 | Kanayama |
| D534,531 | S | 1/2007 | Ogasawara |
| 7,386,799 | B1 | 6/2008 | Clanton et al. |
| D577,013 | S | 9/2008 | Harris et al. |
| D591,737 | S | 5/2009 | Morooka et al. |
| 7,559,034 | B1 | 7/2009 | Paperny et al. |
| D607,449 | S | 1/2010 | Morisawa |
| D608,380 | S | 1/2010 | Nagase et al. |
| D611,043 | S | 3/2010 | Andre et al. |
| D611,045 | S | 3/2010 | Andre et al. |
| D612,830 | S | 3/2010 | Kim et al. |
| D614,180 | S | 4/2010 | Gou |
| D616,433 | S | 5/2010 | Morishita et al. |
| 7,725,547 | B2 | 5/2010 | Albertson et al. |
| D616,882 | S | 6/2010 | Denhez et al. |
| D617,789 | S | 6/2010 | Akana et al. |
| D631,039 | S | 1/2011 | Sakai et al. |
| 7,971,156 | B2 | 6/2011 | Albertson et al. |
| 7,974,743 | B2 | 7/2011 | Nakashima |
| D645,857 | S | 9/2011 | Cho et al. |
| 8,139,032 | B2 | 3/2012 | Su et al. |
| D659,134 | S | 5/2012 | Ahn et al. |
| D664,532 | S | 7/2012 | Lee |
| D672,765 | S | 12/2012 | Masui et al. |
| D673,558 | S | 1/2013 | Cruz et al. |
| D674,382 | S | 1/2013 | Andre et al. |
| D684,570 | S | 6/2013 | Akana et al. |
| D687,831 | S | 8/2013 | Kim |
| 8,566,696 | B1 | 10/2013 | Hamon et al. |
| D692,875 | S | 11/2013 | Lawrence |
| 8,581,974 | B2 | 11/2013 | Lin et al. |
| D698,348 | S | 1/2014 | Ilchan et al. |
| D704,185 | S | 5/2014 | Bowers et al. |
| 8,717,318 | B2 | 5/2014 | Anderson et al. |
| D706,767 | S | 6/2014 | Kawai et al. |
| D706,768 | S | 6/2014 | Kawai |
| D706,769 | S | 6/2014 | Kawai et al. |
| D706,772 | S | 6/2014 | Koyama et al. |
| D708,178 | S | 7/2014 | Honda et al. |
| D708,179 | S | 7/2014 | Andre et al. |
| D709,491 | S | 7/2014 | Kurimoto et al. |
| 8,812,831 | B2 | 8/2014 | Cheng et al. |
| D712,971 | S | 9/2014 | Huang |
| D715,793 | S | 10/2014 | Tsao et al. |
| D716,795 | S | 11/2014 | Huang et al. |
| D717,593 | S | 11/2014 | Bond |
| D718,818 | S | 12/2014 | Sumii et al. |
| D720,712 | S | 1/2015 | Park et al. |
| 8,954,884 | B1 | 2/2015 | Barger |
| D724,576 | S | 3/2015 | Wolff et al. |
| 8,994,847 | B2 | 3/2015 | Chen et al. |
| D727,314 | S | 4/2015 | Fukuoka |
| D729,227 | S | 5/2015 | Fukuoka |
| D729,228 | S | 5/2015 | Kawai |
| D729,229 | S | 5/2015 | Kurimoto et al. |
| D729,791 | S | 5/2015 | Adamson et al. |
| D729,792 | S | 5/2015 | Kurimoto et al. |
| D731,475 | S | 6/2015 | Mehandjiysky et al. |
| D739,398 | S | 9/2015 | Adamson et al. |
| D739,399 | S | 9/2015 | Adamson et al. |
| D739,400 | S | 9/2015 | Adamson et al. |
| D740,278 | S | 10/2015 | Bowers et al. |
| D741,318 | S | 10/2015 | Oakley |
| 9,183,845 | B1 | 11/2015 | Gopalakrishnan |
| D746,809 | S | 1/2016 | Takada et al. |
| 9,268,434 | B2 | 2/2016 | Sultenfuss et al. |
| D751,062 | S | 3/2016 | Chang |
| 9,310,559 | B2 | 4/2016 | MacNamara |
| 9,311,909 | B2 | 4/2016 | Giaimo, III et al. |
| 9,436,241 | B2 | 9/2016 | Tang et al. |
| D769,251 | S | 10/2016 | Chen |
| D771,684 | S | 11/2016 | Kim |
| D780,173 | S | 2/2017 | Matsuoka |
| 9,575,559 | B2 | 2/2017 | Andrysco |
| D780,760 | S | 3/2017 | Ironmonger et al. |
| D788,767 | S | 6/2017 | Magi |
| D794,027 | S | 8/2017 | Ironmonger et al. |
| 9,721,383 | B1 | 8/2017 | Horowitz et al. |
| 9,740,290 | B2 | 8/2017 | Rosenberg et al. |
| 9,766,700 | B2 | 9/2017 | Lyons et al. |
| 9,785,234 | B2 | 10/2017 | Horesh |
| D801,945 | S | 11/2017 | Cho et al. |
| D803,946 | S | 11/2017 | Matsuda |
| 9,846,471 | B1 | 12/2017 | Arora |
| D810,069 | S | 2/2018 | Hishiki |
| D810,071 | S | 2/2018 | Hishiki |
| D813,235 | S | 3/2018 | Rosenberg et al. |
| D814,469 | S | 4/2018 | Rundberg |
| D816,083 | S | 4/2018 | Wu |
| 9,936,195 | B2 | 4/2018 | Horesh |
| D820,827 | S | 6/2018 | Seoc et al. |
| 9,996,638 | B1 | 6/2018 | Holz et al. |
| D823,850 | S | 7/2018 | Lim et al. |
| 10,027,662 | B1 | 7/2018 | Mutagi et al. |
| D825,435 | S | 8/2018 | Yu |
| 10,101,817 | B2 | 10/2018 | Hsin et al. |
| 10,234,928 | B2 | 3/2019 | Chen |
| 10,254,178 | B2 | 4/2019 | Carbone et al. |
| 10,262,599 | B2 | 4/2019 | Lang et al. |
| 10,304,209 | B2 | 5/2019 | Alonso |
| 10,415,286 | B1 | 9/2019 | Porcella et al. |
| D867,460 | S | 11/2019 | Yan et al. |
| D873,835 | S | 1/2020 | Chan |
| 10,551,888 | B1 | 2/2020 | North et al. |
| D878,475 | S | 3/2020 | Jetter |
| D879,777 | S | 3/2020 | Cho |
| 10,620,457 | B2 | 4/2020 | Ain-Kedem |
| 10,620,786 | B2 | 4/2020 | Veeramani et al. |
| D886,112 | S | 6/2020 | Yeh et al. |

(56) References Cited

U.S. PATENT DOCUMENTS

| | | |
|---|---|---|
| D891,423 S | 7/2020 | Seoc et al. |
| 10,725,510 B2 | 7/2020 | Ho et al. |
| 10,740,912 B2 | 8/2020 | Ren et al. |
| 10,768,724 B1 | 9/2020 | Han |
| 10,819,920 B1 | 10/2020 | Hamlin et al. |
| 10,884,479 B2 | 1/2021 | Chen |
| D914,010 S | 3/2021 | Yeh et al. |
| D914,021 S | 3/2021 | Magi et al. |
| D916,076 S | 4/2021 | Seoc et al. |
| D916,078 S | 4/2021 | Akana et al. |
| 11,153,472 B2 | 10/2021 | Konicek |
| D934,856 S | 11/2021 | Yeh et al. |
| 11,194,398 B2 | 12/2021 | Bernhart |
| 11,360,528 B2 | 6/2022 | Mishra et al. |
| 11,379,016 B2 | 7/2022 | Cooper et al. |
| 11,543,873 B2 | 1/2023 | Sengupta et al. |
| D982,575 S | 4/2023 | Bae et al. |
| D982,576 S | 4/2023 | Bae et al. |
| 11,733,761 B2 | 8/2023 | Sinha et al. |
| 11,782,488 B2 | 10/2023 | Cooper et al. |
| 11,809,535 B2 | 11/2023 | Magi et al. |
| D1,011,342 S | 1/2024 | Shi et al. |
| 11,966,268 B2 | 4/2024 | Mishra |
| 2002/0089190 A1 | 7/2002 | Wang et al. |
| 2002/0091738 A1 | 7/2002 | Rohrabaugh et al. |
| 2003/0043174 A1 | 3/2003 | Hinckley et al. |
| 2003/0174149 A1 | 9/2003 | Fujisaki et al. |
| 2004/0120113 A1 | 6/2004 | Rapaich |
| 2004/0158739 A1 | 8/2004 | Wakai et al. |
| 2004/0175020 A1 | 9/2004 | Bradski et al. |
| 2004/0252101 A1 | 12/2004 | Wilk |
| 2005/0071698 A1 | 3/2005 | Kangas |
| 2005/0094823 A1 | 5/2005 | Kobori |
| 2006/0146030 A1 | 7/2006 | Kim |
| 2006/0192775 A1 | 8/2006 | Nicholson et al. |
| 2007/0027580 A1 | 2/2007 | Ligtenberg et al. |
| 2007/0228138 A1 | 10/2007 | Huang et al. |
| 2008/0046425 A1 | 2/2008 | Perski |
| 2008/0112571 A1 | 5/2008 | Bradicich et al. |
| 2008/0158144 A1 | 7/2008 | Schobben et al. |
| 2008/0301300 A1 | 12/2008 | Toub |
| 2009/0092261 A1 | 4/2009 | Bard |
| 2009/0092262 A1 | 4/2009 | Costa |
| 2009/0092293 A1 | 4/2009 | Lin |
| 2009/0165125 A1 | 6/2009 | Brown et al. |
| 2010/0039376 A1 | 2/2010 | Wang |
| 2010/0079508 A1* | 4/2010 | Hodge .................. G06F 1/3206 345/697 |
| 2010/0100716 A1 | 4/2010 | Scott |
| 2010/0281432 A1 | 11/2010 | Geisner et al. |
| 2010/0295839 A1 | 11/2010 | Nagaya |
| 2011/0035606 A1 | 2/2011 | Lovicott et al. |
| 2011/0055752 A1 | 3/2011 | Rubinstein et al. |
| 2011/0154266 A1 | 6/2011 | Friend et al. |
| 2011/0175932 A1 | 7/2011 | Yu et al. |
| 2011/0248918 A1 | 10/2011 | Yoo et al. |
| 2011/0251733 A1 | 10/2011 | Atkinson |
| 2011/0252339 A1 | 10/2011 | Lemonik et al. |
| 2011/0273546 A1 | 11/2011 | Lin et al. |
| 2011/0284918 A1 | 11/2011 | Behres |
| 2011/0296163 A1 | 12/2011 | Abernethy et al. |
| 2011/0298702 A1 | 12/2011 | Sakata et al. |
| 2011/0298967 A1 | 12/2011 | Clavin et al. |
| 2011/0302535 A1 | 12/2011 | Clerc |
| 2012/0006342 A1 | 1/2012 | Rose |
| 2012/0032894 A1 | 2/2012 | Parivar et al. |
| 2012/0054670 A1 | 3/2012 | Rainisto |
| 2012/0062470 A1 | 3/2012 | Chang |
| 2012/0123680 A1 | 5/2012 | Wipplinger et al. |
| 2012/0171656 A1 | 7/2012 | Shen |
| 2012/0172085 A1 | 7/2012 | Vuppu et al. |
| 2012/0249429 A1 | 10/2012 | Anderson et al. |
| 2012/0268893 A1 | 10/2012 | Yin |
| 2012/0300061 A1 | 11/2012 | Osman et al. |
| 2012/0319997 A1 | 12/2012 | Majumder |
| 2013/0007096 A1 | 1/2013 | Pahlavan et al. |
| 2013/0007590 A1 | 1/2013 | Rivera et al. |
| 2013/0021265 A1 | 1/2013 | Selim |
| 2013/0021750 A1 | 1/2013 | Senatori |
| 2013/0080807 A1 | 3/2013 | Theocharous et al. |
| 2013/0120460 A1 | 5/2013 | Adams et al. |
| 2013/0158999 A1 | 6/2013 | Maruta et al. |
| 2013/0173946 A1 | 7/2013 | Rotem et al. |
| 2013/0174016 A1 | 7/2013 | Glazer et al. |
| 2013/0185633 A1 | 7/2013 | Bunker et al. |
| 2013/0207895 A1 | 8/2013 | Lee et al. |
| 2013/0212462 A1 | 8/2013 | Athas et al. |
| 2013/0222329 A1 | 8/2013 | Larsby et al. |
| 2013/0283213 A1 | 10/2013 | Guendelman et al. |
| 2013/0289792 A1 | 10/2013 | Cheng et al. |
| 2013/0321265 A1 | 12/2013 | Bychkov et al. |
| 2013/0321271 A1 | 12/2013 | Bychkov et al. |
| 2013/0332760 A1 | 12/2013 | Reece et al. |
| 2013/0337976 A1 | 12/2013 | Yanev |
| 2014/0006830 A1 | 1/2014 | Kamhi et al. |
| 2014/0028548 A1 | 1/2014 | Bychkov et al. |
| 2014/0050360 A1 | 2/2014 | Lin et al. |
| 2014/0085451 A1 | 3/2014 | Kamimura et al. |
| 2014/0089865 A1 | 3/2014 | Gay et al. |
| 2014/0094973 A1 | 4/2014 | Giaimo, III |
| 2014/0129937 A1 | 5/2014 | Jarvinen et al. |
| 2014/0132508 A1* | 5/2014 | Hodge .................. G06F 1/3265 345/156 |
| 2014/0132514 A1 | 5/2014 | Kuzara et al. |
| 2014/0139456 A1 | 5/2014 | Wigdor et al. |
| 2014/0149935 A1 | 5/2014 | Johnson et al. |
| 2014/0177843 A1 | 6/2014 | Kuo |
| 2014/0189579 A1 | 7/2014 | Rimon et al. |
| 2014/0191995 A1 | 7/2014 | Karpin et al. |
| 2014/0201690 A1 | 7/2014 | Holz |
| 2014/0208260 A1 | 7/2014 | Kawahara et al. |
| 2014/0258942 A1 | 9/2014 | Kutliroff et al. |
| 2014/0267021 A1 | 9/2014 | Lee et al. |
| 2014/0267034 A1 | 9/2014 | Krulce |
| 2014/0281918 A1 | 9/2014 | Wei et al. |
| 2014/0313120 A1 | 10/2014 | Kamhi |
| 2014/0344599 A1 | 11/2014 | Branover |
| 2014/0361977 A1 | 12/2014 | Stafford et al. |
| 2014/0372511 A1 | 12/2014 | Kapadia et al. |
| 2014/0379340 A1 | 12/2014 | Timem |
| 2014/0380075 A1 | 12/2014 | Pulapaka et al. |
| 2015/0009238 A1 | 1/2015 | Kudalkar |
| 2015/0015688 A1 | 1/2015 | Yang |
| 2015/0042572 A1* | 2/2015 | Lombardi ............. G06F 3/0488 345/173 |
| 2015/0058649 A1* | 2/2015 | Song .................... G06F 1/3209 713/323 |
| 2015/0100884 A1 | 4/2015 | Ryu et al. |
| 2015/0121193 A1 | 4/2015 | Beveridge et al. |
| 2015/0121287 A1 | 4/2015 | Fermon |
| 2015/0177843 A1 | 6/2015 | Kwon |
| 2015/0185909 A1 | 7/2015 | Gecnuk |
| 2015/0193395 A1 | 7/2015 | Nicolaou et al. |
| 2015/0198991 A1 | 7/2015 | Bircher |
| 2015/0220149 A1 | 8/2015 | Plagemann et al. |
| 2015/0220150 A1 | 8/2015 | Plagemann et al. |
| 2015/0248167 A1 | 9/2015 | Turbell et al. |
| 2015/0264572 A1 | 9/2015 | Turgeman |
| 2015/0360567 A1 | 12/2015 | Sannomiya et al. |
| 2015/0363070 A1 | 12/2015 | Katz |
| 2015/0378443 A1 | 12/2015 | Luo |
| 2015/0378748 A1 | 12/2015 | Cheng |
| 2016/0013745 A1 | 1/2016 | North |
| 2016/0034019 A1 | 2/2016 | Seo et al. |
| 2016/0055825 A1 | 2/2016 | Lee |
| 2016/0062584 A1 | 3/2016 | Cohen et al. |
| 2016/0087981 A1 | 3/2016 | Dorresteijn |
| 2016/0091938 A1 | 3/2016 | Edwards et al. |
| 2016/0109961 A1 | 4/2016 | Parshionikar |
| 2016/0116960 A1 | 4/2016 | Kwak et al. |
| 2016/0132099 A1 | 5/2016 | Grabau et al. |
| 2016/0165544 A1 | 6/2016 | Pefkianakis et al. |
| 2016/0170617 A1 | 6/2016 | Shi et al. |
| 2016/0179767 A1 | 6/2016 | Mavinakuli et al. |

(56) References Cited

U.S. PATENT DOCUMENTS

| | | |
|---|---|---|
| 2016/0180762 A1 | 6/2016 | Bathiche et al. |
| 2016/0187994 A1 | 6/2016 | La et al. |
| 2016/0202750 A1 | 7/2016 | Pulapaka et al. |
| 2016/0212317 A1 | 7/2016 | Alameh et al. |
| 2016/0232701 A1 | 8/2016 | Drozdyuk |
| 2016/0259467 A1 | 9/2016 | Nayyar et al. |
| 2016/0297362 A1 | 10/2016 | Tijerina et al. |
| 2016/0335989 A1 | 11/2016 | Ooi et al. |
| 2016/0370860 A1 | 12/2016 | Bychkov et al. |
| 2017/0010654 A1 | 1/2017 | Chen |
| 2017/0018234 A1 | 1/2017 | Na et al. |
| 2017/0028548 A1 | 2/2017 | Nagano |
| 2017/0034146 A1 | 2/2017 | Sugaya |
| 2017/0039170 A1 | 2/2017 | Tunali et al. |
| 2017/0039480 A1 | 2/2017 | Bitran et al. |
| 2017/0045936 A1 | 2/2017 | Kakapuri |
| 2017/0075479 A1 | 3/2017 | Tsukamoto |
| 2017/0085790 A1 | 3/2017 | Bohn |
| 2017/0090585 A1 | 3/2017 | Bernhart |
| 2017/0147879 A1 | 5/2017 | Alameh et al. |
| 2017/0201254 A1 | 7/2017 | Hanssen et al. |
| 2017/0219240 A1 | 8/2017 | Cassini et al. |
| 2017/0269725 A1 | 9/2017 | Kang |
| 2017/0321856 A1 | 11/2017 | Keates |
| 2018/0029370 A1 | 2/2018 | Fujikawa |
| 2018/0039410 A1 | 2/2018 | Kim et al. |
| 2018/0039990 A1 | 2/2018 | Lindemann |
| 2018/0136719 A1 | 5/2018 | Chen |
| 2018/0157815 A1 | 6/2018 | Salama et al. |
| 2018/0164942 A1 | 6/2018 | Huffman et al. |
| 2018/0166076 A1* | 6/2018 | Higuchi ............. B25J 13/003 |
| 2018/0188774 A1 | 7/2018 | Ent et al. |
| 2018/0188803 A1 | 7/2018 | Sharma et al. |
| 2018/0189547 A1 | 7/2018 | Daniels et al. |
| 2018/0224871 A1 | 8/2018 | Sahu et al. |
| 2018/0321731 A1 | 11/2018 | Alfano et al. |
| 2018/0373292 A1 | 12/2018 | Perelli |
| 2019/0004764 A1 | 1/2019 | Son et al. |
| 2019/0034609 A1 | 1/2019 | Yang et al. |
| 2019/0079572 A1 | 3/2019 | Yamamoto |
| 2019/0129473 A1 | 5/2019 | Hu et al. |
| 2019/0147875 A1 | 5/2019 | Stemmer et al. |
| 2019/0155364 A1 | 5/2019 | Chen |
| 2019/0155368 A1 | 5/2019 | Branover |
| 2019/0174419 A1 | 6/2019 | Schillings et al. |
| 2019/0213309 A1 | 7/2019 | Morestin |
| 2019/0236390 A1 | 8/2019 | Guo et al. |
| 2019/0239384 A1 | 8/2019 | North et al. |
| 2019/0250691 A1 | 8/2019 | Lee et al. |
| 2019/0258785 A1 | 8/2019 | Alameh et al. |
| 2019/0265831 A1 | 8/2019 | Sinnott et al. |
| 2019/0278339 A1 | 9/2019 | Cooper et al. |
| 2019/0342447 A1 | 11/2019 | Ko et al. |
| 2019/0361501 A1 | 11/2019 | Park et al. |
| 2019/0364501 A1 | 11/2019 | Kwon |
| 2019/0371326 A1 | 12/2019 | Bocklet et al. |
| 2019/0371342 A1 | 12/2019 | Tukka et al. |
| 2020/0012331 A1 | 1/2020 | de Cesare et al. |
| 2020/0026342 A1 | 1/2020 | Sengupta et al. |
| 2020/0026896 A1 | 1/2020 | Debates |
| 2020/0033920 A1 | 1/2020 | Nielsen et al. |
| 2020/0092817 A1* | 3/2020 | Bai ................. H04W 52/0264 |
| 2020/0125158 A1 | 4/2020 | Giusti et al. |
| 2020/0125179 A1 | 4/2020 | Okuley |
| 2020/0133358 A1 | 4/2020 | Mishra et al. |
| 2020/0133374 A1 | 4/2020 | Sinha et al. |
| 2020/0134151 A1 | 4/2020 | Magi et al. |
| 2020/0142471 A1 | 5/2020 | Azam et al. |
| 2020/0175944 A1 | 6/2020 | Sun et al. |
| 2020/0213501 A1 | 7/2020 | Sohn |
| 2020/0259638 A1 | 8/2020 | Carmignani et al. |
| 2020/0348745 A1 | 11/2020 | Hamlin et al. |
| 2021/0025976 A1 | 1/2021 | Chandel et al. |
| 2021/0092517 A1 | 3/2021 | Kulkarni |
| 2021/0096237 A1 | 4/2021 | Patole et al. |
| 2021/0240254 A1 | 8/2021 | Hamlin et al. |
| 2021/0314866 A1 | 10/2021 | Lee |
| 2021/0318743 A1 | 10/2021 | Partiwala et al. |
| 2021/0327394 A1 | 10/2021 | Bui et al. |
| 2022/0060572 A1 | 2/2022 | Kwon |
| 2022/0147142 A1 | 5/2022 | Bui et al. |
| 2022/0245229 A1 | 8/2022 | Zhang |
| 2022/0334620 A1 | 10/2022 | Cooper et al. |
| 2022/0350385 A1 | 11/2022 | Mishra et al. |
| 2023/0205307 A1 | 6/2023 | Han et al. |

FOREIGN PATENT DOCUMENTS

| | | | |
|---|---|---|---|
| CN | 107077184 | 8/2017 | |
| CN | 108958447 A | 12/2018 | |
| CN | 112558056 | 3/2021 | |
| CN | 113490904 A | 10/2021 | |
| CN | 118805153 A | 10/2024 | |
| DE | 112019007085 T5 | 1/2022 | |
| EP | 2518586 | 10/2012 | |
| EP | 2830366 A1 * | 1/2015 | ........ H04W 52/0251 |
| EP | 3285133 | 2/2018 | |
| EP | 3285133 B1 | 5/2019 | |
| EP | 3742255 A1 | 11/2020 | |
| EP | 3798797 A1 | 3/2021 | |
| EP | 3819745 A1 | 5/2021 | |
| EP | 3842971 A1 | 6/2021 | |
| EP | 3948492 A1 | 2/2022 | |
| JP | H0651901 A | 2/1994 | |
| JP | 10-240389 A | 9/1998 | |
| JP | 2001255854 A | 9/2001 | |
| JP | 2002071833 A | 3/2002 | |
| JP | 2005221907 A | 8/2005 | |
| JP | 2010060746 A | 3/2010 | |
| JP | 2010271339 A | 12/2010 | |
| JP | 2011137874 A | 7/2011 | |
| JP | 2011258204 A | 12/2011 | |
| JP | 2014067102 A | 4/2014 | |
| JP | 2016517087 A | 6/2016 | |
| JP | 2020039069 A | 3/2020 | |
| JP | 2022534338 A | 7/2022 | |
| KR | 20130093962 A | 8/2013 | |
| KR | 20140138178 A | 12/2014 | |
| KR | 20150022673 | 3/2015 | |
| KR | 20180029370 | 3/2018 | |
| KR | 20190027930 A | 3/2019 | |
| KR | 20210139233 A | 11/2021 | |
| WO | 2010071631 | 6/2010 | |
| WO | 2014086294 A1 | 6/2014 | |
| WO | 2014131188 | 9/2014 | |
| WO | 2014186294 | 11/2014 | |
| WO | 2014205227 | 12/2014 | |
| WO | 20150026203 | 2/2015 | |
| WO | 2017010654 A1 | 1/2017 | |
| WO | 2020191643 | 10/2020 | |
| WO | 2021258395 | 12/2021 | |
| WO | 2022139895 | 6/2022 | |

OTHER PUBLICATIONS

Notebook Review, "CES 2007: Vista SideShow in HP, Fujitsu, LG and Asus Notebooks," Jan. 8, 2007, available at www.notebookreview.com/news/ces-2007-vista-sideshow-in-hp-fujitsu-lg-and-asus-notebooks/ (retrieved May 6, 2019), 8 pages.

Bushan, "CES 2019: Dell's new laptop can sense your presence and wake itself," Hindustan Times, Jan. 5, 2019, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019), 8 pages.

Indiegogo, "Cosmo Communicator", 2018, available at https://www.indiegogo.com/projects/cosmo-communicator#/ (retrieved May 6, 2019), 18 pages.

Purcher, "Google Patents a Motorized Pixelbook Lid that Opens and Closes with a Simple Touch & Auto-Aligns the Display to the user's Face", Patently Mobile, Nov. 25, 2017, available at https://www.

(56) References Cited

OTHER PUBLICATIONS patentlymobile.com/2017/11/google-patents-a-motorized-pixelbook-lid-that-opens-and-closes-with-a-simple-touch-auto-aligns-the-display-to-the-users-fa.html (retrieved May 5, 2019), 6 pages.
NVIDIA, "PDK User's Guide: Preface Personal Media Device," Sep. 4, 2007, 39 pages.
Reads, "Microsoft Windows Vista SideShow—In-Depth (pics)", Notebook Review, Jan. 11, 2006, available at www.notebookreview.com/news/microsoft-windows-vista-sideshow-in-depth-pics/ (retrieved May 6, 2019), 7 pages.
Gajitz, "Open Sesame! Gesture-Controlled Motorized Laptop Lid", Sep. 2012, available at https://gajitz.com/open-sesame-gesture-controlled-motorized-laptop-lid/ (retrieved May 6, 2019), 3 pages.
NVIDIA, "NVIDIA® Preface™ Platform Enables Windows Vista On The Go," Jan. 8, 2007, available at https://www.nvidia.com/object/IO_38775.html (retrieved May 6, 2019), 5 pages.
NVIDIA, "NVIDIA and ASUS Deliver World's First Notebook with Windows Sideshow Secondary Display," Jan. 8, 2007, available at https://www.nvidia.com/object/IO_38772.html (retrieved May 6, 2019), 5 pages.
Pradeep, "Dell's new Latitude 7400 2-in-1 can detect your presence and automatically wake the system," available at https://mspoweruser.com/dells-new-latitude-7400-2-in-1-can-detect-your-presence-and-automatically-wake-the-system/ (retrieved Sep. 18, 2019, 20 pages.
Cutress, "Asus ZenBook Pro 15(UX580): A 5.5-inch Screen in the Touchpad", AnandTech, Jun. 5, 2018, available at https://www.anandtech.com/show/12880/asus-zenbook-pro-15-ux580-a-55inch-screen-in-the-touchpad (retrieved Dec. 18, 2018), 5 pages.
International Searching Authority, "Written Opinion," issued in connection with International Patent Application No. PCT/CN2019/079790, dated Jan. 3, 2020, 4 pages.
International Searching Authority, "Search Report," issued in connection with International Patent Application No. PCT/CN2019/079790, dated Jan. 3, 2020, 4 pages.
European Patent Office, "Extended European Search Report," issued in connection with European Patent Application No. 20164273.3, dated Oct. 9, 2020, 14 pages.
United States Patent and Trademark Office, "Notice of Allowance," issued in connection with U.S. Appl. No. 29/673,785, dated Nov. 16, 2020, 8 pages.
European Patent Office,"Extended Search Report," issued in connection with European Patent Application No. 20181123.9, dated Dec. 4, 2020, 11 pages.
United States Patent and Trademark Office, "Non-Final Office Action" issued in connection with U.S. Appl. No. 14/866,894, issued on Dec. 14, 2018, 24 pages.
United States Patent and Trademark Office, "Final Office Action" issued in connection with U.S. Appl. No. 14/866,894, issued on Jul. 29, 2019, 27 pages.
United States Patent and Trademark Office, "Advisory Action" issued in connection with U.S. Appl. No. 14/866,894, issued on Nov. 5, 2019, 6 pages.
United States Patent and Trademark Office, "Non Final Office Action" issued in connection with U.S. Appl. No. 14/866,894, issued on Feb. 21, 2020, 30 pages.
United States Patent and Trademark Office, "Final Office Action" issued in connection with U.S. Appl. No. 14/866,894, issued on Jun. 23, 2020, 33 pages.
United States Patent and Trademark Office, "Advisory Action" issued in connection with U.S. Appl. No. 14/866,894, issued on Aug. 17, 2020, 9 pages.
United States Patent and Trademark Office, "Non Final Office Action" issued in connection with U.S. Appl. No. 14/866,894, issued on Oct. 8, 2020, 40 pages.
European Patent Office, "Extended European Search Report" issued in connection with EuropeanPatent Application No. 201994494.9, issued on Feb. 17, 2021, 7 pages.
European Patent Office, "Extended European Search Report," issued in connection with European Patent Application No. 20197337.7, dated Mar. 9, 2021, 11 pages.

European Patent Office, "Rule 62a(1) Communication," issued in connection with European Patent Application No. 20197335.1, dated Mar. 17, 2021, 2 pages.
International Searching Authority, "International Search Report," issued in connection with PCT Application No. PCT/US2016/048953, issued on Nov. 23, 2016, 3 pages.
International Searching Authority, "Written Opinion of the International Searching Authority ," issued in connection with PCT Application No. PCT/US2016/048953, issued on Nov. 23, 2016, 9 pages.
United States Patent and Trademark Office, "Final Office Action," issued in connection with U.S. Appl. No. 14/866,894, mailed on May 11, 2021, 17 pages.
United States Patent and Trademark Office, "Non-Final Office Action," issued in connection with U.S. Appl. No. 16/586,225, dated Jun. 15, 2021, 14 pages.
United States Patent and Trademark Office, "Non-Final Office Action," issued in connection with U.S. Appl. No. 16/728,774, dated May 3, 2021, 12 pages.
European Patent Office, "Extended European Search Report," issued in connection with European Patent Application No. 20197335.1, dated Jul. 16, 2021, 11 pages.
International Searching Authority, "International Preliminary Report on Patentability," issued in connection with PCT/US2016/048953, dated Mar. 27, 2018, 10 pages.
International Searching Authority, "Search Report and Written Opinion ," issued in connection with PCT Application No. PCT/CN2020/098326, mailed Mar. 29, 2021, 9 pages.
United States Patent and Trademark Office, "Non Final Office Action," issued in connection with U.S. Appl. No. 29/673,785, dated Aug. 27, 2020, 4 pages.
United States Patent and Trademark Office, "Notice of Allowance and Fee(s) Due," issued in connection with U.S. Appl. No. 14/866,894, mailed on Jul. 30, 2021, 8 pages.
United States Patent and Trademark Office, "Final Office Action," issued in connection with U.S. Appl. No. 16/728,774, mailed on Sep. 22, 2021, 20 pages.
United States Patent and Trademark Office, "Non-Final Office Action," issued in connection with U.S. Appl. No. 16/421,217, mailed on Oct. 27, 2021, 29 pages.
European Patent Office, "Communication pursuant to Article 94(3) EPC," issued in connection with European Patent Application No. 20164273.3, dated Sep. 28, 2021 9 pages.
United States Patent and Trademark Office, "Notice of Allowance," issued in connection with U.S. Appl. No. 16/586,225, dated Dec. 8, 2021, 6 pages.
United States Patent and Trademark Office, "Corrected Notice of Allowability," issued in connection with U.S. Appl. No. 16/586,225, dated Dec. 16, 2021, 3 pages.
International Searching Authority, "International Preliminary Report on Patentability," issued in connection with application No. PCT/CN2019/079790, dated on Sep. 28, 2021, 5 pages.
United States Patent and Trademark Office, "Non-Final Office Action" issued in connection with U.S. Appl. No. 16/728,899, issued on Dec. 8, 2021, 9 pages.
United States Patent and Trademark Office, "Notice of Allowance and Fee(s) Due," issued in connection with U.S. Appl. No. 16/728,774, mailed on Feb. 2, 2022, 9 pages.
International Searching Authority, "Invitation to Pay Additional Fees," issued in connection with PCT/US2021/049649, dated Nov. 26, 2021, 7 pages.
United States Patent and Trademark Office, "Notice of Allowance and Fee(s) Due" issued in connection with U.S. Appl. No. 16/421,217, issued on Mar. 9, 2022, 6 pages.
United States Patent and Trademark Office, "Corrected Notice of Allowability" issued in connection with U.S. Appl. No. 16/586,225, issued on Mar. 16, 2022, 3 pages.
Cravotta, Nicholas, "Optimizing Proximity Sensing for Consumer Electronics Applications," Digi-Key Electronics, Apr. 26, 2012, 9 pages.
Chethan, "Proximity Sensing with CapSense," Cypress AN92239, 2016, 62 pages.

(56) References Cited

OTHER PUBLICATIONS

United States Patent and Trademark Office, "Non-Final Office Action," issued in connection with U.S. Appl. No. 16/725,467, dated Apr. 7, 2022, 19 pages.
United States Patent and Trademark Office, "Notice of Allowance and Fee(s) Due," issued in connection with U.S. Appl. No. 16/586,225, dated Dec. 8, 2021, 6 pages.
United States Patent and Trademark Office, "Corrected Notice of Allowability," issued in connection with U.S. Appl. No. 16/586,225, dated May 18, 2022, 3 pages.
United States Patent and Trademark Office, "Non-Final Office Action," issued in connection with U.S. Appl. No. 17/434,603, dated Jul. 5, 2022, 15 pages.
International Searching Authority, "International Search Report", issued in connection with PCT Application No. PCT/US2021/049649, issued on Jan. 14, 2022, 5 pages.
International Searching Authority, "Written Opinion", issued in connection with PCT Application No. PCT/US2021/049649, issued on Jan. 14, 2022, 9 pages.
United States Patent and Trademark Office, "Final Office Action," issued in connection with U.S. Appl. No. 16/728,899, dated Jun. 24, 2022, 10 pages.
European Patent Office, "Communication pursuant to Article 71(3) EPC," issued in connection with European Patent Application No. 20164273.3, dated Dec. 23, 2022, 78 pages.
United States Patent and Trademark Office, "Final Office Action," issued in connection with U.S. Appl. No. 17/434,603, dated Feb. 8, 2023, 17 pages.
United States Patent and Trademark Office, "Notice of Allowance and Fee(s) Due," issued in connection with U.S. Appl. No. 16/725,467, dated Feb. 23, 2023, 9 pages.
European Patent Office, "Extended European Search Report," issued in connection with European Patent Application No. 19921860.3, dated Oct. 10, 2022, 8 pages.
United States Patent and Trademark Office, "Corrected Notice of Allowability," issued in connection with U.S. Appl. No. 16/586,225, dated Sep. 19, 2022, 2 pages.
United States Patent and Trademark Office, "Final Office Action," issued in connection with U.S. Appl. No. 16/725,467, dated Aug. 18, 2022, 29 pages.
United States Patent and Trademark Office, "Non-Final Office Action" issued in connection with U.S. Appl. No. 16/728,899, issued on Oct. 20, 2022, 9 pages.
United States Patent and Trademark Office, "Notice of Allowance and Fee(s) Due" issued in connection with U.S. Appl. No. 16/421,217, issued on Mar. 24, 2022, 3 pages.
United States Patent and Trademark Office, "Notice of Allowance and Fee(s) Due," issued in connection with U.S. Appl. No. 16/586,225, dated Apr. 29, 2022, 6 pages.
United States Patent and Trademark Office, "Notice of Allowance and Fee(s) Due," issued in connection with U.S. Appl. No. 16/586,225, dated Aug. 31, 2022, 5 pages.
United States Patent and Trademark Office, "Corrected Notice of Allowability," issued in connection with U.S. Appl. No. 16/586,225, dated Dec. 7, 2022, 3 pages.
United States Patent and Trademark Office, "Notice of Allowance and Fee(s) Due," issued in connection with U.S. Appl. No. 17/856,587, dated Dec. 9, 2022, 9 pages.
European Patent Office, "Extended European Search Report," issued in connection with European Patent Application No. 23154752.2, issued on May 4, 2023, 14 pages.
International Searching Authority, "International Search Report," issued in connection with PCT Application No. PCT/CN2022/084726, dated Jan. 4, 2023, 4 pages.
International Searching Authority, "Written Opinion," issued in connection with PCT Application No. PCT/CN2022/084726, dated Jan. 4, 2023, 4 pages.
United States Patent and Trademark Office, "Advisory Action," issued in connection with U.S. Appl. No. 16/725,467, dated Jan. 4, 2023, 4 pages.
European Patent Office, "Communication pursuant to Article 94(3) EPC," issued in connection with European Patent Application No. 20194494.9, dated Jan. 24, 2023, 6 pages.
Intellectual Property India, "Examination Report," issued in connection with Indian Patent Application No. 202147037534, dated Feb. 2, 2023 6 pages.
Japanese Patent Office, "Notice of Reasons for Rejection," issued in connection with Japanese Patent Application No. 2021-538701, dated Feb. 21, 2023, 7 pages (English translation included).
United States Patent and Trademark Office, "Supplemental Notice of Allowability," issued in connection with U.S. Appl. No. 16/725,467, dated Mar. 1, 2023, 3 pages.
United States Patent and Trademark Office, "Notice of Allowance and Fee(s) Due," issued in connection with U.S. Appl. No. 16/728,899, issued on Apr. 3, 2023, 10 pages.
The Netherlands Patent Office, "Office Action," issued in connection with Netherlands Application No. 2029823, issued on Mar. 15, 2023, 14 pages (Written Opinion Provided in English).
Samsung, "Samsung Galaxy Fold Now Available," Samsung Global Newsroom, dated Sep. 5, 2019, retrieved from https://news.samsung.com/global/samsung galaxy-fold-now-available) on Jun. 8, 2023, 7 pages.
GSMArena team, "Samsung Galaxy Fold long-term review," GSMARENA, dated Nov. 9, 2019, retrieved from https://www.gsmarena.com/samsung_galaxy_fold_long_term-review-1996p7.php on Jun. 8, 2023, 8 pages.
GSMArena team, "Samsung Galaxy Fold review," GSMARENA, dated Apr. 26, 2019, retrieved from https://www.gsmarena.com/samsung_galaxy_fold-review-1926p4.php on Jun. 8, 2023, 8 pages.
United States Patent and Trademark Office, "Non-Final Office Action," issued in connection with U.S. Appl. No. 17/732,173, dated May 30, 2023, 28 pages.
United States Patent and Trademark Office, "Notice of Allowance and Fee(s) Due," issued in connection with U.S. Appl. No. 16/725,467, dated Jun. 29, 2023, 6 pages.
International Searching Authority, "International Preliminary Report on Patentability," issued in connection with PCT Application No. PCT/US2021/049649, issued on Jun. 13, 2023, 10 pages.
European Patent Office, "Communication Pursuant to Article 94(3) EPC," issued in connection with European Patent Application No. 20197337.7, issued on Aug. 10, 2023, 10 pages.
United States Patent and Trademark Office, "Notice of Allowance and Fee(s) Due", issued in connection with U.S. Appl. No. 18/160,419, dated Aug. 23, 2023, 11 pages.
United States Patent and Trademark Office, "Non-Final Office Action," issued in connection with U.S. Appl. No. 17/434,603, mailed on Sep. 7, 2023, 17 pages.
European Patent Office, "Communication Pursuant to Article 94(3) EPC," issued in connection with European Patent Application No. 20197335.1, issued on Oct. 5, 2023, 5 pages.
United States Patent and Trademark Office, "Non-Final Office Action," issued in connection with U.S. Appl. No. 29/771,488, mailed on Oct. 11, 2023, 6 pages.
United States Patent and Trademark Office, "Notice of Allowance and Fee(s) Due," issued in connection with U.S. Appl. No. 17/732,173, mailed on Oct. 25, 2023, 8 Pages.
United States Patent and Trademark Office, "Notice of Allowance and Fee(s) Due," issued in connection with U.S. Appl. No. 17/434,603, mailed on Dec. 26, 2023, 9 pages.
United States Patent and Trademark Office, "Corrected Notice of Allowability," issued in connection with U.S. Appl. No. 17/856,587, issued on Sep. 5, 2023, 2 pages.
Sanchez et al., "ZSim: Fast and Accurate Microarchitectural Simulation of Thousand-Core Systems," ACM SIGARCH Computer Architecture News, Jun. 2013, 12 pages.
United States Patent and Trademark Office, "Corrected Notice of Allowability," issued in U.S. Appl. No. 14/866,894, filed Sep. 20, 2021, 3 pages.
United States Patent and Trademark Office, "Corrected Notice of Allowability," issued in U.S. Appl. No. 16/421,217, filed May 27, 2022, 2 pages.

(56) References Cited

OTHER PUBLICATIONS

International Searching Authority, "International Search Report," issued in connection with International Patent Application No. PCT/US2022/022196, dated Jun. 30, 2022, 4 pages.
International Searching Authority, "Written Opinion," issued in connection with International Patent Application No. PCT/US2022/022196, dated Jun. 30, 2022, 4 pages.
European Patent Office, "Communication under Rule 71(3) EPC," in connection with European Patent Application No. 20164273.3, issued on Jul. 29, 2022, 5 pages.
International Bureau, "International Preliminary Report on Patentability," issued in connection with PCT No. PCT/CN2020/098326, Dec. 13, 2022, 5 pages.
United States Patent and Trademark Office, "Corrected Notice of Allowability," issued in connection with U.S. Appl. No. 17/856,587, dated Jan. 10, 2023, 2 pages.
United States Patent and Trademark Office, "Corrected Notice of Allowability," issued in connection with U.S. Appl. No. 17/856,587, dated Feb. 14, 2023, 2 pages.
Japanese Patent Office, "Search Report," issued in connection with Japanese Patent Application No. 2021-538701, dated Feb. 15, 2023, 58 Pages. [English Translation Included].
United States Patent and Trademark Office, "Notice of Allowance" issued in U.S. Appl. No. 16/725,467, filed Apr. 26, 2023, 3 pages.
Japanese Patent Office, "Written Opinion," issued in connection with Japanese Patent Application No. 2021-538701, dated May 16, 2023, 4 Pages. [English Translation Included].
Japanese Patent Office, "Decision of Refusal," issued in connection with Japanese Patent Application No. 021-538701, dated Jun. 6, 2023, 6 pages. [English Translation Included].
United States Patent and Trademark Office, "Notice of Allowability," issued in connection with U.S. Appl. No. 16/728,899, dated Jun. 22, 2023, 3 pages.
United States Patent and Trademark Office, "Corrected Notice of Allowability," issued in connection with U.S. Appl. No. 17/856,587, mailed on Jul. 3, 2023, 2 pages.
United States Patent and Trademark Office, "Corrected Notice of Allowability," issued in connection with U.S. Appl. No. 16/725,467, mailed on Jul. 12, 2023, 3 pages.
European Patent Office, "Communication Under Rule 71(3) EPC," issued in connection with European Patent Application No. 20181123.9, dated Jul. 27, 2023, 5 pages.
United States Patent and Trademark Office, "Corrected Notice of Allowability," issued in connection with U.S. Appl. No. 16/725,467, issued on Sep. 7, 2023, 3 pages.
United States Patent and Trademark Office, "Notice of Allowance" issued in U.S. Appl. No. 18/160,419, filed Oct. 6, 2023, 2 pages.
United States Patent and Trademark Office, "Supplemental Notice of Allowability," issued in connection with U.S. Appl. No. 16/725,467, mailed on Oct. 6, 2023, 3 pages.
United States Patent and Trademark Office, "Corrected Notice of Allowability," issued in connection with U.S. Appl. No. 17/732,173, mailed on Nov. 8, 2023, 2 pages.
United States Patent and Trademark Office, "Notice of Allowance" issued in U.S. Appl. No. 18/160,419, filed Dec. 13, 2023, 2 pages.
European Patent Office, "Decision to Grant a European Patent Pursuant to Article 97(1) EPC," issued in connection with European Patent Application No. 20181123.9, dated Dec. 14, 2023, 2 pages.
United States Patent and Trademark Office, "Supplemental Notice of Allowability," issued in connection with U.S. Appl. No. 17/434,603, dated Jan. 3, 2024, 3 pages.
United States Patent and Trademark Office, "Non-Final Office Action," issued in connection with U.S. Appl. No. 18/322,270, dated Feb. 7, 2024, 15 pages.
United States Patent and Trademark Office, "Notice of Allowance and Fee(s) Due," issued in connection with U.S. Appl. No. 29/771,488, dated Feb. 14, 2024, 7 pages.
United States Patent and Trademark Office, "Supplemental Notice of Allowability," issued in connection with U.S. Appl. No. 17/434,603, dated Feb. 22, 2024, 3 pages.
European Patent Office, "Extended European Search Report," issued in connection with European patent Application No. 20941909.2-1224, dated Feb. 26, 2024, 8 pages.
United States Patent and Trademark Office, "Notice of Allowance and Fee(s) Due," issued in connection with U.S. Appl. No. 17/132,838, dated Mar. 6, 2024, 8 pages.
United States Patent and Trademark Office, "Supplemental Notice of Allowability," issued in connection with U.S. Appl. No. 17/434,603, dated Mar. 6, 2024, 3 pages.
United States Patent and Trademark Office, "Corrected Notice of Allowability," issued in connection with U.S. Appl. No. 17/732,173, dated Mar. 12, 2024, 2 pages.
United States Patent and Trademark Office, "Notice of Allowance and Fee(s) Due," issued in connection with U.S. Appl. No. 29/771,488, dated Apr. 1, 2024, 4 pages.
United States Patent and Trademark Office, "Supplemental Notice of Allowability," issued in connection with U.S. Appl. No. 17/434,603, dated Apr. 4, 2024, 3 pages.
United States Patent and Trademark Office, "Non-Final Office Action," issued in connection with U.S. Appl. No. 17/928,595, dated Apr. 9, 2024, 17 pages.
United States Patent and Trademark Office, "Supplemental Notice of Allowability," issued in connection with U.S. Appl. No. 17/434,603, dated Apr. 24, 2024, 3 pages.
European Patent Office, "Communication under Rule 71(3)EPC," issued in connection with European Patent Application No. 23154752.2-1218, dated May 16, 2024, 9 pages.
United States Patent and Trademark Office, "Final Office Action," issued in connection with U.S. Appl. No. 18/322,270, dated May 22, 2024, 18 pages.
United States Patent and Trademark Office, "Supplemental Notice of Allowability" issued in connection with U.S. Appl. No. 17/434,603, dated May 29, 2024, 3 pages.
European Patent Office, "Communication under Rule 71(3) EPC— Intention to Grant," issued in connection with European Patent Application No. 19 921 860.3-1218, dated Jun. 21, 2024, 9 pages.
Korean Intellectual Property Office, "Request for the Submission of an Opinion," issued in connection with Korean Patent Application No. 10-2021-7027269, dated Jun. 21, 2024, 7 pages. [English Translation Included].
United States Patent and Trademark Office, "Final Office Action," issued in connection with U.S. Appl. No. 17/928,595, dated Jul. 25, 2024, 18 pages.
Japanese Patent Office, "Notice of Reasons for Refusal," issued in connection with Japanese Patent Application No. 2022-572376, dated Jul. 16, 2024, 8 pages. [English Translation Included].
United States Patent and Trademark Office, "Notice of Allowance and Fee(s) Due," issued in connection with U.S. Appl. No. 18/525,248, dated Aug. 22, 2024, 8 pages.
International Searching Authority, "International Preliminary Report on Patentability," issued in connection with International Patent Application No. PCT/CN2022/084726, mailed on Oct. 10, 2024, 6 pages.
United States Patent and Trademark Office, "Notice of Allowance and Fee(s) Due," issued in connection with U.S. Appl. No. 18/322,270, dated Sep. 16, 2024, 9 pages.
European Patent Office, "Decision to Grant a European Patent Pursuant to Article 97(1) EPC," issued in connection with European Patent Application No. 19921860.3, dated Oct. 24, 2024, 1 page.
United States Patent and Trademark Office, "Advisory Action," issued in connection with U.S. Appl. No. 17/928,595, dated Oct. 7, 2024, 3 pages.

\* cited by examiner

METHODS AND APPARATUS TO IMPROVE USER EXPERIENCE ON COMPUTING DEVICES

FIELD OF THE DISCLOSURE

This disclosure relates generally to computing devices, and, more particularly, to methods and apparatus to improve user experience on computing devices.

BACKGROUND

There is often a tradeoff between achieving power efficiencies and performance efficiencies in computing devices. That is, reducing power consumption of a computing device can save power (e.g., to extend battery life), but may come at some cost to the performance and/or responsiveness of the device, thereby deleteriously impacting user experience. On the other hand, computational efficiency and/or performance of a computing system can often be improved to enhance user experience to some extent by increasing power consumption, but this reduces power efficiencies.

Figure 1:
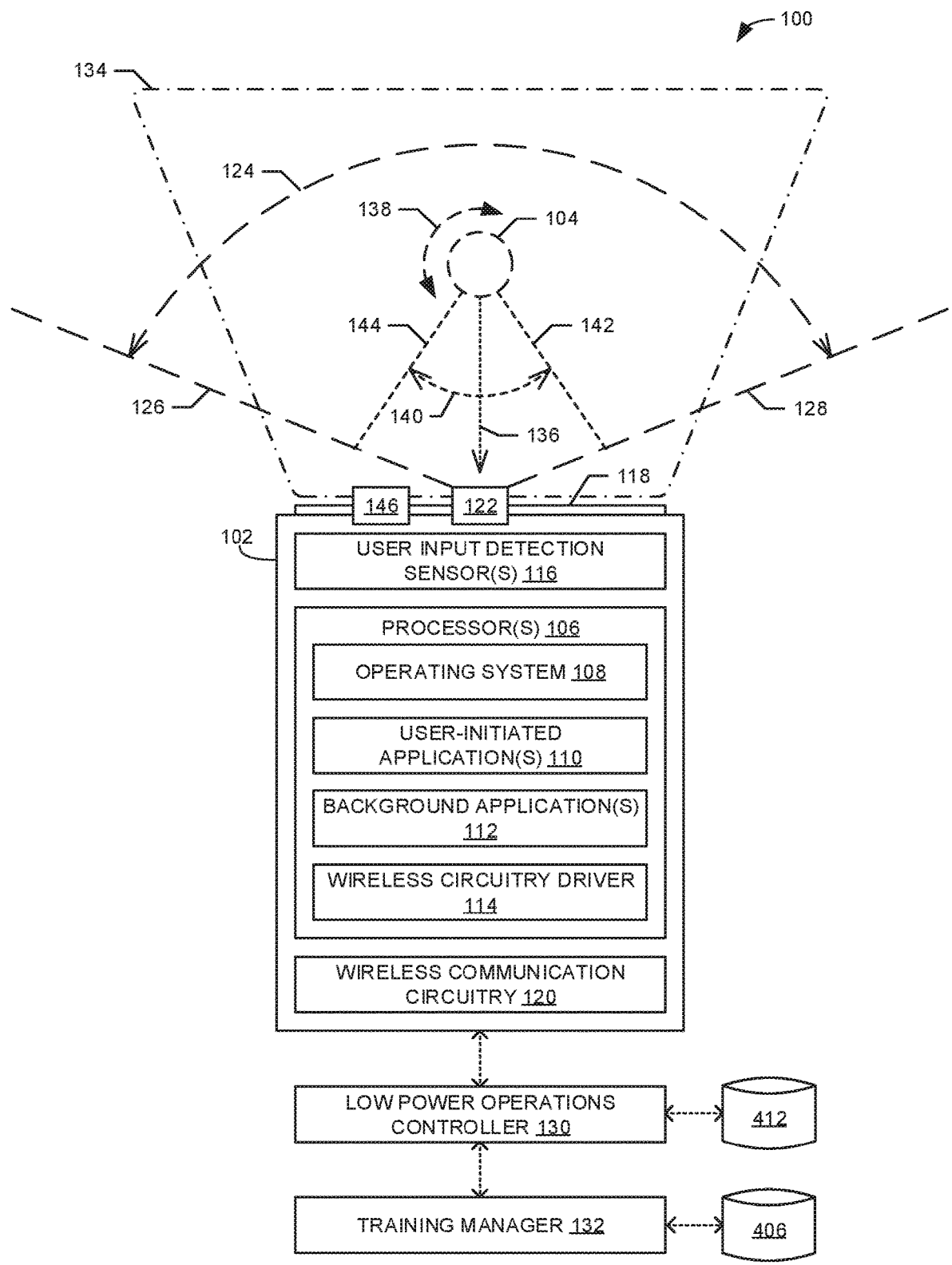
FIG. 1 illustrates an example system constructed in accordance with teachings disclosed herein for managing the power and/or performance of an example computing device.

The figures are not necessarily to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Energy efficiency has long been an important factor in designing computing devices to increase battery life. More recently, as awareness of the environmental concerns have increased, energy efficiency has also become an important consideration for AC-powered computing devices. Some computing devices may operate in either an AC-powered mode (e.g., when plugged into a wall socket) or a DC-powered mode (e.g., when powered by a battery). As used herein, a computing device refers to any type of device (e.g., a laptop, a desktop computer, a tablet, a smartphone, etc.) that may be AC-powered, DC-powered, and/or selectively powered by either AC or DC sources. Regardless of whether a computing device is plugged into a source of commercial power such as a wall socket (AC-powered) or running on a battery (DC-powered), increasing energy efficiency often involves sacrificing the performance efficiency (e.g., computational speed and/or operational responsiveness) of the device. Thus, while implementing operations with less power may reduce power consumption and/or increase battery life, such endeavors may have a negative impact on a user's experience.

Many existing computing devices switch between different power modes depending on whether the device is running on AC power or DC power. That is, many computing devices are implemented to prioritize energy efficiency over performance efficiency (e.g., optimize for lower power) when running on DC power and to prioritize performance efficiency over energy efficiency (e.g., optimize for performance) when running on AC power. Such changes in the power consumption and performance of a computing device can result in an inconsistent user experience depending on whether the device is AC powered or DC powered. However, basing the performance of a computing device (and the corresponding power consumption and/or user experience) on whether the device is powered by AC or DC may result in a waste of energy in some circumstances (e.g., due to operating in a higher performance mode than necessary) and less than desirable performance in other circumstances (e.g., due to operating in a lower power mode than desirable for the current operations for which the device is being used). For instance, even though a device may be running on AC power, if there is no user present and/or the user is not actively interested in the operation of the device, there is no need to prioritize performance efficiency over energy efficiency because a reduced performance (based on a lower power mode) does not affect user experience inasmuch as the user is not present or engaged sufficiently to experience the reduced performance. On the other hand, when a user is actively engaged in the operation of a computing device, the user may desire high performance for a better user experience even when the device is running on DC power.

Another problem with basing the management of power and performance on whether a computing device is AC powered or DC powered is that power inefficiencies associated with a high performance mode when AC powered can actually result in a loss of performance. For instance, to increase performance when running on AC power, the power management on certain components of a computing device (e.g., a Wi-Fi component) is often disabled to reduce (e.g., minimize) latency. However, disabling power management for a Wi-Fi component has been found to increase power consumption of some devices by approximately 350 mW without any meaningful performance gain. Consuming 350 mW of power without any appreciable benefit leaves that much less power in the power budget of a computing device to accomplish other tasks, thereby resulting in a reduction in performance relative to when the power management for the Wi-Fi component remains enabled. Such inefficiencies negatively impacting the power budget for a device can be particularly significant for thermally constrained form factors and platforms that support per core performance states.

In contrast with existing computing devices that switch between different operation modes for wireless communication circuitry (e.g., a wireless network card, a Wi-Fi device) based on the source of power (whether AC or DC), example computing devices disclosed herein manage power and performance of Wi-Fi circuitry based on user presence and/or engagement with the operation of the example computing device to provide for a more consistent user experience when a user is present and/or engaged with the device and to conserve power (e.g., to save battery life) by operating in lower power modes when a user is not present and/or not engaged with the device.

As described more fully below, in some examples, multiple different operation modes may be defined for a computing device that give different degrees of preference to performance efficiencies on the one hand and power efficiencies on the other hand. In some examples, switching between the different operation modes is determined based on (1) whether or not a user is present, and (2) whether or not the user is engaged with the operation of the computing device.

As used herein, a user is determined to be "present" when the user is in an image captured by an image sensor of the computing device. In some examples, a user within image data may not be considered present if the user is more than a threshold distance away from the computing device based on the user being smaller than a threshold size within the image.

As used herein, a user is determined to be "engaged" or exhibiting "engagement" with a computing device when the user provides an indication of interest in the operation of the computing device. In some examples, a user indicates interest with the operation of the computer device (e.g., is engaged with the device) by interacting with a human-machine interface (also known as a human interface device (HID)) associated with the computing device (e.g., interacting with a keyboard, a mouse, a touchscreen, a graphical user interface (GUI), a microphone, etc.). Such interactions with a computing device are referred to herein as active engagement with the computing device. Additionally or alternatively, in some examples, a user is determined to be engaged (e.g., indicates interest in the operation of the computing device) based on a determination of the user's gaze from an analysis of the image captured by the image sensor. For instance, if a user is looking at the computing device, user engagement is inferred. By contrast, if a user is looking away from the computing device, a user is determined to not be engaged. A user determined to be looking at the computing device without actively interacting with the device is referred to herein as being passively engaged with the computing device.

There are other forms of passive engagement with a computing device that do not depend on the user looking at the device. For instance, a user may initiate the downloading of a large file, the compiling of computer code, the processing of a large date file, transcoding a video, etc., and then look away while the task is completed. In such situations, while the task may have involved active engagement to initiate, during the ongoing completion of the task, the user may no longer be actively interacting with the device (via a human machine interface) or even looking at the device. However, the user has still indicated an ongoing interest in the operation of the device based on the ongoing task that was initiated by the user. Accordingly, such user-initiated tasks are referred to herein as a form of passive engagement with the computing device. In some instances, a user may leave the presence of a computing device while a user-initiated task is ongoing. Thus, it is possible for a user to be engaged (e.g., passively engaged) with a computing device even though the user is not present.

In some examples, the different operation modes correspond to different power levels and different performance levels. As used herein, "performance level" refers to the performance efficiency at which a computing device operates. Thus, a higher performance level corresponds to greater performance efficiency and, therefore, an improved user experience. As used herein, "power level" refers to the amount of power consumed by a computing device. Thus, a higher power level corresponds to greater power consumption (e.g., less power efficiency). As mentioned above, performance and power consumption are often related such that a higher performance level corresponds to a higher power level and vice versa. In some examples, the different operation modes of the computing device may include one or more of (1) an interactive mode corresponding to when a user is present and actively engaged with the computing device, (2) a balanced mode corresponding to when a user is passively engaged with the computing device (whether the user is present or not; when not present the user may nevertheless be passively engaged based on an ongoing user-initiated application running on the computing device), (3) a quiet mode when the user is neither present nor engaged in the computing device but there are background tasks to be performed, and (4) a standby mode when the user is neither present nor engaged in the computing device and there are no background tasks to be performed. In some examples, the computing device may switch to the interactive mode when the user is present and only passively engaged (e.g., looking at the computing device) if the activity of the central processing unit (CPU) satisfies (e.g., exceeds) a threshold.

As described more fully below, the interactive mode is associated with a higher performance level and a higher power level than the other operation modes to enhance (e.g., optimize) the performance of the computing device for an improved user experience. A quality user experience in the interactive mode is important because it corresponds to circumstances when the user is actively interacting (e.g., actively engaged) with the computing device and, therefore, likely to be the most interested in fast responses with the device operating at peak performance. The balanced mode is associated with power levels and performance levels that are relatively balanced between performance efficiency and power efficiency (e.g., mid-level performance and mid-level power efficiency). In other words, as used herein, performance and power are balanced when neither is significantly prioritized over the other. In this manner, a user is still able to have a quality user experience while at the same time conserving energy (e.g., to extend battery life). Reducing the performance efficiency of the device during the balanced mode relative to during the interactive mode is appropriate in these circumstances because the user is not actively interacting with the device such that there is less need to be ready to respond to additional computational loads from additional user inputs. The quiet mode is associated with lower performance levels and lower power levels than the other operation modes to reduce (e.g., minimize) the power consumption of the computing device for improved power efficiency (e.g., extended battery life) while still enable background tasks to be performed. Power consumption may be treated as a priority in the quiet mode because a reduction in user experience is not a concern inasmuch as the user is not engaged in the operation of the computing device. Finally, the standby mode is a lower power mode in which the computing device remains powered on and ready to wake-up to other higher power modes when needed.

As mentioned above, in some examples, the determination of the particular operation mode to implement at any given point in time is based on an analysis of image data captured by an image sensor of the computing device. In some examples disclosed herein, at least some of the image data analysis to determine the presence and engagement (based on gaze direction) of a user is performed by one or more processors that are in communication with the image sensor and that operate in a low power mode or an ultra-low power mode (e.g., consuming around 10 mW or less). In such examples, the processor(s) (e.g., digital signal processor(s)) generate metadata indicating whether the user is present (e.g., represented by "1") or absent (e.g., represented by "0") based on the facial recognition analysis of the image data. The metadata indicating user presence or absence is used to manage the power and performance of Wi-Fi circuitry of the computing device, thereby reducing power costs associated with transmitting, processing, and/or analyzing image data.

Determining the presence and/or engagement of a user at any given time based on image data depends on an image sensor being active (e.g., always active) to capture the image data and one or more associated processors to analyze the image data. The ongoing operation of the image sensor and the associated processor(s) consume power. As noted above, examples disclosed herein implement these component in a low power or ultra-low power mode so as to reduce the impact on energy efficiencies gained from dynamically adjusting the operation of a computing device (e.g., wireless communication circuitry and/or other components) based on the resulting determination of user presence and/or engagement. In some examples, the image sensor and associated processor(s) used to monitor for the presence and/or engagement of a user is able to transition between multiple different low power modes that may be employed to adapt to different circumstances, thereby enabling further power savings. More particularly, the different low power modes for example image sensors and associated processor(s) disclosed herein include (1) a streaming mode, (2) wake-on-motion mode, and (3) a pause mode. The streaming mode consumes the most power of the three low power modes and involves the image sensor actively capturing image data on an ongoing basis and the associated processor(s) analyzing such data to determine the presence and/or engagement of a user and any changes thereto. The wake-on-motion mode consumes less power than the streaming mode and involves the image sensor actively capturing image data on an ongoing basis and the associated processor(s) analyzing such data to detect motion within the field of view of the image sensor. The detection of motion triggers the activation of the streaming mode to perform the more detailed analysis to determine the presence and/or engagement of a user noted above. The pause mode consumes less power than the wake-on-motion mode and corresponds to when the image sensor and associated processor are not actively capturing or analyzing image data but are fully configured to transition to the streaming mode. The pause mode may be activated when the presence and/or engagement of a user may be inferred through other inputs such as, for examples, active interactions of the user with the associated computing device (e.g., via a keyboard, mouse, touchscreen, etc.).

In some examples, the low power image sensor and the associated one or more processors may be used in conjunction with other sensors (e.g., a microphone) that can provide further context about a user or other individuals in a vicinity of a computing device for enhanced user experience. Independent of determining the presence and/or engagement of users, examples disclosed herein may be employed to implement a natural language based digital assistant. Many existing digital assistants monitor an audio stream for a keyword prompt or wake phrase spoken by a user that triggers or activates the digital assistant to then capture and analyze a request or query spoken by the user following the keyword or wake phrase. Any response to such queries are entirely dependent on how the user phrases the query following the keyword prompt.

Unlike these existing digital assistants, examples disclosed herein capture and analyze dialogue spoken by users on an ongoing basis and store speech data representative of the dialogue during a rolling most recent period of time (e.g., most recent 2 minutes, 5 minutes, 10 minutes, etc.). When a user speaks a keyword or wake phrase to activate the digital assistant to respond to a particular query, the speech data stored during the most recent period of time may be used to provide context and meaning to the particular query spoken by the user following the keyword or wake phrase. As a result, an enhanced user experience is achieved because a user does not need to fully reiterate all the details associated with a query after stating the keyword prompt if the details were discussed during the most recent period of time before the query.

FIG. 1 illustrates an example system 100 constructed in accordance with teachings disclosed herein for managing the power and/or performance of a computing device 102 based on the detection of the presence and/or engagement of a user 104 with the device 102. The computing device 102 can include a desktop computer, a laptop, a tablet, a smart phone, etc. In the example of FIG. 1, the computing device 102 includes one or more processor(s) 106. The example processor(s) 106 may correspond to any type of processing unit, such as a processor core, a processor and/or a microcontroller. In some examples, the processor(s) 106 are associated with a system-on-a-chip (SoC). The example processor(s) 106 may execute, among other things, an operating system 108 and various other software applications including user-initiated application(s) 110, background application(s) 112, and a wireless circuitry driver 114. User-initiated applications may be background applications, foreground applications, and/or both background applications and foreground applications. Some applications can be a foreground application at one point in time and a background application point in time.

An example operating system 108 is an operating system from Microsoft® corporation such as Windows® 10, Windows® 8, etc. An example user-initiated application is an application through which the user 104 interacts with the computing device 102 to accomplish user-initiated and/or user-specified tasks (e.g., a word processing application, a web browser, a video player, etc.). Users 104 may interact with the computing device 102 via one or more peripherals such as a keyboard, a mouse, a touchscreen, etc. that are in communication with example user input detection sensor(s) 116 of the computing device 102. The user input detection sensor(s) 116 transmit data indicative of user activity or inactivity to the processor(s) 106. Further, many user-initiated application(s) 110 include associated user interfaces rendered via a display screen 118 of the computing device 102 to facilitate the user interactions (e.g., to display requested content (e.g., documents, webpages, videos, etc.), visually confirm receipt of user input data, indicate options for user selection, etc.).

The example background application(s) 112 include applications that do not involve ongoing interactions with a user 104. While some background applications 112 may be initiated by a user interaction, other background applications 112 may be initiated independent of the user 104 (e.g., by the operating system 108, an IT administrator, an IT security software application managed by an IT administrator, etc.). Some background applications 112 may include associated user interfaces rendered via the display screen 118. However, other background applications 112 may not provide any indication to the user 104 (visual or otherwise) that such applications are operating. Even when a background application has a user interface, it is typically not active and may not be presented to the user (e.g., a different foreground application may instead be presented to the user). In some examples, the operating system 108 includes a background activity manager (e.g., the background activity moderator (BAM) for the Windows® operating system) to manage the initiation and/or ongoing operation of the background applications 112.

The example wireless circuitry driver 114 enables the operating system 108, the user-initiated application(s) 110, and/or the background application(s) 112 to interface with example wireless communication circuitry 120 (e.g., a network card, a Wi-Fi device, etc.) of the computing device 102. The example wireless communication circuitry 120 enables the computing device 102 to access or connect to an associated network (e.g., the Internet) in accordance with any communications protocol such as Wi-Fi, Bluetooth, Bluetooth Low Energy, cellular communication protocols (e.g., 2G, 3G, 4G, 5G), etc. Thus, in some examples, the wireless communication circuitry 120 implements means for wireless communicating.

Implementation of any one of the operating system 108, the user-initiated application(s) 110, and the background application(s) 112 contribute to the computational load on the processor(s) 106, which contributes to the power consumed by the computing device 102. Furthermore, implementation of any of the operating system 108, the user-initiated application(s) 110, and the background application(s) 112 may also involve operation of the wireless circuitry driver 114 (as well as the associated wireless communication circuitry 120) and/or the operation of other components (e.g., memory, display drivers, other communication interfaces, cooling fans, etc.) in the computing device 102 that also contribute to the amount of power consumed by the device 102. High power demands by components and/or operations of the computing device 102 result in an increase in power consumption and a corresponding decrease in battery life (assuming the device is battery powered) and/or a reduction in energy efficiency. Thus, reducing power consumption is an important consideration in designing and operating computing devices. However, a reduction in power consumption can negatively impact the performance of the computing device 102, which may negatively impact user experience. A reduction in performance efficiency may not necessarily negatively impact user experience if the reduction in performance is not noticed by a user. Accordingly, in some examples, to reduce power consumption without significantly impacting user experience, operations of the computing device 102 may be switched between higher and lower power operation modes depending on the activity, engagement, and/or presence of the user 104 with the operations of the device.

In some examples, the activity, engagement, and/or presence of the user 104 is based on image data from one or more image sensors 122 of the computing device 102. In some examples, the image sensor 122 implements means for capturing images and/or generating image data. In the illustrated example of FIG. 1, the image sensor 122 includes a user-facing camera (e.g., the camera facing in the same direction as the display screen 118). The example image sensor 122 may be coupled to the display screen 118, disposed in a bezel surrounding the display screen 118, and/or located on other portions of the computing device 102 (e.g., a base of a laptop, in the hinge area of a clamshell housing, etc.). The image sensor 122 of the example of FIG. 1 is associated with an imaging field of view (FoV) 124 represented as spanning between the dashed lines 126, 128 in FIG. 1. The imaging FoV 124 can correspond to, for instance, a field of view of the front-facing camera or image sensor 122 of the computing device 102. In the example of FIG. 1, the image sensor 122 generates image data representing objects present within the imaging FoV 124 corresponding to the area surrounding the computing device 102.

The user 104 may move in and/or out of the imaging FoV 124 while the computing device 102 is in a powered-on state. For example, the user 104 may be within the imaging FoV 124 when working at a desk on which the computing device 102 rests. The user 104 may move out of the imaging FoV 124 when the user 104 walks away from the computing device 102 to, for instance, go to lunch. In some examples, when the user 104 is within the imaging FoV 124, the image sensor 122 generates image data that includes the user 104. In some such examples, the distance of the user 104 from the device 102 may be indicated by the size of the user 104 represented in the image data relative to the rest of the FoV 124 (e.g., the user will appear larger when closer to the device 102 and smaller when farther away). In some examples, image data generated when the user 104 is outside of the imaging FoV 124 will not include the user 104.

In the example of FIG. 1, the image sensor 122 generates image data whenever the computing device 102 is in a powered-on state, including when the computing device 102 is in a sleep mode (e.g., a low power mode). Put another way, the image sensor 122 operates in an always-on mode. In some examples, a low power operations controller 130 analyzes the image data to determine the presence and/or engagement of a user 104 as described in further detail below. The example low power operations controller 130 uses the determination of the presence and/or engagement of the user 104 to adjust the operation of components of the computing device 102 to either improve power efficiency (e.g., conserve power) and/or to improve processor efficiency (e.g., for an improved user experience). The example low power operations controller 130 can be implemented by one or more processors of the computing device 102, such as the processor(s) 106 of FIG. 1 executing instructions such as those discussed below. In some examples, at least some of the analysis performed by the low power operations controller 130 is implemented by processor(s) of the computing device 102 (e.g., digital signal processor(s) (DSP(s)) operating in a low power mode or ultra-low power mode. In other examples, the low power operations controller 130 is implemented by one or more cloud-based devices, such as one or more servers, processors, and/or virtual machines and/or containers located remotely from the computing device 102. In other examples, some of the analysis performed by the low power operations controller 130 is implemented by cloud-based devices and other parts of the analysis are implemented by local processor(s) or one or more computing device(s).

In some examples, the low power operations controller 130 receives the image data in substantially real-time (e.g., near (e.g., within 1 second of) the time the data is collected). In other examples, the low power operations controller 130 receives the image data at a later time (e.g., periodically and/or aperiodically) based on one or more settings but sometime after the image data was generated (e.g., seconds later, minutes later). In some examples, the low power operations controller 130 performs one or more operations on the image data such as filtering the raw image data and/or removing noise from the image data.

As mentioned above, the example image sensor 122 may operate in an always-on state. To achieve an always-on state for the image sensor 122 while also conserving power, the example image sensor 122 of FIG. 1 is constructed to operate in a low power mode. More particularly, in some examples, the image sensor 122 and the associated low power operations controller 130 may switch between multiple different low power modes of differing levels of power efficiency depending on the circumstances associated with the computing device 102 and/or the user 104. In some examples, the different low power modes of the example image sensors 122 and associated processor(s) 106 disclosed herein include (1) a streaming mode, (2) wake-on-motion mode, and (3) a pause or standby mode.

The streaming mode corresponds to when the image sensor 122 is actively capturing image data on an ongoing basis and the low power operations controller 130 is analyzing such data to determine the presence and/or engagement of a user 104. In some examples, the streaming mode operates at around 10 mW or less. To achieve such low power consumption during the streaming mode, the image sensor 122 captures image data for processing by the processor 106 at a relatively slow frame rate but at a sufficient frequency to enable the low power operations controller 130 to identify changes in the presence and/or engagement of a user and respond with changes to the operation of the computing device without appreciable delay (e.g., without delay that would be noticeable to the user). For instance, in some examples, the image data is captured and/or processed at 1 frame per second (fps), 2 fps, 3 fps, 5 fps, etc. In some examples, the image sensor 122 operates at a higher pixel clock (e.g., 30 fps) but is intermittently paused and/or only transmits image data at a reduced frame rate. Further, to reduce power during the streaming mode, the image sensor 122 captures image data at a relatively low resolution that is sufficient to enable the low power operations controller 130 to perform facial recognition and/or gaze direction analysis of a user within the field of view of the image sensor. More particularly, the image sensor 122 of this example is constructed to support a x1 MIPI CSI-2 (Mobile Industry Processor Interface Camera Serial Interface) DPHY output with a compatible resolution and pixel format such as, for example, a QVGA resolution (320×240) for RGB monochrome, a VGA resolution (640×480) for non-hybrid Bayer RGB, or a hybrid RGB-IR 4×4 VGA resolution (640×480 or 1280×960).

If the low power operations controller 130 determines (during the streaming mode) that no user is present for a threshold period of time (e.g., 30 seconds, 1 minute, 3 minutes, 5 minutes, 10 minutes, etc.), the system may switch to the wake-on-motion mode to conserve additional power. The wake-on-motion mode operates at lower power than the streaming mode and corresponds to when the image sensor 122 is actively capturing image data on an ongoing basis and the associated low power operations controller 130 are analyzing such data to detect motion within the field of view of the image sensor. In some examples, the wake-on-motion mode operates at around 2 mW or less. In some examples, this lower power consumption is achieved by capturing and/or analyzing the image data at a slower frame rate than during the streaming mode. Additionally or alternatively, the lower power is achieved by capturing the image data at a lower resolution than during the streaming mode. The lower frame rate and/or lower resolution is acceptable in the wake-on-motion mode because this mode is intended to operate when no user is present such that there is no reduction in user experience. In some examples, the image sensor 122 captures image data at the same rate and/or the same resolution as during the streaming mode. In such examples, power efficiencies may still be gained in the low power operations controller 130, relative to the streaming mode, because analyzing the image data for meaningful motion is less computationally intensive that performing facial recognition and/or gaze direction analysis and, therefore, less power is needed. In some examples, a different sensor other than the image sensor 122 may be used to monitor for motion. For instance, some computing devices include a time of flight sensor (e.g., an infrared based radar sensor) that is capable of detecting motion. For such computing devices, the image sensor 122 may be in a paused or standby state while the time of flight sensor is actively monitoring an area surrounding the computing device 102 while in the wake-on-motion mode.

In some examples, the wake-on-motion mode continues until motion is detected, which then triggers the streaming mode to become active again to analyze image data in greater detail to determine whether the detected motion corresponds to a person returning to the computing device. In some examples, the processor 106 is able to assert an interrupt in response to the detection of motion to quickly transition back to the streaming mode. Further, in some examples, the low power operations controller 130 may develop a motion map for the image data that may be used upon transitioning to the streaming mode to facilitate the determination of whether the motion is indicative of the presence of a user and/or the engagement of such a user.

The pause mode corresponds to when the image sensor 122 and the low power operations controller 130 is not actively capturing or analyzing image data but are fully configured to quickly transition to the streaming mode. As such, the pause mode operates at less power than the wake-on-motion mode. In some examples, the operates at around 1 mW or less. When a user is actively engaged with the computing device 102 (e.g., the user is interacting with the computing device 102 using the keyboard, mouse, touchscreen, and/or another human machine interface), there is no need for the user presence and/or engagement to be determined based on captured image data. As such, to conserve power, the pause mode is triggered in response to active engagement of a user with the computing device (e.g., based on data from the user input detection sensor(s) 116). If the active engagement ends for more than a threshold period of time (e.g., 3 seconds, 5 second, 10 seconds, 30 seconds, 1 minute, 3 minutes, etc.), the system will revert to the streaming mode to again determine the presence and/or engagement of the user based on captured image data.

Additionally or alternatively, in some examples, the pause mode may be initiated or triggered by a user input to stop the ongoing capture of image data (e.g., for example out of privacy concerns). In some examples, the user input is detected by the user input detection sensor 116 determining that the user has manually closed a cover of the image sensor 122. In some examples, the user input detection sensor 116 detects the user input requesting the image sensor 122 to be turned off via a user interaction with a graphical user interface rendered on the display screen 118.

In some examples, the image sensor 122 and the low power operations controller 130 are configured to transition from either of the wake-on-motion mode or the pause mode to the streaming mode relatively quickly. In some examples, the transition is completed in less than 100 ms. In some examples, this relatively quick transition period includes the capture of an initial image frame that is suitable for analysis by the low power operations controller 130 to detect the presence and/or engagement of a user in the image frame. To facilitate this relatively rapid transition, in some examples, the image sensor 122 autonomously manages auto exposure (AE) parameters during the wake-on-motion mode. AE parameters are defined based on the lighting conditions of the scene captured in the image data and are useful to the low power operations controller 130 when analyzing the image data to detect the presence and/or engagement of a user. Accordingly, in some examples, the image sensor 122 shares the AE parameters with the low power operations controller 130 during the transition to the streaming mode so that the low power operations controller 130 does not need to independently derive such parameters. Further, in some examples, the image sensor 122 maintains and shares other state and/or configuration parameters of the sensor with the low power operations controller 130 during the transition to the streaming mode to further reduce the time needed for the low power operations controller 130 to implementing the facial recognition and/or gaze direction analysis of captured image data.

In addition to the three low power modes discussed above, in some examples, the image sensor 122 and/or the low power operations controller 130 may be in an off mode when no power is being drawn. The image sensor 122 and/or the low power operations controller 130 may enter the off mode when the computing device 102 is in a sleep mode and/or off mode (e.g., if the computing device 102 is a laptop, when the lid is closed).

Further, in some examples, the image sensor 122 may operate in a standard (higher) power mode when capturing image data requested by the user 104. For instance, if the user 104 initiates a video conferencing application, the example image sensor 122 can switch to generating high-resolution image data at a high frame rate (e.g., based on instructions from the processor(s) 106 of the computing device). The example image sensor 122 can return to operating in one of the always-on, low power modes after operation of the video-conferencing application has ended. Thus, in some examples, the computing device 102 of FIG. 1 further conserves energy by using existing components commonly used for generating image data such as the user-facing camera of the computing device 102 to capture image data for determining user presence. In some examples, the image sensor 122 can generate image data at a rate of, for instance, 10 frames/second while operating in the always-on, low power mode.

Implementing the image sensor 122 and the low power operations controller 130 in the various low power modes outlined above can offer significant improvements in the power efficiency of the computing device 102. Indeed, testing of a laptop computing device indicates the possibility of at least a 20% increase in battery life by implementing teachings disclosed herein. The exact amount of power savings depends on how frequently the image sensor 122 and the low power operations controller 130 are operating in each of the different low power modes as well as how efficiently the image sensor 122 and the low power operations controller 130 consume power while in the different modes.

Table 2 shows expected power consumption of the example low power operations controller 130 in each of the operating modes and includes the ASIC plus clocking and power delivery losses. Table 2 also shows expected power consumption of the example image sensor 122 constructed using three different levels of power efficiency ranging from a "best" alternative (which is the lowest power and incorporates the full ultra-low power feature set disclosed herein) to a "good" alternative (which corresponds to a typical user-facing image sensor).

TABLE 2

Expected Power Consumption for Ultra-Low Power Image Sensor and associated Process Controller Power Modes

| Power State | Operations controller power consumption (mW) | Image sensor power consumption (mW) | | |
|---|---|---|---|---|
| | | Good | Better | Best |
| Off (Lid Closed [S0iX]) | 0.025 | 0.025 | 0.025 | 0 |
| Pause (Lid Open [S0, Screen on/off]) | 5 | 5 | 3 | 1 |
| Sensor Wake-On-Motion (Lid Open [S0iX, Screen off]) | 5 | 5 | 3 | 2 |
| Controller Wake-On-Motion (Lid Open [S0iX, Screen off]) | 10 | 36 | 15 | 10 |
| Streaming (Lid Open [Screen on/off, ULP Streaming @ 3fps]) | 25 | 36 | 15 | 3 |
| Day-in-Life [Sensor Wake-On-Motion] (25%, 13%, 17%, 45%) | 12.7 | 17.6 | 7.6 | 1.8 |
| Day-in-Life for [Controller Wake-On-Motion] (25%, 13%, 17%, 45%) | 13.4 | 21.8 | 9.2 | 2.8 |

The bottom two rows of Table 2 represent two example scenarios of a typical "day-in-life" of the computing device 102 as determined from empirical observations. More particularly, empirical observations indicate that a typical dayin-life of a computing device involves a user being present and engaged approximately 30% of the time, the user not being engaged or not being present within a default <5 minutes operating system (OS) inactivity timeout approximately 32% of the time, and the user not being present beyond the 5 minute inactivity time or has otherwise shut-down the computing device 102 (or closed the laptop lid) approximately 38% of the time. Further, based on a 2-hour workload, empirical observations indicate a user is actively engaged for approximately 68% of the day and disengaged or not present for the other approximately 32% of the day. Thus, the computing device 102 is expected to be in an idle state approximately 32% of the time in which significant power savings can be achieved by implementing teachings disclosed herein.

As mentioned above, the low power operations controller 130 of FIG. 1 serves to process the image data generated by the image sensor 122 to determine whether the user 104 is present within the imaging FoV 124 and/or whether the user is engaged with the operation of the computing device 102. More particularly, in some examples, the low power operations controller 130 executes one or more learned models to determine the presence of the user 104 within the imaging FoV 124 and the engagement of the user 104 in the operations of the computing device 102 based on the image data generated by the image sensor 122. The example low power operations controller 130 of FIG. 1 is trained by a training manager 132 using machine learning technique(s) (e.g., supervised learning) and training image data including the user 104 and/or other users to detect human face(s) and/or to recognize particular human facial feature(s) such as a nose, an ear, a mouth, etc. Using the learned face detection model(s), the example low power operations controller 130 analyzes the image data generated by the image sensor 122 and determines whether the user 104 is present within the imaging FoV 124. Based on the detection of the user 104 in the imaging FoV 124 and one or more predefined rules, the low power operations controller 130 controls settings for particular performance parameters affecting the power level and/or performance level of the computing device 102 (e.g., adjusting the operation mode of the wireless communication circuitry 120).

When the example low power operations controller 130 of FIG. 1 determines that the user is within a viewing area 134 of the display screen 118, the low power operations controller 130 analyzes the image data using the learned face detection model(s) to identify a direction of a gaze 136 of the user 104 relative to the image sensor 122. In some examples, the gaze direction 136 of the user 104 corresponds to a direction extending directly in front of the user's face. Thus, in some examples, the direction of gaze 136 of the user 104 is defined as an angle of the user's face relative to the image sensor 122. In the example of FIG. 1, the direction of the user's gaze relative to the image sensor 122 serves as an indicator of the user's gaze relative to the display screen 118 and, thus, the attentiveness of the user 104 to the display screen 118. That is, if the user 104 is facing towards the display screen 118, the example low power operations controller 130 may infer that the user 104 is interested in the content rendered on the display screen 118 and, therefore, is engaged in the operation of the computing device 102. On the other hand, if the user 104 is facing off to the side or away from the display screen 118, the example low power operations controller 130 may infer that the user 104 is not interested (e.g., engaged) in the operation of the computing device 102. For instance, the user 104 may be sitting at his or her desk within the viewing area 134 of the display screen 118, but turned away from the display screen 118 while talking to a colleague, reading a paper document, etc. Turning of the user 104 relative to the device 102 is represented by the curved arrow 138 of FIG. 1. In some examples, the low power operations controller adjusts the performance of the computing device 102 based on the inferred engagement of the user 104 to either increase performance for improved user experience (e.g., when the user is engaged) or decrease performance to conserve power (e.g., when the user is not engaged).

In some examples, the low power operations controller 130 determines gaze direction 136 based on identification of an orientation of a head of the user 104 and/or on identification of facial features in the image data, including whether, for example, one ear is visible, two eyes are visible, etc. People do not always look directly in front of themselves but may rotate their eyes in any direction. Accordingly, in some examples, when the user 104 is in the viewing area 134 of the display screen 118, the example low power operations controller 130 of FIG. 1 determines a user field of view (FoV) 140 surrounding the central gaze direction 136 of the user. In the example of FIG. 1, the user FoV 140 is represented as spanning between the dashed lines 142, 144. In the example of FIG. 1, the low power operations controller 130 is trained by the training manager 132 using machine learning algorithm(s) to recognize facial features and to determine a direction of gaze 136 and/or a user FoV 140 based on the recognition of such facial features. Based on the determination of the gaze direction 136 and/or the user FoV 140 and one or more predefined rules, the example low power operations controller 130 controls settings for particular performance parameters affecting the power level and/or performance level of the computing device 102.

In some examples, the training manager 132 is implemented by the processor(s) 106 of the computing device 102. In some examples, the training manager 132 is implemented by a different processor of the computing device 102. In other examples, the training manager 132 is implemented by one or more cloud-based devices, such as one or more servers, processors, and/or virtual machines. In other examples, some of the analysis performed by the training manager 132 is implemented by cloud-based devices and other parts of the analysis are implemented by processor(s) or one or more computing device(s). The processor(s) and/or cloud-based device(s) that are used to implement the example training manager 132 can be the same as or different than the processor(s) and/or cloud-based device(s) used to implement the low power operations controller 130.

In some examples, the low power operations controller 130 reduces power consumption by the computing device 102 based on data from the user input detection sensor(s) 116 indicating that the user 104 is actively engaged with the computing device 102 (e.g., typing on a keyboard). In such examples, the low power operations controller 130 saves power costs by instructing the image sensor 122 not to generate image data and/or by refraining from analyzing image data with respect to the user's presence and/or gaze direction, as the user inputs indicate that the user is currently present and attentive to the computing device 102.

In some examples, the low power operations controller 130 of FIG. 1 controls one or more performance parameters governing the power consumption, performance, and/or system responsiveness of the computing device 102 in response to a determination of the presence and/or engagement of the user 104 with the operation of the computing device 102. These performance parameters may impact the operation of any components of the computing device 102 including, for example, the processor(s) 106, the image sensor 122, the wireless communication circuitry 120, the display screen 118, etc. For example, the low power operations controller 130 may adjust or tune a power limit (PL) parameter that defines a package power limit for the one or more processor(s) 106 and/or the associated SoC containing the processor(s) 106 based on the presence and/or engagement of the user 104 (e.g., a higher PL when a user is present and engaged than when the user is not present and/or not engaged). As used herein, the package power limit defines the limit on the power draw (and corresponding performance) of the processor(s) 106 and/or associated SoC. This power limitation may affect the clock speed of the processor(s) 106.

As another example, the low power operations controller 130 may adjust an energy performance preference (EPP) parameter to define how the operating frequencies and/or voltages of components of the computing device 102 are to be dynamically selected and/or tuned in response to relevant data transfers (e.g., file I/O from memory based on the presence and/or engagement of the user 104. The EPP parameter defines whether (1) preference is given to performance efficiency (e.g., higher performance and corresponding higher power consumption), (2) preference is given to power efficiency (e.g., lower power at the cost of some level of performance), or (3) performance efficiency and power efficiency are to be relatively balanced.

As another example, the low power operations controller 130 may specify a different P-state cap parameter for the computing device 102 based on the presence and/or engagement of the user 104 (e.g., a higher P-state cap when a user is present and engaged than when the user is not present and/or not engaged). As used herein, the P-state cap defines a highest performance state (P-state) at which a processor may operate (e.g., the processor(s) 106 are prevented from operating at higher P-states than the P-state cap).

As another example, the low power operations controller 130 may adjust a background activity manager (BAM) parameter to control the degree to which a background activity manager limits or throttles background activity based on the presence and/or engagement of the user 104 (e.g., reduce and/or prevent background activity when the user is present and actively engaged).

As another example, the low power operations controller 130 may adjust or tune parameters (e.g., latency response time, device idle timeout, etc.) affecting the speed and/or responsiveness of the wireless communication circuitry 120 based on the presence and/or engagement of the user 104 (e.g., increase responsiveness (with some cost to power savings) when the user is present and actively engaged and reduce responsiveness when the user is neither present nor engaged). Further, in some examples, low power operations controller 130 may distinguish between data traffic over the wireless communication circuitry 120 associated with a user-initiated action (e.g., in a foreground application) from data traffic associated with a background task. In some such examples, the low power operations controller 130 may adjust or tune the quality of service (QoS) for the different types of traffic based on the presence and/or engagement of the user 104.

The PL parameter, the EPP parameter, the P-state cap, the BAM parameter, and the wireless communication parameters are collectively referred to herein as performance parameters. In some examples, different values for one or more of the different performance parameters set and/or adjusted by the low power operations controller 130 may be collectively defined in connection with different operation modes for the computing device 102. In some such examples, the particular operation mode implemented at any given point in time is based on the user presence and/or engagement determined from an analysis of the image data generated by the image sensor 122.

More particularly, in some examples, the low power operations controller 130 may cause the computing device 102 to operate in an interactive mode in which performance efficiency is prioritized (e.g., optimized) over power efficiency to increase (e.g., maximize) the responsiveness of the wireless communication circuitry 120. The interactive mode is implemented when a user is present and actively using the computing device 102 (or at least was actively using the computing device 102 within a threshold period of time). As mentioned above, whether the user 104 is actively engaged is determined based on data obtained from the user input detection sensor(s) 116 indicating when the user 104 is interacting with a keyboard, mouse, touchscreen, and/or other human machine interface associated with the computing device 102. In some examples, the low power operations controller 130 causes the computing device 102 to remain in the interactive mode when the user 104 is no longer actively interacting with the computing device so long as the user 104 remains present and at least passively engaged with (e.g., looking at) the computing device 102 and there is significant central processing unit (CPU) activity (e.g., above a threshold) such as when the user 104 is watching a streaming video or photo editing.

Prioritizing for performance in the interactive mode ensures that the user experience (when a user is actually present and interacting with the computing device 102) is improved (e.g., maximized). In some examples, the low power operations controller 130 suppresses tasks associated with background applications from executing (e.g., scheduled IT maintenance tasks) while the system is operating in the interactive mode so that such tasks do not impact the experience of the user (e.g., do not interfere with operation of a foreground application). In some examples, only certain background tasks may be suppressed. For instance, if the speed or responsiveness of wireless communication circuitry 120 is of particular importance, the low power operations controller 130 may suppress background tasks that rely on the operation of the wireless communication circuitry 120 (e.g., downloading an update to software and/or firmware) while other background tasks are permitted to proceed.

In some examples, the user 104 may be present and actively engaged in the operation of the computing device 102 but not actively using the wireless communication circuitry 120. In such situations, while the interactive mode serves to improve the performance of other components of the computing device 102, the increase in power usage associated with the interactive mode with respect to the wireless communication circuitry is wasted. Accordingly, in some examples, the low power operations controller 130 causes the wireless communication circuitry 120 to switch between active and idle modes as separate sub-modes within the interactive mode that are specific to the wireless communication circuitry 120. More particularly, the active mode of the wireless communications circuitry 120 corresponds to when there is network traffic (e.g., data being transmitted or received via the wireless communication circuitry 120). During the active mode, a watchdog timer is armed to count a threshold period of time (e.g., 1 second, 2 second, 5 seconds, 10 seconds, etc.) of no wireless transmit or receive activities in queue. If the timer elapses with no further traffic data, the wireless communication circuitry 120 switches to the idle mode. The idle mode is a lower power mode than the active mode that does not prioritize performance over power efficiency. In some examples, performance efficiency is balanced against power efficiency during the idle mode. In some examples, power efficiency may be prioritized over performance efficiency. In some examples, the wireless communication circuitry 120 remains in the idle mode of the interactive mode until there is either a new transmit queue activity or a new receive queue activity, whereupon the low power operations controller 130 causes the wireless communication circuitry 120 to revert back to the active mode and to arm the timer again. In some examples, the switching of the wireless communication circuitry 120 between the active mode and the idle mode within the interactive mode is handled by the wireless circuitry driver 114 independent of the low power operations controller 130.

In some examples, the low power operations controller 130 may cause the computing device 102 (including the wireless communication circuitry 120) to switch from the interactive mode to a balanced mode in which performance efficiency is balanced against power efficiency (e.g., when neither performance nor power are significantly prioritized over the other). In some examples, the balanced mode is employed when the user 104 is present but not actively engaged with the operation of the computing device 102. That is, the balanced mode may be implemented when the user 104 is not engaged at all (e.g., reading paper documents apart from the computing device 102 and/or otherwise looking in a direction other than the computing device 102) or when the user is only passively engaged (e.g., looking at the computing device 102 but not actively interacting with it via a keyboard, mouse, touchscreen, a microphone, etc.). In some examples, when the user 104 is passively engaged with the computing device 102, the balanced mode may be implemented only when there is relatively low CPU activity (e.g., below a threshold) such as when the user is reading text rendered on the display screen 118. When there is relatively high CPU activity, the low power operations controller 130 may cause the computing device 102 to switch to the interactive mode as noted above. Additionally or alternatively, in some examples, the balanced mode is also employed when the user is not present but there is an indication of an ongoing (passive) engagement with or interest in the operation of the computing device 102 based on an ongoing user-initiated task being executed (e.g., a compiler is running). In some examples, as with the interactive mode, the low power operations controller 130 may suppress background tasks from executing (at least those that rely on the wireless communication circuitry 120) while the system is operating in the balanced mode so as not to impact the performance of the wireless communication circuitry 120.

The balanced mode is a lower power mode than the interactive mode. While the reduction in power consumption during the balanced mode may result in a reduction in performance efficiency, such a reduction is unlikely to negatively impact user experience because the user is either not present or not engaged with the computing device 102 in a manner to notice the effect on performance. While the balanced mode is a lower power mode than the interactive mode when considering the computing device as a whole, this is not necessarily the case with respect to the wireless communication circuitry 120 in particular. That is, the power consumed by the wireless communication circuitry 120 in the balanced mode may be less than, greater than, or equal to the power consumed by the wireless communication circuitry 120 during the idle mode of the interactive mode for the computing device 102 discussed above. However, the power consumed by the wireless communication circuitry 120 in the balanced mode is at least less than the power consumed by the wireless communication circuitry 120 during the active mode of the interactive mode for the computing device 102 discussed above.

In some examples, when no user is present and there are no scheduled user-initiated tasks, the low power operations controller 130 causes the computing device 102 to enter a quiet mode that prioritizes power efficiency over performance efficiency. This quiet mode is a lower power mode than the balanced mode. Thus, in some examples, the power consumed by the wireless communication circuitry 120 in the quiet mode is less than the power consumed by the wireless communication circuitry 120 in the balanced mode. In some examples, the power consumed by the wireless communication circuitry 120 in the idle mode of the interactive mode of the computing device 102 is approximately equal to the power consumed by the wireless communication circuitry 120 in the quiet mode. In other examples, the wireless communication circuitry 120 consumes more power during the idle mode of the interactive mode of the computing device 102 than in the quiet mode. Regardless of the particular operation mode, the wireless communication circuitry 120 operates with sufficient power to be able to receive and respond to incoming traffic data from a third party.

In some examples, background tasks that are suppressed during the interactive and balanced modes are permitted to be completed during the quiet mode. Suppressing such background tasks until the quiet mode when the user has no specific interest in the operation of the computing device 102 enables the performance of the computing device 102 to be enhanced (e.g., optimized) for the user-initiated tasks of particular interest to the user during the interactive and balanced modes.

In some examples, when there are no scheduled tasks (either user-initiated tasks or background tasks), the low power operations controller 130 may cause the computing device 102 to enter a standby mode. The standby mode is a lower power mode than the quiet mode in which power consumption is reduced (e.g., minimized) to no more than necessary to retain the computing device 102 in a state that can be quickly activated to any one of the other modes when there are additional tasks to be performed and/or when a user is again determined to be present. In some examples, the power consumed by the wireless communication circuitry 120 in the standby mode is the same as the power consumed by the wireless communication circuitry 120 in the quiet mode.

Figure 2:
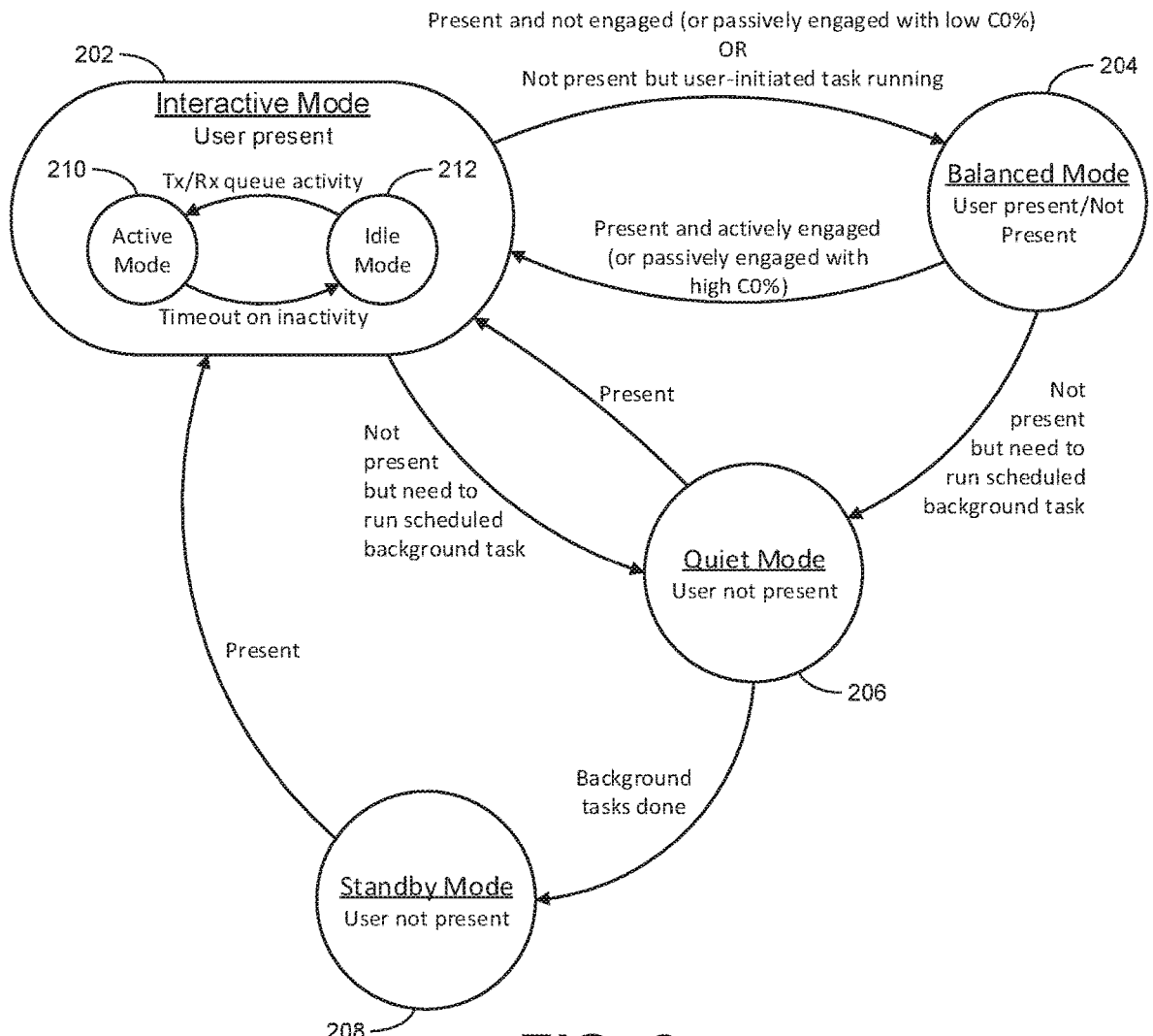
FIG. 2 illustrates an example machine state diagram outlining the different operation modes for the example computing device of FIG. 1 and the associated example wireless communication circuitry of FIG. 1.

FIG. 2 is an example machine state diagram outlining the different operation modes for the computing device 102 of FIG. 1 and the associated sub-modes for the wireless communication circuitry 120 within the interactive mode. As represented in the illustrated example, the computing device 102 may switch between an example interactive mode 202, an example balanced mode 204, an example quiet mode 206, and an example standby mode 208. The low power operations controller 130 switches the computer device 102 (and the associated wireless communication circuitry 120) to the interactive mode 202 when a user 104 is determined to be present. As discussed above, in some examples, user presence is determined based on data from the user input detection sensor(s) 116 indicating the user is actively interacting with the computing device 102 via a keyboard, mouse, touchscreen, or other human machine interface. Additionally or alternatively, user presence is determined based on an analysis of image data generated by the image sensor 122. Within the interactive mode 202 of the computing device, the wireless communication circuitry 120 may switch between an active mode 210 (when there is ongoing wireless data traffic) and an idle mode 212 (following a timeout period of no wireless data traffic). The low power operations controller 130 may switch the computing device 102 (and the associated wireless communication circuitry 120) to the balance mode 204 when the user is present but not engaged with the computing device 102 or present but only passively engaged and the CPU activity is relatively low (e.g., below a threshold). Additionally or alternatively, the low power operations controller 130 switches the computing device 102 (and the associated wireless communication circuitry 120) to the balance mode 204 when the user is not present but there is an ongoing user-initiated task to be executed. When the user is not present and there are background tasks (e.g., tasks other than user-initiated tasks) to be executed, the low power operations controller 130 switches the computing device 102 (and the associated wireless communication circuitry 120) to the quiet mode 206. Finally, when the user is not present and there are no background tasks to be executed (or such tasks have been completed), the low power operations controller 130 switches the computing device 102 (and the associated wireless communication circuitry 120) to the standby mode 208. In some examples, the transition from the quiet mode 206 and the standby mode 208 has no effect on the wireless communication circuitry 120 because the power state of the wireless communication circuitry 120 is the same in each mode 206, 208.

Figure 3:
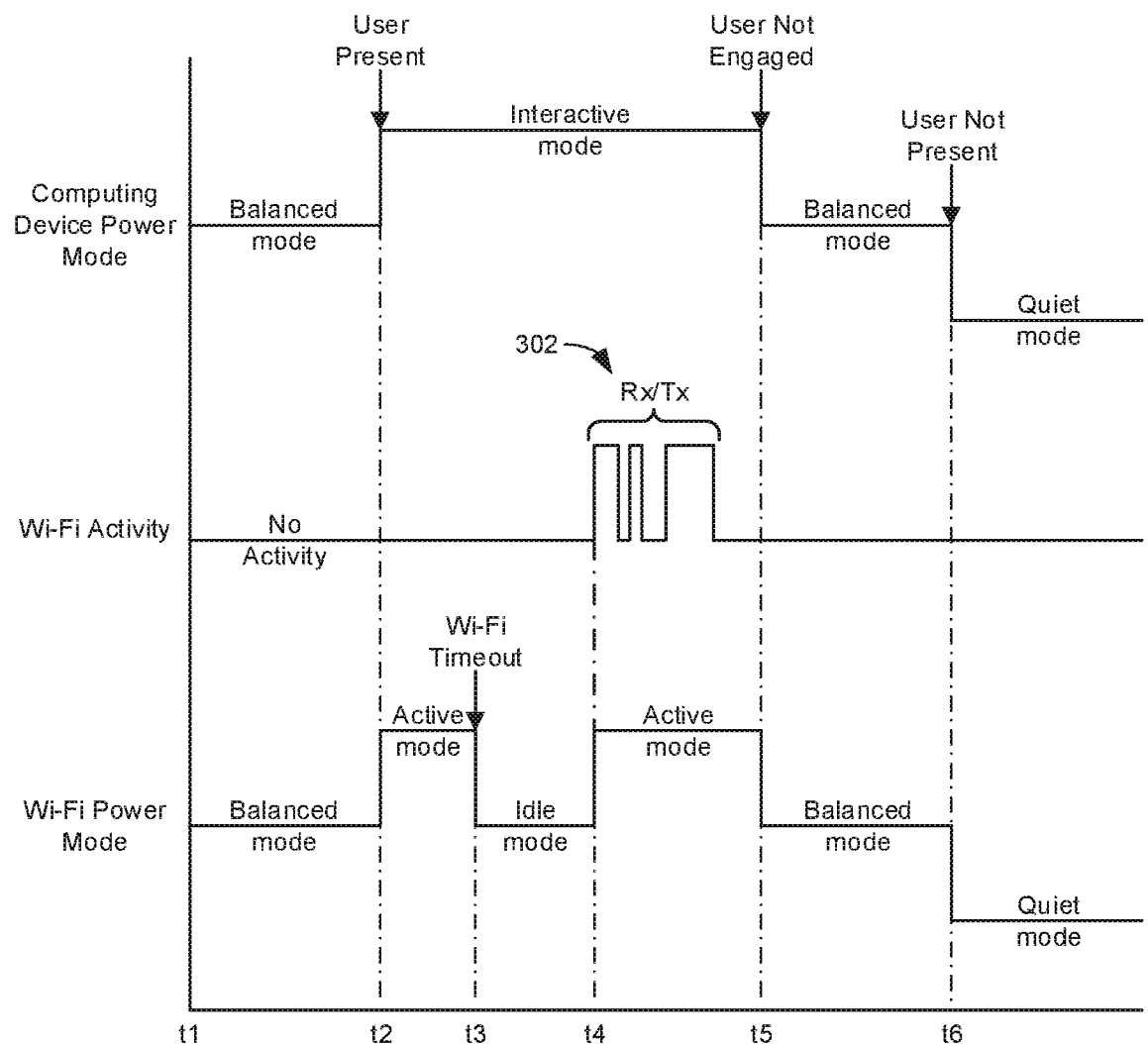
FIG. 3 illustrates an example flow of transitions between different operation modes for the example computing device of FIG. 1 and for the associated wireless communication circuitry of FIG. 1.

FIG. 3 illustrates an example flow of transitions between different power states for the example computing device 102 of FIG. 1 and for the associated wireless communication circuitry 120 of FIG. 1. In the illustrated example, the example computing device 102 begins (at time t1) in the balanced mode 204. As such, the example wireless communication circuitry 120 is also in the balanced mode 204. At a second point in time (time t2), the example low power operations controller 130 detects the presence of the user 104. Based on the presence of the user 104, the example low power operations controller 130 causes the example computing device to switch to the interactive mode 202. As described above, the example wireless communication circuitry 120 may operate in either of two different sub-modes including the active mode 210 and the idle mode 212. As shown in the illustrated example of FIG. 3, when the example computing device 102 first transitions to the interactive mode 202 (at time t2), the example wireless communication circuitry 120 switches to the active mode 210. However, in the illustrated example, at this point in time, there is no data being transmitted or received via the example wireless communication circuitry 120. Thus, at time t3, the time period associated the watchdog timer for the example wireless communications active mode 210 elapses, whereupon the wireless communication circuitry 120 reduces power to operate in the idle mode 212. In the illustrated example, of FIG. 3, the idle mode 212 of the wireless communication circuitry 120 operates with the same power as when the wireless communication circuitry 120 is operating in the balanced mode 204.

At a later point in time (at time t4), while the example computing device is still operating in the interactive mode 202, data traffic 302 is detected for the example wireless communication circuitry 120. Accordingly, the example wireless communication circuitry 120, reverts back to the active mode 210. Although the data transmitted and/or received may not be continuous, the data traffic activity occurs at least more often than the timeout period such that the wireless communication circuitry 120 remains in the active mode 210 until time t5. At time t5, the example low power operations controller 130 determines that the user is no longer engaged in the operation of the example computing device 102. Accordingly, the example low power operations controller 130 causes the example computing device 102 to switch to the balanced mode 204 to conserve power. In conjunction with this transition, the example wireless communication circuitry 120 also switches to the balanced mode 204. Subsequently (at time t6), the example low power operations controller 130 determines that the user is no longer present and, therefore, causes the example computing device 102 and the associated example wireless communication circuitry 120 to switch to the quiet mode 206 to conserve additional power.

In some examples, the low power operations controller 130 that enables or facilitates the implementation of natural language based digital assistant (e.g., corresponding to a particular user-initiated application 110). More particularly, in some examples, the power operations controller 130 analyzes audio and/or associated audio data captured and/or generated by a microphone 146 to detect and understand (e.g., through natural language processing) dialogue spoken by the user 104 and to respond to particular queries spoken by the user 104. Thus, in some examples, the microphone 146 implements means for capturing audio. In some examples, the low power operations controller 130 receives the audio signals in substantially real-time (e.g., near the time the data is collected). In other examples, the low power operations controller 130 receives the audio signals at a later time (e.g., periodically and/or aperiodically) based on one or more settings but sometime after the audio signals were generated (e.g., seconds later, minutes later). In some examples, the low power operations controller 130 performs one or more operations on the audio signals such as filtering the raw audio signals and/or removing noise from the audio signals to generate audio data.

Many existing digital assistants monitor words spoken by users for a keyword prompt or wake phrase that triggers or activates the digital assistant to then capture and analyze a request or query spoken by a user following the keyword prompt. Once a keyword prompt has been detected, the user's query is provided (often with the keyword prompt) to a remote cloud server for processing. The cloud server analyzes the query to determine the nature of the user's request and to generate a suitable response. Typically, responses to queries generating by existing digital assistants are entirely dependent on how the user phrases the query following the keyword prompt because that is the only information that the digital assistant has available with which to generate the response.

Unlike existing digital assistants, the example low power operations controller 130 analyzes audio data that includes dialogue spoken by users on an ongoing (e.g., continuous) basis. That is, in some examples, the microphone 146 and the low power operations controller 130 operates in an always-on state to monitor the words spoken by the user 104. In some examples, to increase privacy and security, the always-on state of the microphone 146 and associated analysis of audio data by the example low power operations controller 130 may be toggled by a user. Further, in some examples, to increase privacy and security, the audio data is stored locally at the computing device 102 for a limited time. For instance, in some examples, the audio data is stored in memory (e.g., a circular buffer) in which only the dialogue captured during a rolling most recent period of time (e.g., most recent 2 minutes, 5 minutes, 10 minutes, etc.) is retained. Further, in some examples, the memory storing the audio data is implemented with security restrictions that prevent access to the audio data except in response to a specific query of the user 104 to a digital assistant. In some examples, the specific query is indicated based on the user 104 saying a particular keyword prompt as with other digital assistants. However, unlike other digital assistants, once the keyword prompt is detected, the example low power operations controller 130 retrieves the audio data associated with a most recent period of time that is stored in the memory to provide additional context or meaning to the particular query spoken by the user 104 following the keyword prompt. As a result, the query spoken by the user 104 can be simpler and more direct because relevant details and/or information needed to respond to the query may already be conveyed from the dialogue captured in the time period immediately preceding the keyword prompt. In other words, the digital assistant implemented by the example low power operations controller 130 is able to understand or be aware of the context of a conversation leading up to a specific query, thereby leading to an improved user experience.

For example, consider the situation where two people are planning a trip to Hawaii at the beginning of April. After discussing the trip for a period of time, one of the people may state the keyword prompt for a digital assistant and then pose the following query: "What would be the cost of flights there?" Existing digital assistants would be unable to give a meaningful response because the query does not indicate the destination of the flights or the time of year when the flights are planned (both factors of which can significantly impact the cost of flights). However, using speech data collected before the query was posed, the example low power operations controller 130 can attach meaning to the query to determine that the intended destination is Hawaii and that the time of year is early April.

In some examples, the low power operations controller 130 may perform some preprocessing or analysis on the audio data to reduce the amount of memory needed to store the data over a most recent rolling period of time. For instance, in some examples, the low power operations controller 130 analyzes the audio data to extract syllables and/or words spoken the user 104 and then store the syllables and/or words instead of the full audio. In some examples, both the extracted syllables and/or words and the full audio are stored. Additionally or alternatively, the example low power operations controller 130 implements voice recognition techniques to identify the specific individual that is speaking and/or to identify particular emotions with which the individual is speaking. As mentioned above, in some examples, the voice recognition analysis and/or the extraction of syllables and/or words is performed locally at the computing device 102 to avoid privacy concerns of transmitting entire conversations of the user 104 to a cloud server.

Further, in some examples, the low power operations controller 130 analyzes the audio data and/or the extract syllables and/or words to identify topics, themes, or ideas discussed in the dialogue represented by the audio data and/or extracted syllables and/or words. For instance, in the above example where two people were discussing a trip to Hawaii, specific topics identified by the example low power operations controller 130 may include topics including "Hawaii," "vacation," "flight," "early April," and any other relevant concepts that may be identified based on an analysis of the dialogue represented by the audio and/or extracted syllables and/or words. As discussed above, in some examples, the analysis to generate or identify topics associated with the audio is performed locally at the computing device 102 to maintain the privacy of the full conversation captured by the microphone 146. In some examples, the low power operations controller 130 generates the topics concurrently with the collection of the audio and associated syllables and/or words. Thus, in some examples, the identified topics are stored in the memory along with the audio (or audio data generated based on the captured audio) and/or the extracted syllables and/or words as the audio data is captured and stored. In such examples, new topics associated with more recent audio data may replace older topics associated with older audio data previously captured and analyzed. In other examples, the low power operations controller 130 analyzes the audio data to identify topics only after detecting a keyword prompt spoken by the user 104 in connection with a particular query directed to the digital assistant.

Whether the topics are identified on an ongoing basis with the ongoing collection of the audio or only in response to detecting a keyword prompt spoken by the user 104, once the keyword prompt is detected, the example low power operations controller 130 combines the identified topics with the user query captured following the keyword prompt. The topics may be used to give context and/or meaning to the user query. In some examples, the topics and the user query are transmitted to a cloud server to perform further analysis to understand the query and provide a suitable response as is done with existing digital assistants. However, the inclusion of the topics identified from the audio data associated with the ongoing dialogue of the user 104 before the keyword prompt can provide additional context for more meaningful responses than is possible for existing digital assistants. In some examples, the low power operations controller 130 may provide all topics identified in the most recent period of time for which audio data is still available to the cloud server. In other examples, low power operations controller 130 may select a subset of the identified topics based on a relevance to the particular query provided by the user following the keyword prompt.

For instance, assume that following the discussion of the trip to Hawaii in the above example, one of the people changes topics by commenting that they are hungry and proposes to order pizza. Following this statement, instead of asking for the cost of flights, the person says the keyword prompt for the digital assistant and the following query: "Is there a restaurant nearby to get some food?" Based on this fact pattern, in addition to the topics regarding Hawaiian vacations noted above, the low power operations controller 130 may identify the topics of "pizza" and "restaurant" as being associated with the audio data captured for the most recent period of time. A cloud server processing the user query along with all of the topics considered together, may infer that the user is specifically interested in Hawaiian pizza and, therefore, provide recommended restaurants that serve such styles of pizzas. However, in some examples, the low power operations controller 130 may analyze the user query in light of the previously captured conversation to determine that the topic of "Hawaii" is not relevant to the query about recommended restaurants. As such, the example low power operations controller 130 may omit the topic of "Hawaii" (as well as the topics: "vacation," "flight," "early April,") when providing the topics and user query to the could server for processing.

Further, in some examples, rather than providing the identified topics along with the original user query to a cloud server, the example low power operations controller 130 generates a modified query that incorporates the topics and transmits the modified query (without the specifically identified topics) to the cloud server for processing. For instance, using the example query, "What would be the cost of flights there?" and the associated topics of "Hawaii," "vacation," "flight," "early April," the low power operations controller 130 may generate the following new query: "What would be the cost of flights to Hawaii in early April?" (or dropping unnecessary search terms to become: "cost flight Hawaii early April"). In such examples, there is no longer a need to send the topics and the query because all relevant information is contained in the modified query. Accordingly, in such examples, the low power operations controller 130 transmits only the modified query to the cloud server.

In some examples, the low power operations controller 130 may use data from additional sources to further provide context for a particular user query. More particularly, in some examples, low power operations controller 130 analyzes the image data captured by the image sensor 122 when determining the context of a conversation captured by the microphone 146 during a most recently period of time. For instance, the example low power operations controller 130 may analyze faces of users to facilitate the identification of who is speaking and/or their emotional states. Further, in some examples, the low power operations controller 130 may analyze image data captured by the image sensor 122 to identify non-verbal indicators that provide context for what is spoken by the users. For instance, consider a scenario where people are discussing an insulated water bottle and one of the people holds up the water bottle while saying the keyword prompt for the digital assistant followed by the query: "find the specs for this." Based on the discussion of the water bottle before the keyword prompt, the example low power operations controller 130 may be able to provide enough context to determine the particular water bottle for this specifications were requested. However, to further assist in this determination, the example low power operations controller 130 may capture an image of the user holding up the water bottle to identify the particular water bottle of interest. In some examples, such an image is transmitted with the user query to the cloud server for processing and analysis.

Figure 4:
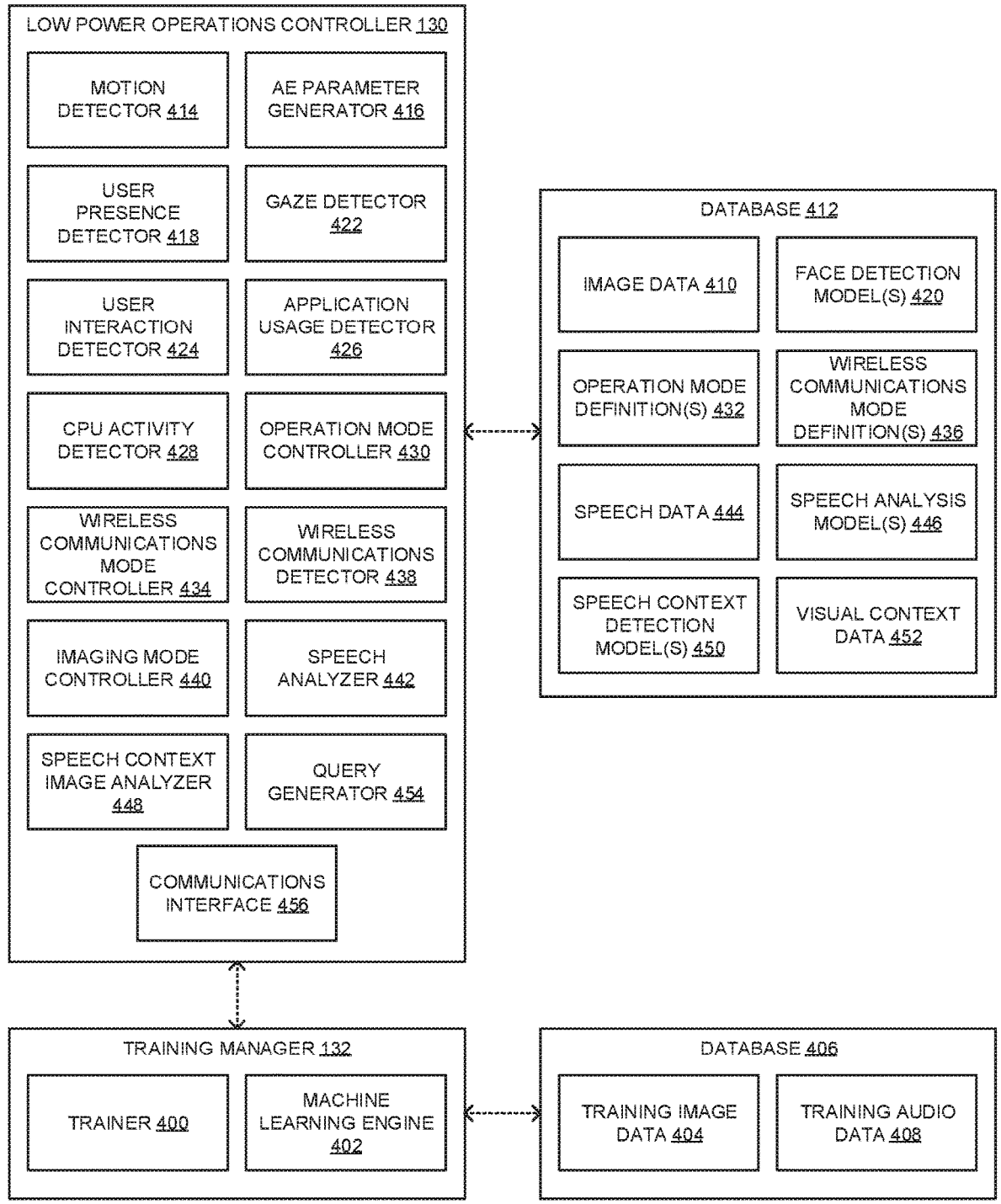
FIG. 4 is a block diagram of an example implementation of the example training manager and the example low power operations controller of FIG. 1.

FIG. 4 is a block diagram of an example implementation of the training manager 132 and the low power operations controller 130 of FIG. 1. The example training manager 132 of this example includes a trainer 400 and a machine learning engine 402. The example trainer 400 trains the machine learning engine 402 using training image data 404 (e.g., via supervised learning) to generate one or more model(s) that are used by the low power operations controller 130 to identify faces and/or facial features of a user of the computing device 102. The example training image data 404 can include historical image data for the user 104 and/or other subjects. In some examples, the training image data includes image data for a particular user 104. In other examples, the training image data 404 can include image data for a plurality of human subjects. In the example of FIG. 4, the training image data 404 is stored in a training database 406. In some examples, the training manager 132 includes the database 406. In other examples, the database 406 is located external to the training manager 132 in a location accessible to the training manager 132 as shown in FIG. 4. Additionally or alternatively, the example trainer 400 trains the machine learning engine 402 using training audio data 408 (e.g., via supervised learning) to generate one or more model(s) that are used by the low power operations controller 130 to detect speech, extract syllables and/or words from some speech, recognizes voices, and/or recognize emotion conveyed by the speech included in audio data captured by the microphone 146 of the computing device 102. The example training audio data 408 can include historical audio data for the user 104 and/or other subjects. In some examples, the training audio data includes audio data for a particular user 104. In other examples, the training audio data 408 can include image data for a plurality of human subjects. In the example of FIG. 4, the training audio data 408 is stored in the database 406.

As mentioned above, the example low power operations controller 130 is constructed to manage power consumption and performance of a computing device (e.g., the computing device 102 of FIG. 1) by adjusting performance parameters and/or to cause the computing device 102 to switch between different operation modes with set values for the performance parameters based on user presence and/or engage with the computing device. The example low power operations controller 130 receives image data 410 from the image sensor 122 (e.g., a user-facing camera) of the computing device 102 of FIG. 1. The image data 410 represents objects within the example imaging FoV 124 of the image sensor 122 shown in FIG. 1. As mentioned above, in some examples, the image sensor 122 of FIG. 1 is an always-on sensor and, thus, can generate image data when the computing device 102 is in a powered-on state. In some examples, the always-on nature of the image sensor 122 is such that the image sensor 122 remains on even when the computing device 102 is in a sleep mode. The example image sensor 122 can generate the image data 410, which may be low resolution (e.g., VGA) image data, at a rate of, for instance, 3 frames per second.

The image data 410 is stored in a database 412. In some examples, the low power operations controller 130 includes the database 412. In other examples, the database 412 is located external to the low power operations controller 130 in a location accessible to the low power operations controller 130 as shown in FIG. 4. The example databases 406, 412 of FIG. 4 may be the same storage device or different storage devices. In some examples, the databases 406, 412, as structures, are means for storing data.

The example database 412 of FIG. 4 stores data regarding the imaging FoV 124 and the viewing area 134 of the display screen 118. Data regarding the imaging FoV 124 and the viewing area 134 of the display screen 118 can be provided via user input(s) based on, for instance, manufacturing specifications for the image sensor 122 and the display screen 118 (e.g., viewing angle, field of view, etc.).

The example low power operations controller 130 of FIG. 4 includes a motion detector 414. The example motion detector 414 analyzes successive images of the image data 410 to identify meaningful changes in the images indicative of motion within the environment captured within the imaging FoV 124. The example low power operations controller 130 of FIG. 4 also includes an auto-exposure (AE) parameter generator 416 to determine auto-exposure parameters for the image data 410 as it is being analyzed by the example motion detector 418.

In some examples, when the motion detector 418 detects motion, the motion detector triggers the activation of an example user presence detector 418 of the low power operations controller 130. In some such examples, detection of motion also triggers the sharing of the auto-exposure parameters generated by the AE parameter generator 416 with the example user presence detector 418 to reduce any latency for the example user presence detector 418 to being analyzing the image data 410. In some examples, the user presence detector 418 analyzes the image data 410 using machine learning model(s) generated during training by the trainer 400. The machine learning model(s) include example face detection model(s) 420. In the example of FIG. 1, the face detection model(s) 420 are stored in the database 412. The example user presence detector 418 uses the face detection model(s) 420 to identify a presence of a user face in the imaging FoV 124.

The example low power operations controller 130 of FIG. 4 includes a gaze detector 422. In the example of FIG. 4, if the user presence detector 418 determines that the user 104 is present in the imaging FoV 124, the user presence detector 418 triggers the gaze detector 422 to analyze the image data 410 to determine a direction of gaze of the user 104 relative to the display screen 118. If the example user presence detector 418 determines that the user 104 is not in the imaging FoV 124, the user presence detector 418 refrains from instructing the gaze detector 422 to analyze the image data 410 to reduce power consumption, as the user presence detector 418 has already determined that the user 104 is not present relative to the computing device 102 of FIG. 1.

More particularly, the example gaze detector 422 analyzes the facial features of the user 104 in the image data 410 using the face detection model(s) 420 to determine the position of the user 104 within the viewing area 134 of the display screen 118, an angle of the user's gaze relative to the image sensor 122 and, thus, the user's gaze direction 136 and a corresponding user field of view 140. For example, the gaze detector 422 identifies facial feature(s) such as a mouth, nose, eye(s), and ear(s) of the user 104 in the image data 410 to determine whether the user 104 is facing the image sensor 122, looking at an angle relative to the image sensor 122, or facing opposite of the image sensor 122. Based on the angle of the user's face relative to the image sensor 122, the example gaze detector 422 determines whether the user is engaged in the operation of the computing device 102 based on whether the user is attentive or non-attentive to the display screen 118. For example, if the gaze detector 422 determines that the user 104 is facing the image sensor 122 and, thus, the display screen is within the user's field of view, the gaze detector 422 determines that the user 104 is attentive to the display screen 118 and, therefore, engaged (at least passively) in the operation of the computing device 102. If the example gaze detector 422 detects that a face of the user 104 is at an angle relative to the image sensor 122 and, thus, the display screen 118 is partially or completely removed from the user's field of view, the gaze detector 422 determines that the user is non-attentive with respect to the display screen 118 and, therefore, not engaged with the computing device 102.

The example low power operations controller 130 of FIG. 4 includes a user interaction detector 424 to analyze data generated by the user input detection sensor(s) 116 of FIG. 1 indicative of user interaction with the computing device 102 (e.g., via a keyboard, a mouse, a touchscreen, etc.). In the example of FIG. 4, if the user interaction detector 424 determines that the user 104 is interacting with the computing device 102, the user is assumed to be present and actively engaged with the computing device. Accordingly, in some such examples, the motion detector 414, the user presence detector 418, and the gaze detector 422 refrain from analyzing the image data 410 to conserve power while the user 104 is actively engaged with the computing device 102. In such examples, the image sensor 122 may still generate image data in connection with other user-initiated application(s) 110 installed on the computing device 102, such as a video conferencing application. However, where no user-initiated application(s) 110 need to the image sensor 122, the image sensor may refrain from generating the image data 410 while the user 104 is actively engaged with the computing device 102.

The example low power operations controller 130 of FIG. 4 includes an application usage detector 426. The example application usage detector 426 determines if any application(s) (e.g., user-initiated application(s) 110 and/or background application(s) 120) installed on the computing device 102 of FIG. 1 are in operation. In some examples, the application usage detector 426 determines that a user is engaged (at least passively) in the operation of the computing device 102 when a user-initiated application 110 is performing an ongoing user-initiated task. In some examples, this determination can be made independent of whether the user is present or absent and independent of whether the user is looking toward the display screen 118.

The gaze detector 422, the example user interaction detector 424, and the example application usage detector 426 are all collectively referred to herein as engagement detectors because they can each be used to determine the engagement of a user with the computing device 102. The example user interaction detector 424 determines active engagement when the user is actively interacting with the computing device 102. The example gaze detector 422 determines passive engagement when the user is looking toward the computing device 102 and determines disengagement when the user is not looking toward the computing device 102. The example application usage detector 426 determines passive engagement when an user-initiated task is ongoing on the computing device 102.

The example low power operations controller 130 of FIG. 4 includes an example CPU activity detector 428 to determine an amount of CPU activity of the computing device 102. In some examples, the amount of CPU activity can indicate the processing demands of the computing device are needed to provide a good user experience for a user who is not actively engaged with the computing device 102 (e.g., who is not actively interacting with the computing device 102 as determined by the user interaction detector 424). If the user is only passively engaged and the CPU activity is relatively low (e.g., below a threshold), then it may be possible to reduce the power consumed by the computing device 102 without appreciably impacting the experience of the user. However, if the CPU activity is relatively high (e.g., exceeds a threshold), then adjusting performance parameters to save power may be suppressed so as not to risk affecting the user's experience.

The example low power operations controller 130 of FIG. 4 includes an example operation mode controller 430 to identify one of a plurality of predefined operation mode definitions 432 stored in the database 412 for the computing device 426. In some examples, the operation mode controller 430 identifies a particular operation mode definitions 432 based on user presence and/or engagement determined by one or more of the user presence detector 418, the gaze detector 422, the user interaction detector 424, the application usage detector 426, and/or the CPU activity detector 428. In some examples, the different operation mode definitions 432 define particular settings for a set of performance parameters including, for example, a PL parameter, an EPP parameter, a P-state cap, a BAM parameter, and one or more wireless communication parameters. In some examples, the operation mode controller 430 identifies a particular operation mode definition 432 for implementation based on the current conditions relating to user presence and/or engagement that trigger the implementation of particular operation modes. For example, when a user 104 is present and the user 104 is actively engaged in the operation of the computing device, the computing device 102 is to operate according to an interactive mode (e.g., the interactive mode 202 of FIG. 2). Additional, in some examples, if the user 104 is only passively engaged in the computing device but the CPU activity satisfies (e.g., exceeds) a threshold, the computing device 102 may be set to operate in the interactive mode 202. When the user 104 is present but not engaged (or only passively engaged when the CPU activity does not satisfy the threshold), the operation mode controller 430 may set the computing device 102 to operate in a balanced mode (e.g., the balanced mode 204 of FIG. 2). Further, if the user 104 is not present but still passively engaged (e.g., there is a user-initiated task running), the computer device 102 may be implemented in the balanced mode 204. When the user 204 is not present and there are no user-initiated tasks running but there are background tasks to be executed, the operation mode controller 430 may switch the computing device 102 to a quiet mode (e.g., the quiet mode 206 of FIG. 2). When the user 204 is not present and not engaged, and there are no background tasks to be performed, the operation mode controller 430 may switch the computing device 102 to a standby mode (e.g., the quiet mode 208 of FIG. 2).

The example low power operations controller 130 of FIG. 4 includes an example wireless communications mode controller 434 to identify one of a plurality of predefined wireless communications mode definitions 436 for the wireless communication circuitry 120. In some examples, the wireless communications mode definitions 436 define particular settings for parameters affecting the responsiveness and/or power efficiency of the wireless communication circuitry 120 (e.g., latency response time, device idle timeout, QoS for background versus foreground (user-initiated) traffic, etc.). In some examples, the wireless communications mode definitions 436 are stored in the database 412. In some examples, the wireless communications mode controller 434 identifies a particular wireless communications mode definition 436 data traffic being transmitted and/or received by the wireless communication circuitry 120. In some examples, such data traffic is determined by an example wireless communications detector 438 that determines when there is activity in either the transmit queue or the receive queue for the wireless communication circuitry 120. In some examples, the wireless communications mode controller 434 identifies a particular wireless communications mode definition 432 for implementation based on the particular operation mode identified for the computing device 102 by the operation mode controller 430. For instance, in some examples, the wireless communications mode controller 434 sets the wireless communication circuitry to operate in a balanced mode or a quiet mode when the operation mode controller 430 respectively identifies the balanced mode 204 or the quiet mode 206 for implementation by the rest of the computing device 102. Additionally or alternatively, in some examples, the wireless communications mode controller 434 causes the wireless communication circuitry 120 to switch between different ones of the wireless communications mode while the computing device 102 is operating within a single operation mode. For instance, in some examples, when the computing device 102 is in the interactive mode, the wireless communication circuitry 120 may switch between an active mode (when the wireless communication detector 438 detects data traffic being transmitted or received) and an idle mode (when the wireless communication detector 438 does not detect any data traffic).

The example low power operations controller 130 of FIG. 4 includes an example imaging mode controller 440 to cause the image sensor 122 and the associated components of the low power operations controller 130 associated with processing image data to switch between different modes including a wake-on-motion mode, a streaming mode, and a pause mode. For purposes of brevity, the image sensor 122 and the associated components of the low power operations controller 130 associated with processing image data are collectively referred to herein as the imaging system. In some examples, the imaging mode controller 440 determines the particular mode for the imaging system based on user presence and/or engagement of a user 104 determined by one or more of the motion sensor 414, user presence detector 418, the gaze detector 422, the user interaction detector 424, the application usage detector 426, and/or the CPU activity detector 428. For instance, if no user 104 is detected as being present, there is no need to have the user presence detector 418 and the gaze detector 422 analyze the image data 410. Accordingly, in such examples, the imaging mode controller 440 causes the imaging system to switch to the wake-on-motion mode in which the motion detector 414 analyzes the image data 410 for motion. If motion is detected, the example imaging mode controller 440 causes the imaging system to switch to the streaming mode in which the user presence detector 418 determines whether the motion is indicative of a user. If a user is present, the imaging system remains in the streaming mode and the gaze detector determines the engaged of the user (based on the direction of gaze of the user). In some examples, if the user interaction detector 424 determines that the user 104 is actively interacting with the computing device 102 (e.g., is actively engaged), the example imaging mode controller 440 causes the imaging system to switch to the pause mode in which the motion sensor 414, user presence detector 418, and the gaze detector 422 are stopped from analyzing the image data 410 to conserve power. In some examples, the image sensor 122 may also stop capturing the image data 410 while the imaging system is in the pause mode.

Additionally or alternatively, in some examples, the imaging mode controller 440 causes the imaging system to switch to an off mode in response to user input data provided by the user input detection sensor(s) 116 indicating the image sensor 122 is to be turned off and prevented from capturing image data. Further, in some examples, the imaging mode controller 440 causes the imaging system to switch to a standard mode in response to a user-initiated application 110 that needs the image sensor 122 (e.g., a video conferencing application). In some examples, during the standard mode, the image sensor 122 captured images at full resolution and at a normal frame rate for the image sensor. Further, in some examples, the low power operations controller 130 passes the resulting image data generated by the image sensor 122 to a host processor (e.g., a main CPU) for processing of the image data.

The example low power operations controller 130 of FIG. 4 includes an example speech analyzer 442 to analyze audio data captured by the microphone 148 to generate speech data 444 using machine learning model(s) generated during training by the trainer 400. The machine learning model(s) include example speech analysis model(s) 446. In the example of FIG. 1, the speech analysis model(s) 446 are stored in the database 412. Further, in some examples, the speech data 444 is stored in the database 412. In some examples, the speech data 444 is stored in a secure memory location that overwrites the speech data after a certain period of time with newer speech data. In some examples, the speech data 444 includes the raw audio data captures by the microphone 148. In some examples, the speech data includes syllables and/or words extracted from speech detected from the raw audio data. Additionally or alternatively, the speech data 444 may include contextual information generated by the speech analyzer 442 based on an analysis of the audio data. For instance, in some examples, the speech data 444 includes an identity of a speaker and/or an emotion of the speaker determined based on a voice recognition analysis of the audio data. Further, in some examples, the speech data 444 includes topics, themes, concepts, and/or ideas discussed in the spoken words captured in the audio data.

In some examples, the speech analyzer 442 analyzes audio data captured by the microphone 148 to detect a keyword prompt spoken by a user 104 indicating the user desires to provide a verbal request or query to a digital assistant implemented by the computing device 102. In some examples, the speech analyzer 442 analyzes the user query following detection of the keyword prompt in connection with the topics identified from the audio data analyzed prior to detection of the keyword prompt to determine a meaning and/or give context to the user query.

The example low power operations controller 130 of FIG. 4 includes an example speech content image analyzer 448 to analyze image data (e.g., the image data 410) captured by the image sensor 122 to determine context associated with a speaker represented in the image data using machine learning model(s) generated during training by the trainer 400. The machine learning model(s) include example speech context detection model(s) 450. In the example of FIG. 1, the speech context detection model(s) 450 are stored in the database 412. The example speech content image analyzer 448 uses the speech context detection model(s) 450 to identify a speaker based on the face of the speaker (e.g., detected by the user presence detector 418 using the face detection model(s) 42). Additionally or alternatively, in some examples, the speech content image analyzer 448 uses the speech context detection model(s) 450 to identify non-verbal cues from the speaker (e.g., identify an object being held up by the speaker). In some examples, the results of the speech context detection model(s) 450 are stored as visual context data 452 in the database 412.

The example low power operations controller 130 of FIG. 4 includes an example query generator 454 to generate a query to be provided to a cloud server to process and generate a suitable response. In some examples, the query generator 454 determines a subset of the topics associated with the audio data to include with the user query based on a relevance of the topics to the query. In some examples, the query generator 454 may identify all topics for inclusion with the user query. In some examples, the query generator 454 causes the transmission of the original user query and the identified topics to the cloud server. In other examples, the query generator 454 generates a modified query based on the original user query that incorporates the relevant topics identified by query generator 454. In some examples, the query generator 454 causes the transmission of the modified user query to the cloud server without transmitting the original user query and/or without transmitting the identified topics. In some examples, the original user query, the identified topics, and/or the modified user query are transmitted by an example communications interface 456 of the low power operations controller 130. Thus, in some examples, the communications interface 456 implements means for transmitting data.

While an example manner of implementing the example training manager 132 is illustrated in FIG. 4, one or more of the elements, processes and/or devices illustrated in FIG. 4 may be combined, divided, re-arranged, omitted, eliminated and/or implemented in any other way. Further, the example trainer 400, the example machine learning engine 402, the example training database 406, and/or, more generally, the example training manager 132 may be implemented by hardware, software, firmware and/or any combination of hardware, software and/or firmware. Thus, for example, any of the example the example trainer 400, the example machine learning engine 402, the example training database 406 and/or, more generally, the example training manager 132 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example trainer 400, the example machine learning engine 402, and/or the example training database 406 is/are hereby expressly defined to include a non-transitory computer readable storage device or storage disk such as a memory, a digital versatile disk (DVD), a compact disk (CD), a Blu-ray disk, etc. including the software and/or firmware. Further still, the example training manager 132 of FIG. 4 may include one or more elements, processes and/or devices in addition to, or instead of, those illustrated in FIG. 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the example low power operations controller 130 of FIG. 1 is illustrated in FIG. 4, one or more of the elements, processes and/or devices illustrated in FIG. 4 may be combined, divided, re-arranged, omitted, eliminated and/or implemented in any other way. Further, the example database 412, the example motion detector 414, the example AE parameter generator 416, the example user presence detector 418, the example gaze detector 422, the example user interaction detector 424, the example application usage detector 426, the example CPU activity detector 428, the example operation mode controller 430, the example wireless communications mode controller 434, the example wireless communications detector 438, the example imaging mode controller 440, the example speech analyzer 442, the example speech content image analyzer 448, the example query generator 454, the example communications interface 456, and/or, more generally, the example low power operations controller 130 of FIG. 4 may be implemented by hardware, software, firmware and/or any combination of hardware, software and/or firmware. Thus, for example, any of the example database 412, the example motion detector 414, the example AE parameter generator 416, the example user presence detector 418, the example gaze detector 422, the example user interaction detector 424, the example application usage detector 426, the example CPU activity detector 428, the example operation mode controller 430, the example wireless communications mode controller 434, the example wireless communications detector 438, the example imaging mode controller 440, the example speech analyzer 442, the example speech content image analyzer 448, the example query generator 454, the example communications interface 456 and/or, more generally, the example low power operations controller 130 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 412, the example motion detector 414, the example AE parameter generator 416, the example user presence detector 418, the example gaze detector 422, the example user interaction detector 424, the example application usage detector 426, the example CPU activity detector 428, the example operation mode controller 430, the example wireless communications mode controller 434, the example wireless communications detector 438, the example imaging mode controller 440, the example speech analyzer 442, the example speech content image analyzer 448, the example query generator 454, and/or the example communications interface 456 is/are hereby expressly defined to include a non-transitory computer readable storage device or storage disk such as a memory, a digital versatile disk (DVD), a compact disk (CD), a Blu-ray disk, etc. including the software and/or firmware. Further still, the example low power operations controller 130 of FIG. 4 may include one or more elements, processes and/or devices in addition to, or instead of, those illustrated in FIG. 4, and/or may include more than one of any or all of the illustrated elements, processes, and devices.

Figure 5:
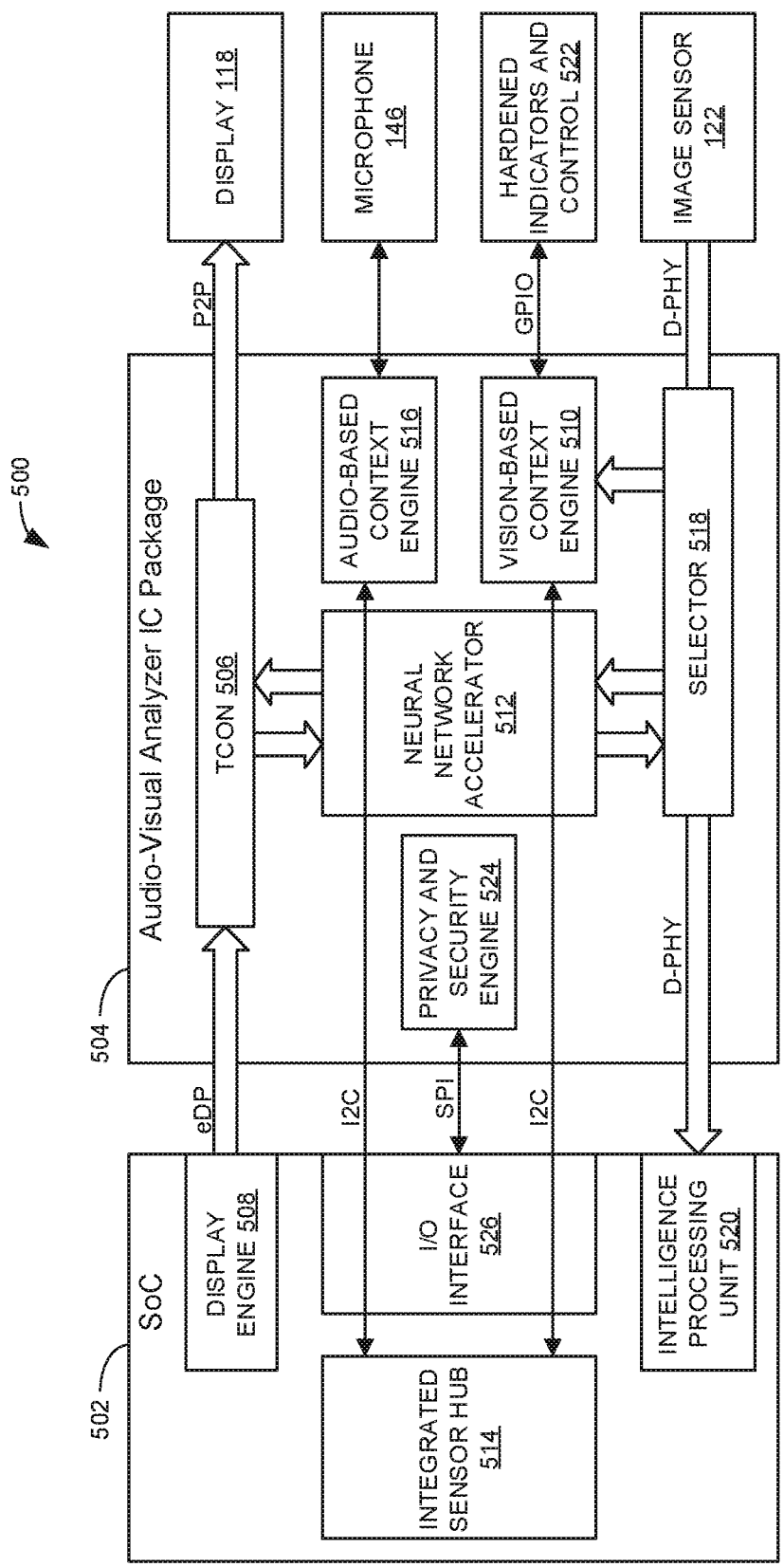
FIG. 5 is a schematic illustration of an example system to implement the computing device of FIG. 1.

FIG. 5 is a schematic illustration of an example system 500 to implement the computing device of FIG. 1. In this example, the system 500 includes a System-on-a-Chip (Soc) 502 and a companion die referred to herein as an audio-visual analyzer integrated circuit (IC) package 504. In some examples, the SoC 502 includes the one or more of the processor(s) 106 of FIG. 1 and the audio-visual analyzer IC package 504 includes other ones of the processor(s) 504. Specifically, in the illustrated example of FIG. 1, the SoC 502 includes a primary or host processor (e.g., a main CPU) of the system 500 and the audio-visual analyzer IC package 504 includes one or more other processors (e.g., the vision-based context engine 510 and the audio-based context engine 516) capable of operating with relatively little power to implement particular functions of the low power operations controller 130 disclosed herein. In some examples, the audio-visual analyzer IC package 504 includes processors and/or circuitry to handle operations associated with components in the lid of a laptop (e.g., a display, a user facing camera, a microphone, etc.). Thus, in some examples, the audio-visual analyzer IC package 504 includes a timing controller (TCON) 506 that communicatively couples a display engine 508 in the SoC 504 with the display screen 118. In some examples, the audio-visual analyzer IC package 504 is located in the lid of a laptop while the SoC 502 is located in the base of the laptop and the two components communicate through one or more hinges connecting the base and lid of the laptop. Of course, the audio-visual analyzer IC package 504 may be implemented in conjunction with the SoC 504 in other types of computing devices besides laptops (e.g., desktop computers, smartphones, tablets, etc.)

In some examples, the SoC 502 and the audio-visual analyzer IC package 504 perform different functions associated with the implementation of the low power operations controller 130 and/or the training manager 132 of FIGS. 1 and/or 4. More particularly, in some examples, the audio-visual analyzer IC package 504 includes a vision-based context engine 510 that implements the example motion detector 414, the example AE parameter generator 416, the example user presence detector 418, and the example gaze detector 422 to perform an initial analysis of image data generated by the image sensor 122 to determine whether a user is present and/or engaged with (e.g., looking at) the computing device 102. In the illustrated example, the audio-visual analyzer IC package 504 includes a neural network accelerator 512 to facilitate the execution of the face detection model(s) 420 used by the vision-based context engine 510 to determine the presence and/or engagement of the user. Further, in some examples, the audio-visual analyzer IC package 504 implements the imaging mode controller 432 to cause the image sensor 122 to switch between different modes based on the presence and/or engagement of the user.

Following the analysis of the image data, the example vision-based context engine 510 may transmit (e.g., via an I$^2$C serial bus) an indication of the determination of user presence and/or engagement to an integrated sensor hub (ISH) 514 of the SoC 502 for further processing (e.g., to identify an appropriate operation mode and to adjust corresponding performance parameters accordingly). Thus, in some examples, the SoC 504 implements the example operation mode controller 430 and the example wireless communications mode controller 434 to determine suitable operation modes for an associated computing device of the computing system 500 (e.g., the computing device 102 of FIG. 1) and also suitable sub-modes for the wireless communication circuitry 120.

Additionally, in some examples, the audio-visual analyzer IC package 504 includes an audio-based context engine 510 that implements the example speech analyzer 442 to analyze audio data generated by the microphone 148 for spoken words that can be stored (e.g., as syllables) along with particular topics associated with the spoken words in memory that retains such speech data for a most recent period of time. In some examples, the audio-based context engine 516 also analyzes the audio data to detect a keyword prompt spoken by the user 104 preceding a particular query statement to be processed by a digital assistant. In some examples, the audio-based context engine 516 may generate the topics associated with the dialogue represented by the audio data after detecting the keyword prompt. Once a keyword prompt has been detected, the audio-based context engine 516 transmits the audio data and/or associated syllables and/or words extracted from such data and the topics to the SoC 502 for further processing. Additionally or alternatively, in some examples, the audio-based context engine 516 transmits the audio data and/or associated syllables and/or words extracted without generating the topics. In some such examples, the SoC 502 analyzes the audio data to identify the topics associated with the captured dialogue. Thus, in some examples some functions of the speech analyzer 442 may be performed by the audio-visual analyzer IC package 504 while other functions of the speech analyzer 442 are performed by the Soc 504. In the illustrated example, the SoC 504 implements the example query generator 454 to prepare the audio data, associated syllables and/or words, and/or associated topics for transmission to a cloud server for further processing.

The example audio-visual analyzer IC package 504 is implemented as a separate die to the SoC 502 to be specifically designed to perform the vision-based analysis and audio-based analysis with relatively low power (e.g., around 10 mW or less) for an "always-on" implementation. Of course, in some examples, the user 104 may desire to use the image sensor 122 at full (e.g., standard) power when, for example the user 104 initiates an operation that involves the use of the image sensor 122 (e.g., for a video conferencing call). Thus, while the audio-visual analyzer IC package 504 is communicatively coupled between the image sensor 122 and the SoC 502 to enable the vision-based context engine 510 to perform the initial low power analysis of image data, the audio-visual analyzer IC package 504 includes an example selector 518 to forward the image data directly to an intelligence processing unit (IPU) 520 of the SoC 502 and bypass the vision-based context engine 510 and the neural network accelerator 512.

In addition to receiving image data, the example audio-visual analyzer IC package 504 may also receive hardened indicators and control inputs 522 via general purpose inputs/outputs (GPIOs) of the audio-visual analyzer IC package 504. Further, in some examples, the audio-visual analyzer IC package 504 includes a privacy and security engine 524 to maintain the security and/or integrity of the audio-visual analyzer IC package 504. In some such examples, the privacy and security engine 524 also communicates with the SoC 502 via an I/O interface 526 of the SoC 502.

Flowcharts representative of example hardware logic, machine readable instructions, hardware implemented state machines, and/or any combination thereof for implementing the example training manager 132 and/or the example low power operations controller 130 of FIGS. 1 and/or 4 are shown in FIG. 6-11. The machine readable instructions may be one or more executable programs or portion(s) of an executable program for execution by a computer processor and/or processor circuitry, such as the processor(s) 1212, 1312 shown in the example processor platform(s) 1200, 1300 discussed below in connection with FIGS. 12 and 13. The program may be embodied in software stored on a non-transitory computer readable storage medium such as a CD-ROM, a floppy disk, a hard drive, a DVD, a Blu-ray disk, or a memory associated with the processor(s) 1212, 1312, but the entire program and/or parts thereof could alternatively be executed by a device other than the processor(s) 1212, 1312 and/or embodied in firmware or dedicated hardware. Further, although the example programs are described with reference to the flowcharts illustrated in FIG. 6-11, many other methods of implementing the example training manager 132 and/or the example low power operations controller 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
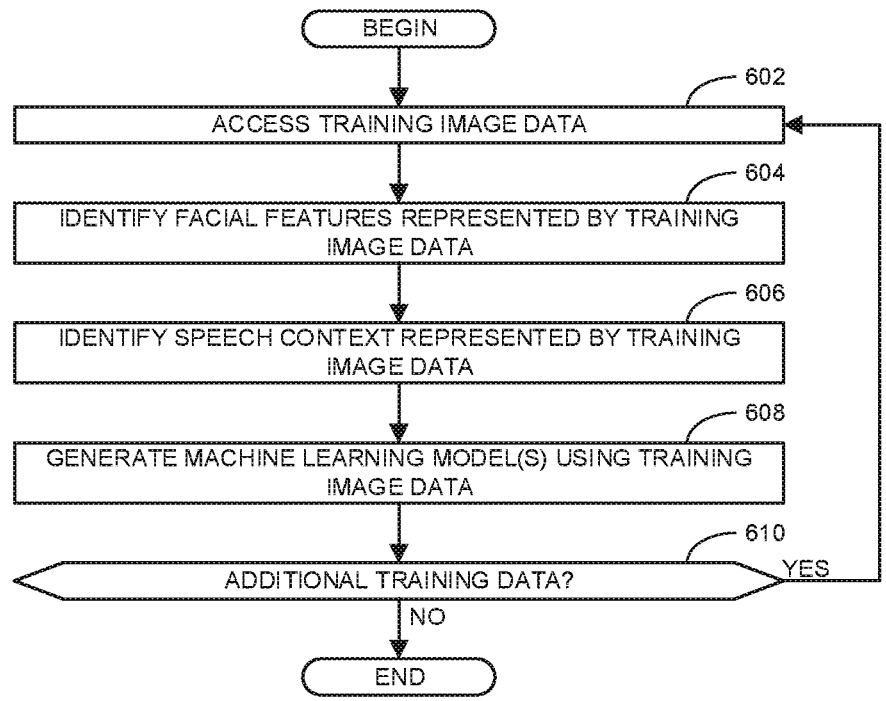
FIGS. 6 and 7 are flowcharts representative of example machine readable instructions that may be executed to implement the example training manager of FIGS. 1 and/or 4.

FIG. 6 is a flowchart representative of example machine readable instructions that, when executed, implement the example training manager 132 of FIGS. 1 and/or 4. In the example of FIG. 6, the training manager 132 trains the example low power operations controller 130 of FIGS. 1 and/or 4 using training image data 404. As disclosed herein, the example training manager 132 generates machine learning models that are used by the low power operations controller 130 of FIGS. 1 and/or 4 to control the performance and power consumption of the computing device 102 based on user presence and/or engagement with the device 102. Further, the example training manager 132 generates machine learning models that are used by the low power operations controller 130 of FIGS. 1 and/or 4 to determine a context of a speaker based on captured images of the speaker.

The example instructions of FIG. 6 can be executed by one or more processors of, for instance, the computing device 102, another computing device, and/or a cloud-based device. The example instructions of FIG. 6 can be executed in substantially real-time with the training image data being received by the training manager 132 or at some time after the training image data is received by the training manager 132. The example training manager 132 can communicate with the low power operations controller 130 via one or more wired or wireless communication protocols.

The example program of FIG. 6 begins at block 602 where the example trainer 400 accesses training image data 404. The training image data 404 can be stored in the training database 406. In some examples, the training image data 404 is generated for one or more users of the computing device 102. In some such examples, the training image data 404 can be received from the low power operations controller 130 and/or directly from the image sensor 122 of the computing device 102. In some other examples, the training image data 404 is generated for people who are not user(s) of the computing device 102.

At block 604, the example trainer 400 identifies facial features represented by the training image data 404. As an example, based on the training image data 404, the trainer 400 identifies facial features such as the nose, ears, mouth, forehead, etc. At block 606, the example trainer 400 identifies contextual features associated with a speaker represented by the training image data 404. As an example, based on the training image data 404, the trainer 400 identifies gestures and/or other non-verbal cues of a speaker (e.g., holding up an object, pointing to an object, etc.) to provide context regarding the subject matter that the speaker is discussing. At block 608, the example trainer 400 generates one or more machine learning model(s) (e.g., the face detection model(s) 420 and/or the speech context detection model(s) 450) via the machine learning engine 402 and based on the training image data 404 defining user presence and/or engagement based on detected facial features and/or giving context to the intent of a speaker. For example, the trainer 400 uses the training image data 404 to generate the face detection model(s) 420 that are used by the low power operations controller 130 to determine whether a user (e.g., the user 104) is present in the imaging FoV 124 and/or is looking at (engaged in) the content rendered on the display screen 118. Similarly, the trainer 400 uses the training image data 404 to generate the speech context detection model(s) 450 that are used to identify who is speaking are or to generate contextual information indicative of what a speaker is speaking about (e.g., based on non-verbal cues and/or gestures).

The example trainer 400 can continue to train the low power operations controller 130 using different datasets and/or datasets having different levels of specificity. Accordingly, at block 610, the example trainer 400 determines whether there is additional training image data 404. If so, control returns to block 602 to repeat the process. For example, the trainer 400 can generate a first face detection model 420 to determine if the user is present in the imaging FoV 124 and a second face detection model 420 to determine if the user's face is turned to the right or left of the image sensor 122. Additionally or alternatively, the trainer 400 can generate a first speech context detection 450 to identify a particular speaker and/or an emotion of a speaker and a second speech context detection 450 to identify non-verbal cues of the speaker. If there is no additional training data, the example process end.

Figure 7:
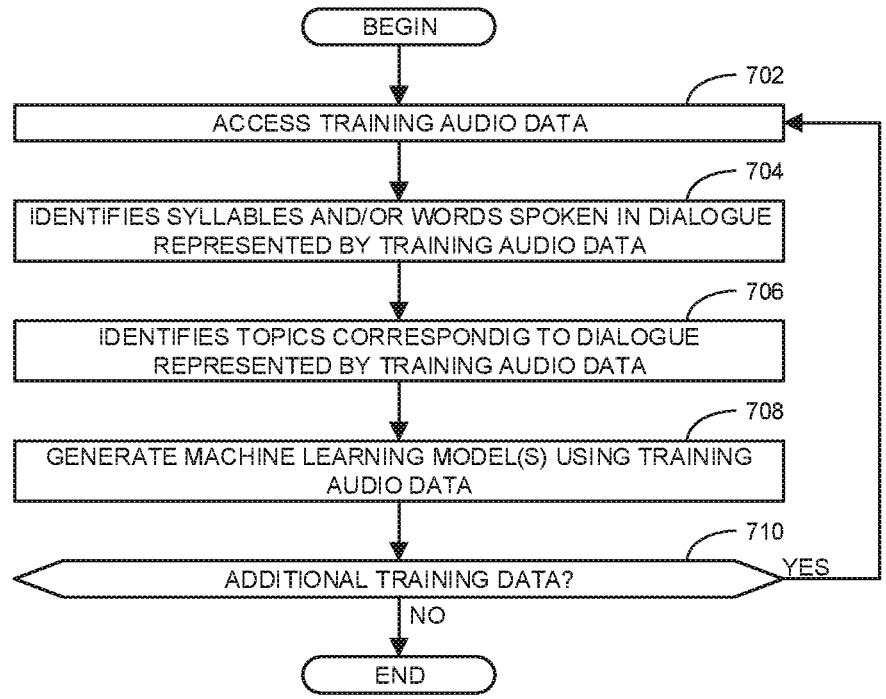

FIG. 7 is a flowchart representative of example machine readable instructions that, when executed, implement the example training manager 132 of FIGS. 1 and/or 4. In the example of FIG. 7, the training manager 132 trains the example low power operations controller 130 of FIGS. 1 and/or 4 using training audio data 408. As disclosed herein, the example training manager 132 generates machine learning models that are used by the low power operations controller 130 of FIGS. 1 and/or 4 to gather contextual information for improved responses generated by a digital assistant to verbally spoken user queries.

The example instructions of FIG. 7 can be executed by one or more processors of, for instance, the computing device 102, another computing device, and/or a cloud-based device. The example instructions of FIG. 7 can be executed in substantially real-time with the training audio data 408 being received by the training manager 132 or at some time after the training audio data is received by the training manager 132. The example training manager 132 can communicate with the low power operations controller 130 via one or more wired or wireless communication protocols.

The example program of FIG. 7 begins at block 702 where the example trainer 400 accesses training audio data 408. The training audio data can be stored in the training database 406. In some examples, the training audio data is generated for one or more users of the computing device 102. In some such examples, the training audio data can be received from the low power operations controller 130 and/or directly from the microphone 146 of the computing device 102. In some other examples, the training audio data is generated for people who are not user(s) of the computing device 102.

At block 704, the example trainer 400 identifies syllables and/or words spoken in dialogue represented by the training audio data. At block 706, the example trainer 400 identifies topics corresponding to the dialogue represented by the training audio data. At block 708, the example trainer 400 generates one or more machine learning model(s) (e.g., the speech analysis model(s) 446) via the machine learning engine 402 and based on the training audio data. For example, the trainer 400 uses the training audio data to generate the speech analysis model(s) 446 that are used by the low power operations controller 130 to generate speech data 444 including extracted syllables and/or words included in spoken dialogue and to identify topics associated with such spoken words.

The example trainer 400 can continue to train the low power operations controller 130 using different datasets and/or datasets having different levels of specificity. Accordingly, at block 708, the example trainer 400 determines whether there is additional training audio data. If so, control returns to block 702 to repeat the process. If there is no additional training data, the example process end.

Figure 8:
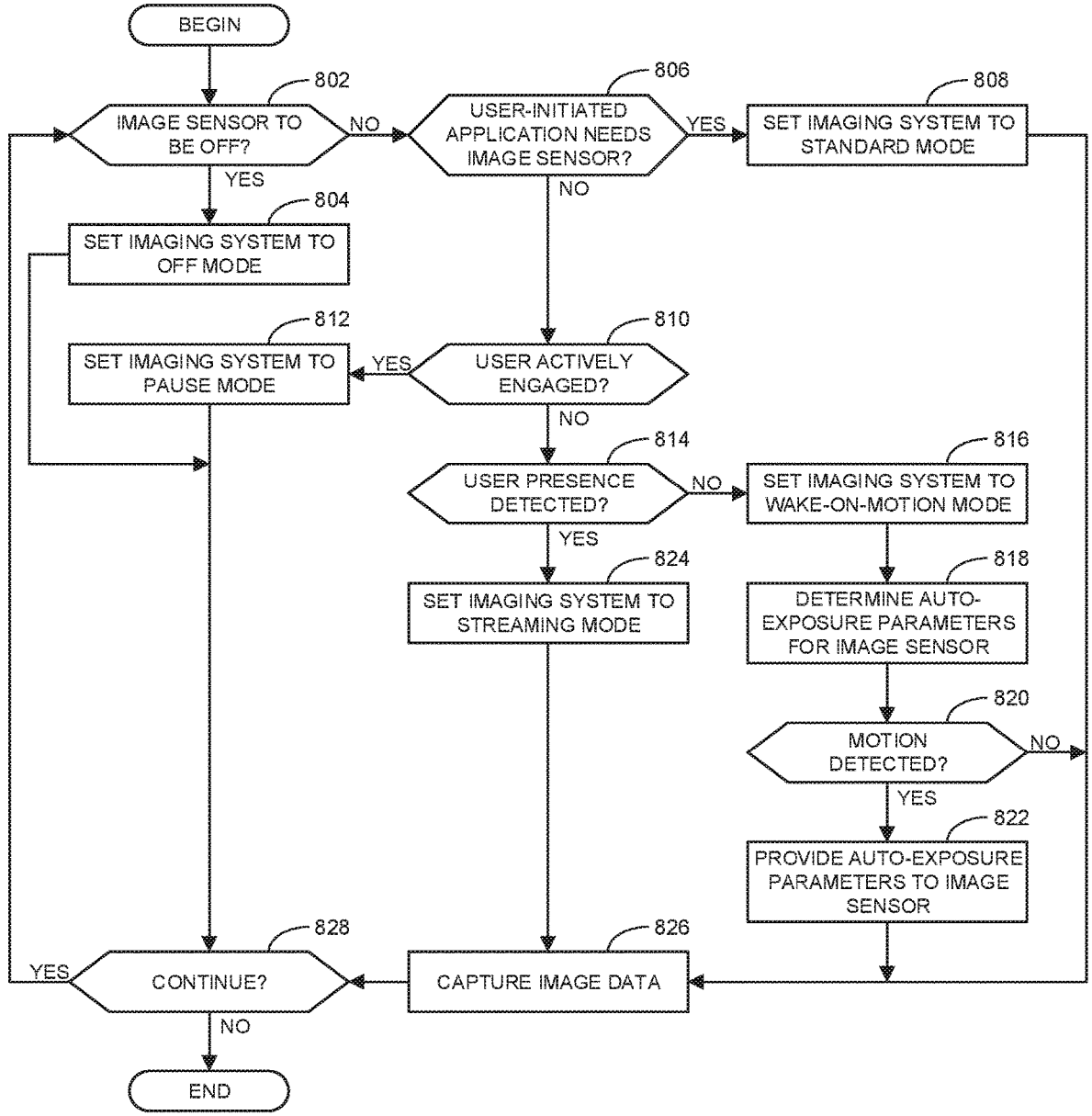
FIGS. 8-11 are flowcharts representative of example machine readable instructions that may be executed to implement the example low power operations controller of FIGS. 1 and/or 4.
Figure 9:
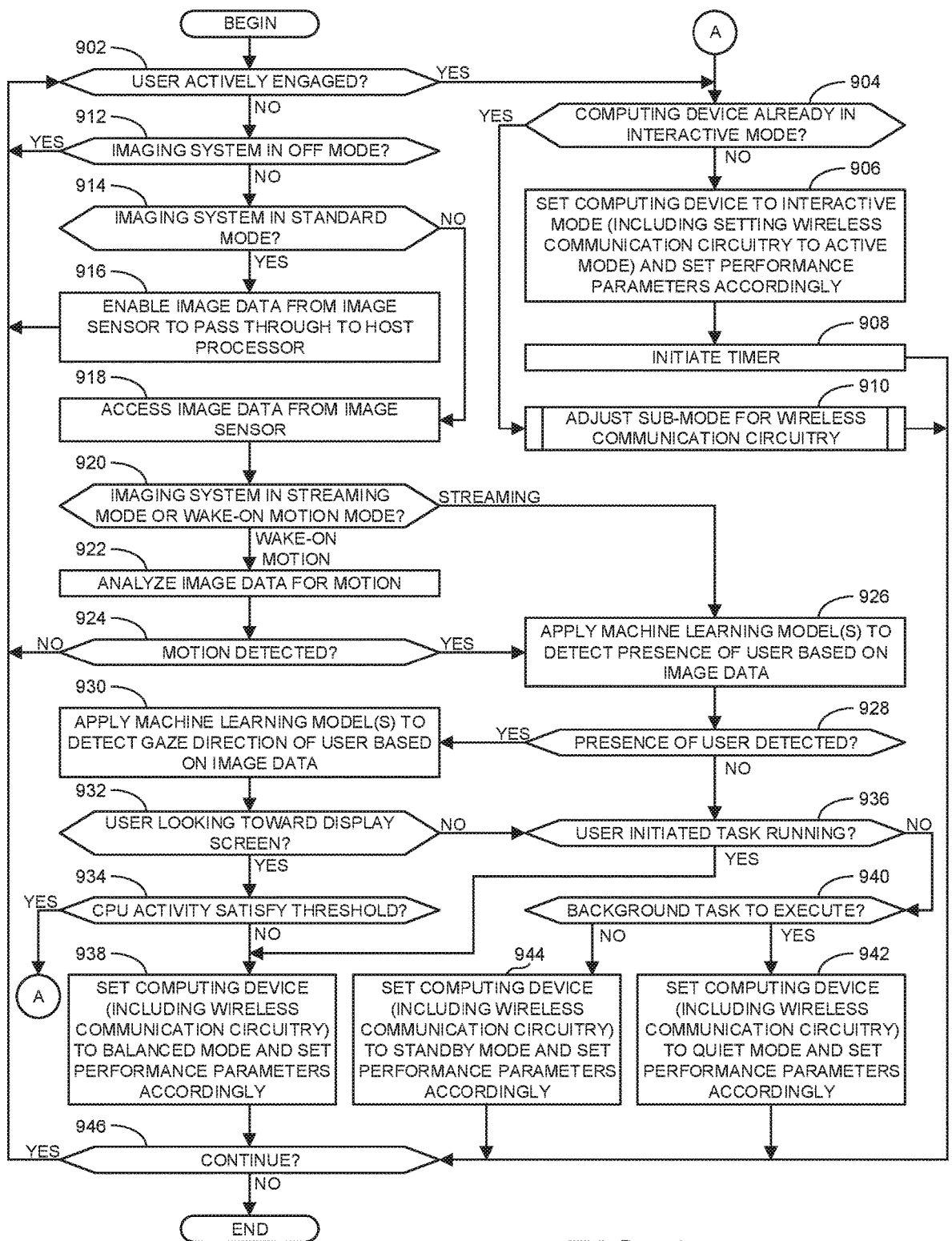

FIG. 8 is a flowchart representative of example machine readable instructions that, when executed by a processor, implement the example low power operations controller 130 of FIGS. 1 and/or 4. In the example of FIG. 8, the low power operations controller 130 generates instruction(s) to switch the image sensor 122 between different based on a presence and/or engagement of a user (e.g., the user 104). The determination of the presence and engagement of the user 104 may be executing the example machine readable instructions of FIG. 9. Thus, in some examples, the flowcharts of FIGS. 8 and 9 are implemented in parallel. The example instructions of FIG. 8 can be executed by one or more processors of, for instance, the computing device 102, another user device, and/or a cloud-based device. As mentioned above, in some examples, at least some of the instructions of FIG. 8 are executed by a processor operating in a low power mode, such as the vision-based context engine 510 of the audio-visual analyzer IC package 504 of FIG. 5, to reduce power consumption in processing and analyzing the image data. The example instructions of FIG. 8 can be executed in substantially real-time as the image sensor 122 generates image data and/or as a user interacts with the computing device 102.

The example program of FIG. 8 begins at block 802 where the example user interaction detector 424 determines whether the image sensor 122 is to be off. If so, control advances to block 804 where the example imaging mode controller 440 sets the imaging system (e.g., the image sensor 122 and the associated components of the low power operations controller 130 associated with processing image data) to an off mode. Thereafter, control advances to block 828 to determine whether to continue the process. If so, control returns to block 802. If, at block 802, the example user interaction detector 424 determines that the image sensor 122 is not to be off, control advances to block 806 where the example application usage detector 426 determines whether a user-initiated application (e.g., a video conferencing application) needs the image sensor 122. If so, control advances to block 808 where the example imaging mode controller 440 sets the imaging system to a standard mode. Thereafter, control advances to block 826 where the example image sensor 122 captures image data. In some examples, the standard mode corresponds to the image sensor 122 operating at full power to capture relatively high resolution images (e.g., at the capacity of the image sensor) and at the full (standard) frame rate (e.g., 30 fps). Accordingly, when the image sensor 122 captures the image data at block 826 in the standard mode, the image sensor 826 will be capturing relatively high resolution images at a relatively high frame rate.

Returning to block 806, if the example application usage detector 426 determines that the image sensor 122 is not needed by a user-initiated application, control advances to block 810. At block 810, the example user interaction detector 424 determines whether a user (e.g., the user 104) is actively engaged. That is, the example user interaction detector 424 determines whether the user is actively interacting with the computing device 102 (e.g., via a keyboard, mouse, touchscreen, etc.). If the user 104 is actively engaged, control advances to block 812 where the example imaging mode controller 440 sets the imaging system to a pause mode. In some examples, in the pause mode the image sensor 122 stops capturing images to generate new image data. Additionally or alternatively, in the pause mode the example motion detector 414, the example user presence detector 418, and the example gaze detector 422 stop processing image data generated by the image sensor 122. Stopping the operation of the image sensor 122 in generating image data and also stopping the processing of any such image data in this manner serves to conserve power. Thereafter, control advances to block 828 to determine whether to continue the process.

Returning to block 810, if the example user interaction detector 424 determines that the user 104 is not actively engaged, control advances to block 814 where the example user presence detector 418 determines whether the user presence is detected. In some examples, the determination of whether the user is present is made in conjunction with blocks 926 and 928 as described further below in connection with FIG. 9. If no user is present (e.g., no user was detected), control advances to block 816 where the example imaging mode controller 440 sets the imaging system to a wake-on-motion mode. At block 818, the example AE parameter generator 416 determines auto-exposure parameters for the image sensor 122. At block 820, the example motion detector 414 determines whether motion has been detected. If not, control advances to block 826 to capture image data. In some examples, at block 826, when the imaging system is set to the wake-on-motion mode of the imaging system, the image sensor 122 captures images at a relatively low resolution (e.g., VGA) and at a relatively low frame rate (e.g., 3 fps). Further, during the wake-on-motion mode, the example motion detector 414 analyzes the image data to monitor for motion. However, to conserve power, the example user presence detector 418 and the example gaze detector 422 are not analyzing the image data. If the motion detector 414 determines, at block 820, that motion has been detected, control advances to block 822 where the example AE parameter generator 416 provides the auto-exposure parameters (determined at block 818) to the user presence detector 418. The auto-exposure parameters are provided to the user presence detector 418 to reduce the latency time needed for the user presence detector 418 to determine whether a user is present (e.g., as determined at blocks 926 and 928 of FIG. 9). Once the auto-exposure parameters have been provided to the user presence detector 418, control advances to block 826.

Returning to block 814, if the example user presence detector 418 determines that the user is present (e.g., a user was detected at blocks 926 and 928 of FIG. 9), control advances to block 824. At block 824, the example imaging mode controller 440 sets the imaging system to a streaming mode. Thereafter, control advances to block 826 to capture image data. In some examples, at block 826, when the imaging system is set to the streaming mode of the imaging system, the image sensor 122 captures images at a relatively low resolution (e.g., VGA) and at a relatively low frame rate (e.g., 3 fps). Further, during the streaming mode, the example user presence detector 418 and the example gaze detector 422 analyze the image data to determine the presence and/or engagement of the user. However, the example motion detector 414 does not analyze the image data during the streaming mode. Thereafter, control advances to block 828 to determine whether to continue as discussed above. If the low power operations controller 130 determines not to continue, the example process of FIG. 8 ends.

FIG. 9 is a flowchart representative of example machine readable instructions that, when executed by a processor, implement the example low power operations controller 130 of FIGS. 1 and/or 4. In the example of FIG. 9, the low power operations controller 130 generates instruction(s) to cause an associated computing device (e.g., the computing device 102 of FIG. 1) to switch between different operation modes and/or, more particularly, to control particular performance parameters defining the operation of the computing device 102 based on a presence and/or engagement of a user (e.g., the user 104). The determination of the presence and engagement of the user 104 is based on the result of the analysis of image data generated by an imaging system, which may switch between different modes as outlined above in connection with FIG. 8. Thus, in some examples, the flowcharts of FIGS. 8 and 9 are implemented in parallel. The example instructions of FIG. 9 can be executed by one or more processors of, for instance, the computing device 102, another user device, and/or a cloud-based device. As mentioned above, in some examples, at least some of the instructions of FIG. 9 are executed by a processor operating in a low power mode, such as the visual-based context engine 510 of the audio-visual analyzer IC package 504 of FIG. 5, to reduce power consumption in processing and analyzing the image data. The example instructions of FIG. 9 can be executed in substantially real-time as the image sensor 122 generates image data and/or as a user interacts with the computing device 102.

The example program of FIG. 9 begins at block 902 where the example user interaction detector 424 determines whether a user (e.g., the user 104) is actively engaged. That is, the example user interaction detector 424 determines whether the user is actively interacting with the computing device 102 (e.g., via a keyboard, mouse, touchscreen, etc.). If a user is actively engaged with the computing device 102, the presence and engagement of the of the user 104 is inferred and there is no need to verify such using the imaging system. Accordingly, as discussed above in connection with blocks 810 and 812 of FIG. 8, the imaging system is set to the pause mode. Further, at block 904, the example operation mode controller 430 determines whether the computing device 102 is already in the interactive mode. If not, the example operation mode controller 430 sets the computing device 102 to an interactive mode (e.g., the interactive mode 202 of FIG. 2) and sets performance parameters accordingly. In the interactive mode, processor efficiency is prioritized over power efficiency to ensure that the user 104 (who is present and actively engaged) has a good user experience. Thus, in this example, when the computing device is initial switched to the interactive mode, the example operation mode controller 430 also sets the wireless communication circuitry 120 to the active mode. In some examples, in the active mode, the performance parameters for the wireless communication circuitry 120 are tuned to increase (e.g., optimize) the responsiveness of the wireless communication circuitry 120 to increase user experience. After switching the computing device 102 to the interactive mode, the example operation mode controller 430 initiates a timer (block 908). Thereafter, control advances to block 946.

Figure 10:
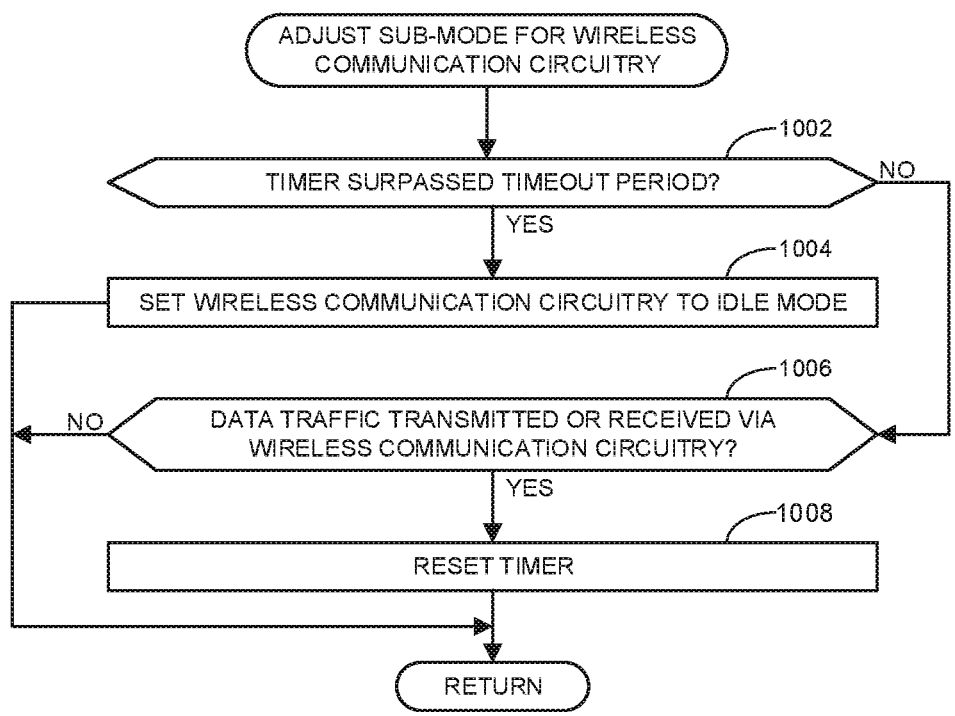

Returning to block 904, if the computing device 102 is already in the interactive mode, control advances to block 910 where the example wireless communications mode controller 434 adjusts the sub-mode for the wireless communication circuitry 120. That is, although the mode for the wireless communication circuitry 120 initially begins in the active mode when the computing device 102 switches to the interactive mode, there may be no need to consume the extra power associated with the active mode if the wireless communication circuitry 120 is not actually being used. Accordingly, in some examples, the wireless communications mode controller 434 may adjust the sub-mode for the wireless communication circuitry 120 based on the activity of traffic being transmitted or received by the wireless communication circuitry 120. Further, detail regarding the implementation of block 910 is provided below in connection with FIG. 10. In particular, as shown in FIG. 10, at block 1002, the example wireless communications mode controller 434 determines whether the timer (initiated at block 908 of FIG. 9) has surpassed a timeout period. If so, control advances to block 1004 where the example wireless communications mode controller 434 set the wireless communication circuitry to an idle mode. Thereafter, the process of FIG. 10 ends and returns to complete the process of FIG. 9. However, if the timer has not surpassed the timeout period, control advances to block 1006, control advances to block 1006. At block 1006, the example wireless communications detector 436 determines whether there is data traffic transmitted or received via the wireless communication circuitry 120. If not, the process of FIG. 10 ends without changing the sub-mode for the wireless communication circuitry 122 and returns to complete the process of FIG. 9. If there has been data traffic transmitted or received, control advances to block 1008 where the example wireless communications mode controller 434 resets the timer. Thereafter, the process of FIG. 10 ends without changing the sub-mode for the wireless communication circuitry 122 and returns to complete the process of FIG. 9. After returning to FIG. 9, control (following block 910) advances to block 946.

Returning to block 902 of FIG. 9, if the user 104 is not actively engaged, control advances to block 912. In some examples, control advances to block 912 only after a threshold period of time (e.g., 6 seconds, 10, seconds, 40 seconds, etc.) has elapsed since the user 104 stopped interacting with the computing device 102. This delay threshold serves to prevent the constant switching between operation modes when, for example, a user momentarily pauses from active interactions with the computing device 102. At block 912, the example imaging mode controller 440 determines whether the imaging system is in the off mode. In some examples, this determination is based on the imaging system being set to the off mode at block 804 of FIG. 8. If the imaging system is in the off mode, control returns to block 902. Otherwise, control advances to block 914 where the imaging mode controller 440 determines whether the imaging system is in the standard mode. In some examples, this determination is based on the imaging system being set to the standard mode at block 808 of FIG. 8. If the imaging system is in the standard mode, control advances to block 916 where the low power operations controller 130 enables image data from the image sensor 122 to pass through to a host processor. Thereafter, control returns to block 902.

Returning to block 914, if the imaging system is not in the standard mode, control advances to block 918 where the example user presence detector 418 accesses the image data 410 from the image sensor 122 (e.g., captured at block 826 of FIG. 4). At block 920, the example imaging mode controller 440 determines whether the imaging system is in the streaming mode or the wake-on-motion mode. In some examples, this determination is based on the imaging system being set to either of the modes at blocks 816 or 824 of FIG. 8. If the imaging system is in the wake-on-motion mode, control advances to block 922 where the example motion detector 414 analyzes the image data 410 for motion. At block 924, the example motion detector 414 determines whether any motion was detected. If not, control returns to block 902. Otherwise, control advances to block 926. Returning to block 20, if the imaging system is in the streaming mode control advances directly to block 926.

At block 926, the example user presence detector 418 applies machine learning model(s) (e.g., the face detection model(s) 420 generated by the training manager 132) to detect the presence of a user based on the image data 410. At block 928, the example user presence detector 418 determines if the presence of a user is detected. If so, control advances to block 930 where the example gaze detector 422 applies machine learning model(s) (e.g., the face detection model(s) 420 generated by the training manager 132) to detect a gaze direction 132 of the user based on the image data 410. At block 932, the example gaze detector 422 determines whether the user is looking toward the display screen 118. The determination at block 932 is premised on the previous determination (at block 902) that the user is not engaged. Thus, the determination at block 932 is a determination of whether the user is passively engaged (e.g., looking at the display screen 118) or not engaged (e.g., looking somewhere else). If the user is looking toward the display screen 118 (e.g., the user is passively engaged), control advances to block 934 where the example CPU activity detector 424 determines whether CPU activity satisfies (e.g., exceeds) a threshold. If so, control advances to block 904 to proceed with setting the computing device to the interactive mode (at block 906). If the CPU activity does not satisfy the threshold, control advances to block 938 where the example operation mode controller 430 sets the computing device 102 (including the wireless communication circuitry 120) to a balanced mode and sets performance parameters accordingly.

Returning to block 928, if the example user presence detector 418 determines that no user is detected in the image data 410 (e.g., no user is present), control advances to block 936. Similarly, if the example gaze detector 422 determines (at block 932) that the user is not looking toward the display screen 118, control advances to block 936. In some examples, control advances to block 936 from block 928 and/or block 932 only after a threshold period of time (e.g., 6 seconds, 10, seconds, 40 seconds, etc.) has elapsed since the presence of the user was last detected (at block 928) or the user was last looking at the display screen 118 (determined at block 932). Such delay thresholds serve to prevent the constant switching between operation modes when, for example, the user leaves the imaging FoV 124 momentarily and/or looks away from the display screen 118 momentarily but then returns to engagement with the computing device 102.

At block 936, the example application usage detector 426 determines whether a user-initiated task is running. The determination at block 932 is premised on the previous determination (at block 902) that the user is not engaged. Thus, the determination at block 932 is a determination of whether the user is absent but passively engaged (e.g., a user-initiated task is running) or absent and not engaged (e.g., absent with no user-initiated task running). If there is a user-initiated task is running, control advances to block 938 where the example operation mode controller 430 sets the computing device 102 (including the wireless communication circuitry 120) to a balanced mode and sets performance parameters accordingly. In some examples, the balanced mode selected based on a determination that the user is passively engaged (block 932) and the balanced mode selected based on the determination that a user-initiated task is running (block 936) are the same operation mode (e.g., the same performance parameter settings). In other examples, variations in the balanced mode may be implemented based on whether the user is passively engaged by being present and looking at the display screen 118 without actively interacting with the computing device 102 or passively engaged by being absent but with an ongoing user-initiated task running. Once the performance parameters associated with the balanced mode are set (block 938), control advances to block 946.

Returning to block 936, if the example application usage detector 426 determines that no user-initiated task is running, control advances to block 940 where the example application usage detector 426 determines whether there is a background task to execute. If so, control advances to block 942 where the example operation mode controller 430 sets the computing device 102 (including the wireless communication circuitry 120) to a quiet mode and sets performance parameters accordingly. Thereafter, control advances to block 946. If the example application usage detector 426 determines (at block 940) that there are no background task to execute control advances to block 942 where the example operation mode controller 430 sets the computing device 102 (including the wireless communication circuitry 120) to a standby mode and sets performance parameters accordingly. Thereafter, control advances to block 946. At block 946, the low power operations controller 130 determines whether to continue. If so, control returns to block 902. Otherwise, the example process of FIG. 9 ends.

Figure 11:
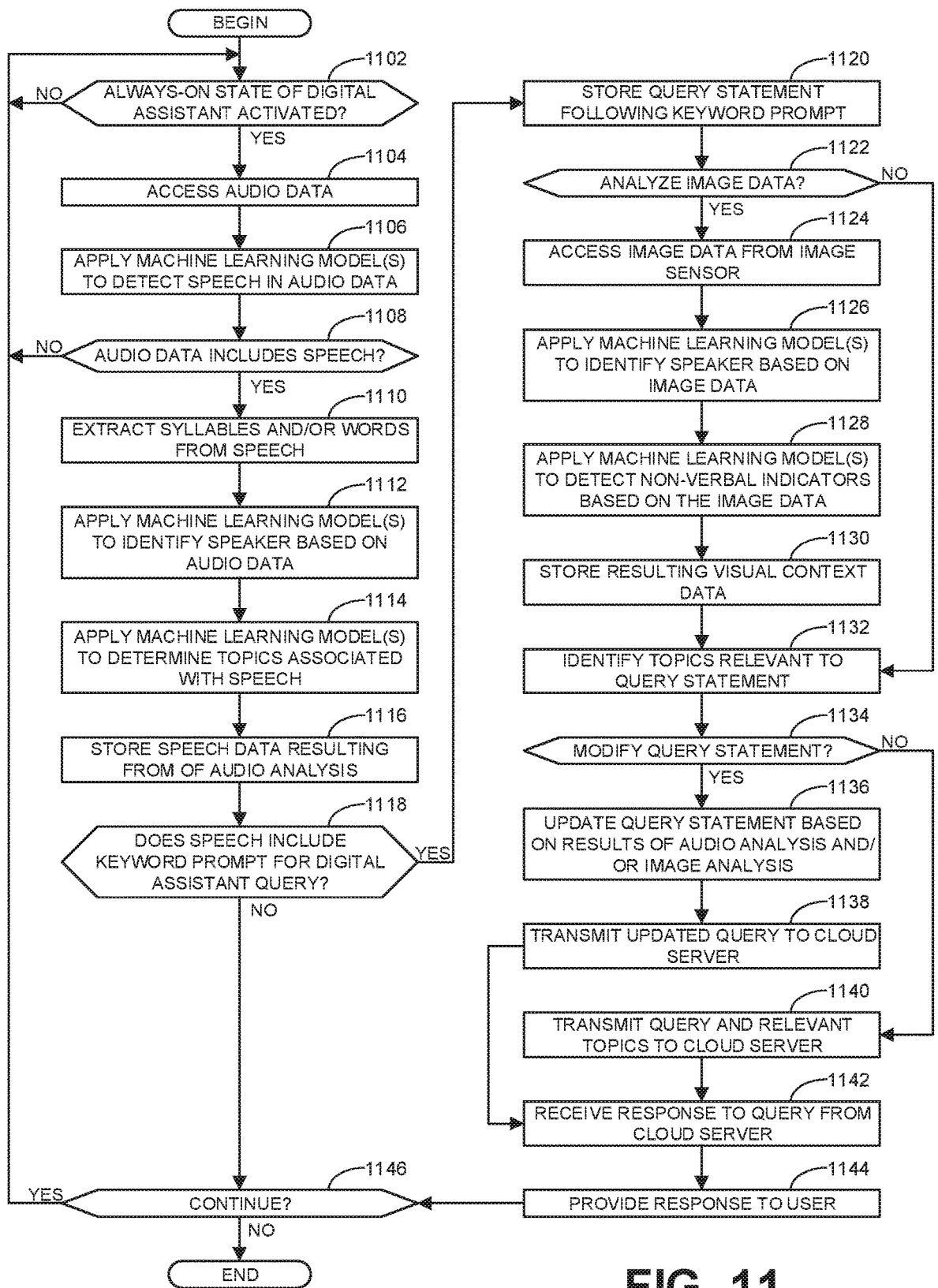

FIG. 11 is a flowchart representative of example machine readable instructions that, when executed by a processor, implement the example low power operations controller 130 of FIGS. 1 and/or 4. In the example of FIG. 11, the low power operations controller 130 generates instruction(s) to cause an associated computing device (e.g., the computing device 102 of FIG. 1) to collect contextual speech data for a most recent period of time to be used by a digital assistant once a keyword prompt has been detected followed by a particular user query. The example instructions of FIG. 11 can be executed by one or more processors of, for instance, the computing device 102, another user device, and/or a cloud-based device. As mentioned above, in some examples, at least some of the instructions of FIG. 11 are executed by a processor operating in a low power mode, such as the audio-based context engine 516 of the audio-visual analyzer IC package 504 of FIG. 5, to reduce power consumption in processing and analyzing the audio data. The example instructions of FIG. 11 can be executed in substantially real-time as the microphone 146 generates audio data and/or as a user interacts with the computing device 102.

The example program of FIG. 11 begins at block 1102 where the example user interaction detector 424 determines (based on a user input) whether an always-on state of a digital assistant is activated. In some examples, the ability to toggle the always-on state of a digital assistant (e.g., to always collect audio data) is provided to a user so that the user can whether or not conversations are to be monitored out of an interest in privacy. If the always-on state is not activated, control remains at block 1102. Once the always-on state has been activated, control advances to block 1104 where the example speech analyzer accesses audio data generated by the microphone 146. At block 1106, the example speech analyzer 442 applies machine learning model(s) (e.g., the speech analysis model(s) 446 generated by the training manager 132) to detect speech in the audio data. At block 1108, the example speech analyzer 442 determines whether the audio data includes speech. If not, control returns to block 902. If speech is detected in the audio data, control advances to block 1110 where the example speech analyzer 442 extracts syllables and/or words from the speech. At block 1112, the example speech analyzer 442 applies machine learning model(s) (e.g., the speech analysis model(s) 446 generated by the training manager 132) to identify a speaker based on the audio data. At block 1114, the example speech analyzer 442 applies machine learning model(s) (e.g., the speech analysis model(s) 446 generated by the training manager 132) to determine topics associated with the speech. At block 1116, the example speech analyzer 442 stores (e.g., in the database 412) the speech data 444 resulting from the audio analysis.

At block 1118, the example speech analyzer 442 determines whether the speech includes a keyword prompt for a digital assistant query. If not, control advances to block 1146 where the low power operations controller 130 determines whether to continue the process. If so, control returns to block 1102. Otherwise, the example process of FIG. 11 ends. If the speech includes a keyword prompt, control advances to block 1120 where the example speech analyzer 442 stores (e.g., in the database 412) the query statement following the keyword prompt. Thereafter, at block 1122, the example speech analyzer 442 determines whether to analyze image data. In some examples, this determination is made based on natural language processing of the query statement. If image data is to be analyzed, control advances to block 1124 where the example speech context image analyzer 448 accesses the image data 410 from the image sensor 122. At block 1126, the example speech context image analyzer 448 applies machine learning model(s) (e.g., the speech context detection model(s) 450 generated by the training manager 132) to identify a speaker based on the image data 410. At block 1128, the example speech context image analyzer 448 applies machine learning model(s) (e.g., the speech context detection model(s) 450 generated by the training manager 132) to detect non-verbal indicators based on the image data 410. At block 1130, the example speech context image analyzer 448 stores (in the database 412) the resulting visual context data 452. Thereafter, control advances to block 1132. Returning to block 1122, if image data is not to be analyzed, control advances directly to block 1132

At block 1132, the example query generator 454 identifies topics (determined at block 1114) that are relevant to the query statement. In some examples, all topics retained in memory (associated with the most recent period of time) are included with the query statement. At block 1134, the example query generator 452 determines whether to modify the query statement. If so, control advances to block 1136 where the example query generator 454 updates the original query statement based on the speech data 444 and/or the visual context data 452. At block 1138, the example communications interface 456 transmits the updated query to a cloud server. Thereafter, control advances to block 1142. Returning to block 1134, if the query statement is not to be modified, control advances to block 1140 where the example communications interface 456 transmits the original query and the relevant topics to the cloud server. Thereafter, control advances to block 1142

At block 1142, the example communications interface 456 receives a response to the query from the cloud server 1142. At block 1144, the low power operations controller 130 provides the response to the user. Thereafter, control advances to block 1146 where the low power operations controller 130 determines whether to continue the process. If so, control returns to block 1102. Otherwise, the example process of FIG. 11 ends.

Figure 12:
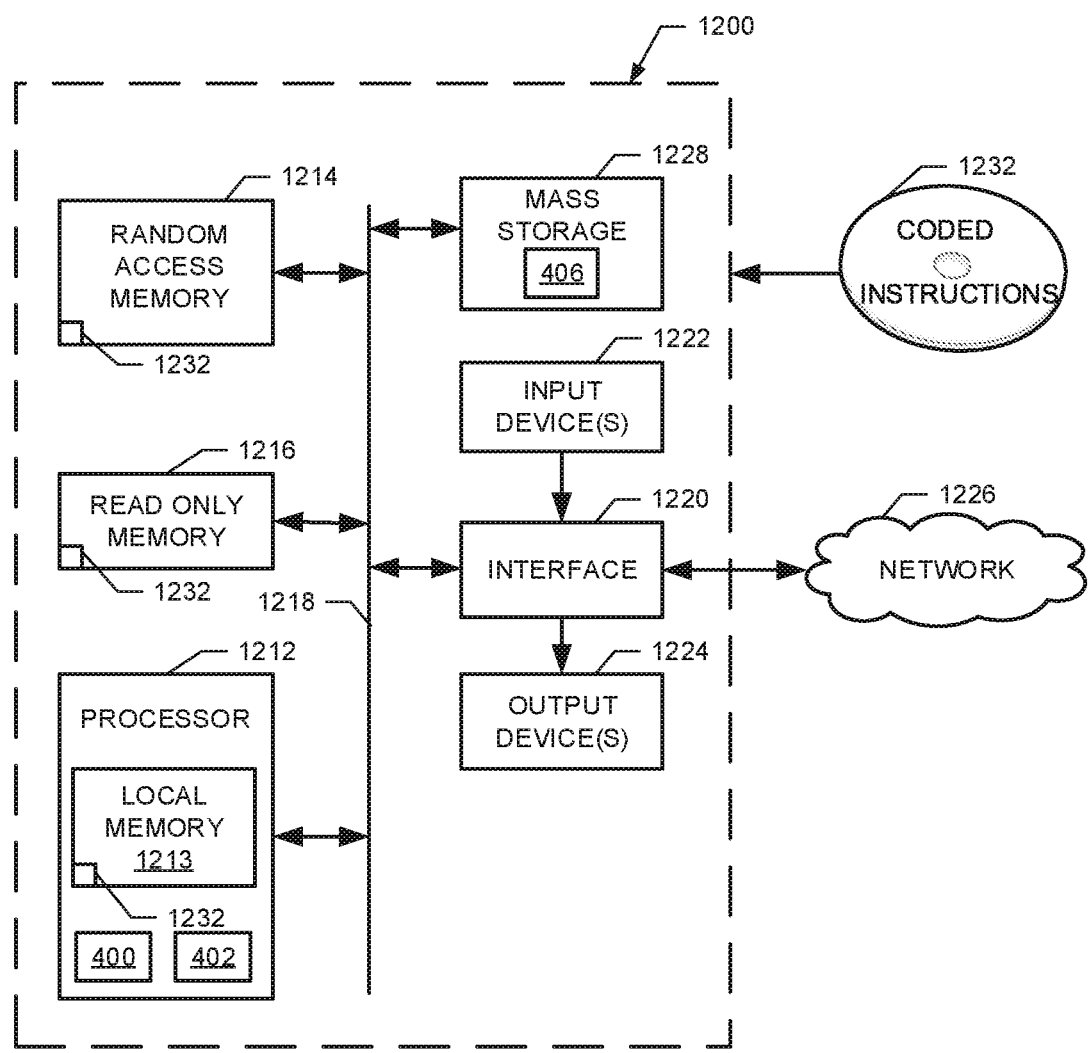
FIG. 12 is a block diagram of an example processing platform structured to execute the instructions of FIGS. 6 and 7 to implement the example training manager of FIGS. 1 and/or 4.

FIG. 12 is a block diagram of an example processor platform 1200 structured to execute the instructions of FIGS. 6 and 7 to implement the example training manager 132 of FIGS. 1 and/or 4. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example trainer 400 and the example machine learning engine 402.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory

1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1242 of FIGS. 6 and 7 may be stored in the mass storage device 1228, in the volatile memory 1214, in the non-volatile memory 1216, and/or on a removable non-transitory computer readable storage medium such as a CD or DVD.

Figure 13:
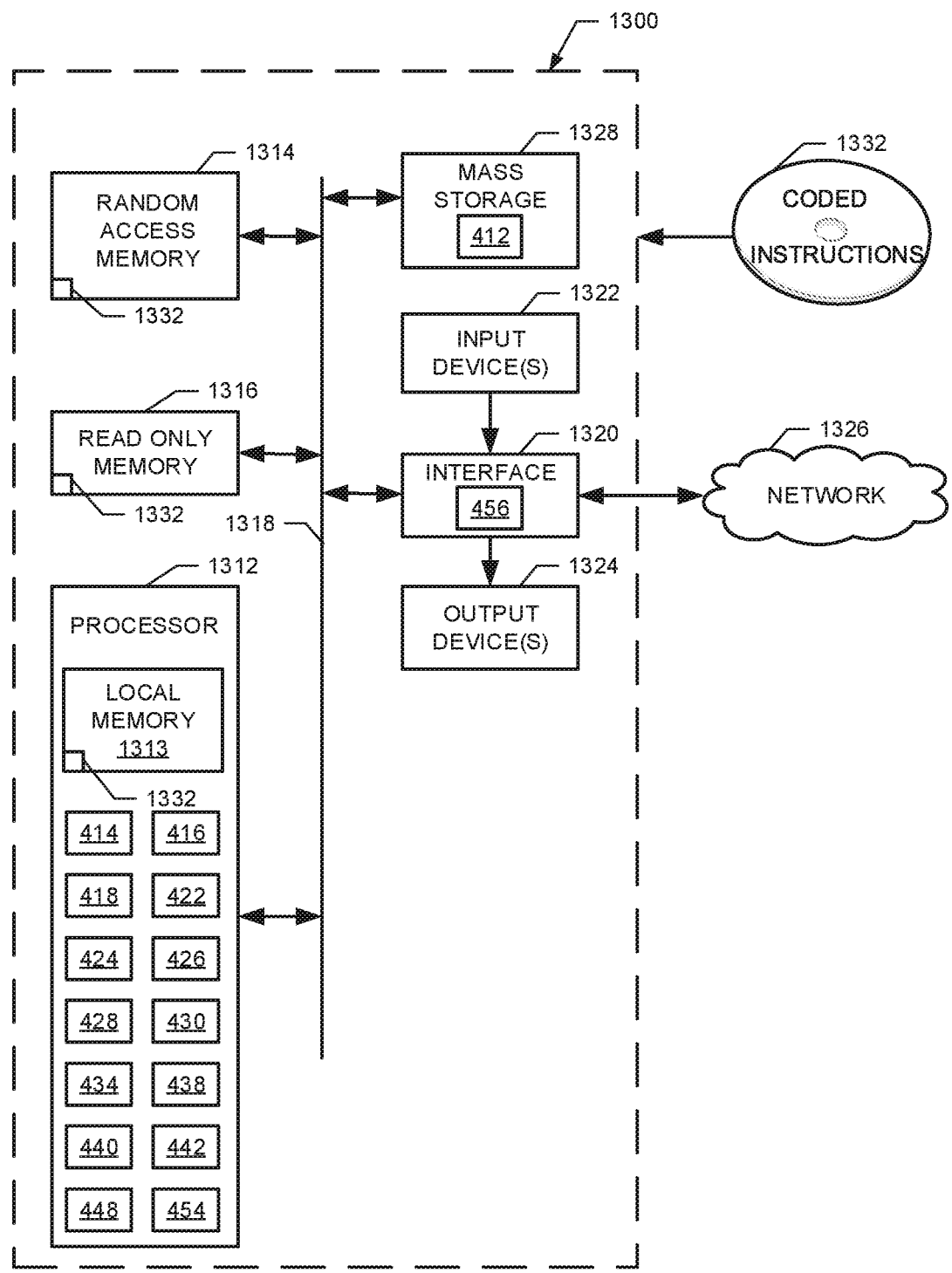
FIG. 13 is a block diagram of an example processing platform structured to execute the instructions of FIGS. 8-11 to implement the example low power operations controller of FIGS. 1 and/or 4.

FIG. 13 is a block diagram of an example processor platform 1300 structured to execute the instructions of FIGS. _____ to implement the example low power operations controller 130 of FIGS. 8-11. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example motion detector 414, the example AE parameter generator 416, the example user presence detector 418, the example gaze detector 422, the example user interaction detector 424, the example application usage detector 426, the example CPU activity detector 428, the example operation mode controller 430, the example wireless communications mode controller 434, the example wireless communications detector 438, the example imaging mode controller 440, the example speech analyzer 442, the example speech content image analyzer 448, and the example query generator 454.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1342 of FIGS. 8-11 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that improve user experience with a computing device while also reducing power consumption by adjusting the operation of the computing device to prioritize performance efficiency over power efficiency when a user is present and/or engaged with the operation of the computing device and to prioritize power efficiency over performance efficiency when the user is not present and/or not engaged. In some examples, determining the presence and engagement of the user is based on an analysis of image data captured by an always-on image sensor. Examples disclosed herein reduce the power consumption of such an image sensor by adjusting the operation of the image sensor between different low power modes based on the presence and/or engagement of the user. Examples disclosed herein improve user experience with a computing device by enabling a context aware digital assistant that can determine meaning in a user query spoken following the detection of a keyword prompt based on an analysis of audio data of spoken dialogue captured before the detection of the keyword prompt. Methods, apparatus and articles of manufacture disclosed herein are accordingly directed to one or more improvement(s) in the functioning of a computer.

Example 1 includes a computing device comprising an image sensor, wireless communication circuitry, and an operations controller to cause the wireless communication circuitry to switch between different operation modes based on an analysis of image data generated by the image sensor, different ones of the operation modes to consume different amounts of power Example 2 includes the computing device of example 1, wherein the operations controller is to detect a presence of a user of the computing device based on the analysis of the image data, and cause the wireless communication circuitry to switch between the different operation modes based on the presence of the user.

Example 3 includes the computing device of example 2, wherein the operations controller is to detect an engagement of the user relative to the computing device, and cause the wireless communication circuitry to switch between the different operation modes based on the engagement of the user.

Example 4 includes the computing device of example 3, wherein the operations controller is to cause the wireless communication circuitry to switch between the different operation modes depending on whether the user is actively engaged with the computing device or passively engaged with the computing device.

Example 5 includes the computing device of example 4, wherein the user is actively engaged when the user is interacting with the computing device via a human machine interface.

Example 6 includes the computing device of any one of examples 4 or 5, wherein the user is passively engaged when the computing device is within a field of view of the user and the user is not interacting with the computing device via a human machine interface.

Example 7 includes the computing device of example 6, wherein the operations controller is to determine a gaze direction of the user based on the analysis of the image data, the field of view of the user determined based on the gaze direction.

Example 8 includes the computing device of any one of examples 4-7, wherein the user is passively engaged when the user not interacting with the computing device via a human machine interface and the computing device is executing a user-initiated task.

Example 9 includes the computing device of any one of examples 3-8, wherein the operations controller is to cause the computing device to switch between a first operation mode and a second operation mode based on at least one of the presence or engagement of the user, the first operation mode associated with a first performance level for components of the computing device and a first power level for the components, the second operation mode associated with a second performance level for the components and a second power level for the components, the first performance level being higher than the second performance level, the first power level being higher than the second power level, the wireless communication circuitry to switch between the different operation modes when the computing device switches between the first operation mode and the second operation mode, a responsiveness of the wireless communication circuitry when the computing device is in the first operation mode to be different than when the computing device is in the second operation mode.

Example 10 includes the computing device of example 9, wherein the operations controller is to cause the computing device to switch to the first operation mode in response to input data indicative of ongoing interactions of the user with the computing device via a human machine interface.

Example 11 includes the computing device of any one of examples 9 or 10, wherein the operations controller is to cause the computing device to switch to the first operation mode in response to detection of (1) the presence of the user and (2) an activity of a central processing unit of the computing device exceeding a threshold.

Example 12 includes the computing device of any one of examples 9-11, wherein the operations controller is to cause the computing device to switch to the second operation mode in response to detection of (1) the presence of the user and (2) an activity of a central processing unit of the computing device being less than a threshold.

Example 13 includes the computing device of any one of examples 9-12, wherein the different operation modes of the wireless communication circuitry include an active mode and an idle mode, and the operations controller is to cause the wireless communication circuitry to switch between the active mode and the idle mode while the computing device is in the first operation mode, the wireless communication circuitry to switch between the active mode and the idle mode based on an activity of data traffic at least one of transmitted by or received by the wireless communication circuitry, the active mode consuming more power than the idle mode.

Example 14 includes the computing device of example 13, wherein the operations controller is to cause the wireless communication circuitry to switch to the idle mode in response to elapse of a timeout period during which no data traffic is transmitted or received by the wireless communication circuitry.

Example 15 includes the computing device of any one of examples 9-14, wherein the operations controller is to cause the computing device to switch between either one of (a) the first or second operation modes and (b) a third operation mode based on at least one of the presence or engagement of the user, the third operation mode associated with a third performance level for the components and a third power level for the components, the second performance level being higher than the third performance level, the second power level being higher than the third power level, the responsiveness of the wireless communication circuitry when the computing device is in the third operation mode to operate with less power than when the computing device is in the first operation mode and different than when the computing device is in the second operation mode.

Example 16 includes the computing device of example 15, wherein at least one of transmission or receipt of data traffic associated with a background task of the computing device in the third operation mode is less limited than when the computing device is in the first operation mode and when the computing device is in the second operation mode.

Example 17 includes the computing device of any one of examples 15 or 16, wherein the operations controller is to cause the computing device to switch to the second operation mode in response to detection of ongoing execution of a user-initiated task on the computing device when the user is not present.

Example 18 includes the computing device of example 17, wherein the operations controller is to cause the computing device to switch to the third operation mode when the user is not present and there is no ongoing execution of a user-initiated task on the computing device.

Example 19 includes the computing device of any one of examples 1-18, wherein the image sensor has a plurality of different power modes, and the operations controller is to cause the image sensor to switch between ones of the different power modes based on the analysis of the image data.

Example 20 includes the computing device of any one of examples 1-19, further including a microphone to capture audio corresponding to spoken words, the operations controller to detect a keyword prompt from among the spoken words, the keyword prompt to precede a query statement of a user of the computing device, identify topics associated with a subset of the spoken words, the subset of the spoken words captured by the microphone before the keyword prompt, and in response to detection of the keyword prompt, transmit information indicative of the query statement and ones of the identified topics to a remote server.

Example 21 includes a non-transitory computer readable medium comprising instructions that, when executed, cause a computing device to at least analyze an output of an image sensor, and switch wireless communication circuitry of the computing device between different operation modes based on an analysis of the output, different ones of the operation modes to consume different amounts of power.

Example 22 includes the non-transitory computer readable medium of example 21, wherein the instructions cause the computing device to detect a presence of a user of the computing device based on the analysis of the output, and switch the wireless communication circuitry between the different operation modes based on the presence of the user.

Example 23 includes the non-transitory computer readable medium of example 22, wherein the instructions cause the computing device to detect an engagement of the user relative to the computing device, and switch the wireless communication circuitry between the different operation modes based on the engagement of the user.

Example 24 includes the non-transitory computer readable medium of example 23, wherein the instructions cause the computing device to switch the wireless communication circuitry between the different operation modes depending on whether the user is actively engaged with the computing device or passively engaged with the computing device.

Example 25 includes the non-transitory computer readable medium of example 24, wherein the user is actively engaged when the user is interacting with the computing device via a human machine interface.

Example 26 includes the non-transitory computer readable medium of any one of examples 24 or 25, wherein the user is passively engaged when the computing device is within a field of view of the user and the user is not interacting with the computing device via a human machine interface.

Example 27 includes the non-transitory computer readable medium of example 26, wherein the instructions cause the computing device to determine a gaze direction of the user based on the analysis of the output, the field of view of the user determined based on the gaze direction.

Example 28 includes the non-transitory computer readable medium of any one of examples 24-27, wherein the user is passively engaged when the user not interacting with the computing device via a human machine interface and the computing device is executing a user-initiated task.

Example 29 includes the non-transitory computer readable medium of any one of examples 23-28, wherein the instructions cause the computing device to switch between a first operation mode and a second operation mode based on at least one of the presence or engagement of the user, the first operation mode associated with a first performance level for components of the computing device and a first power level for the components, the second operation mode associated with a second performance level for the components and a second power level for the components, the first performance level being higher than the second performance level, the first power level being higher than the second power level, the wireless communication circuitry to switch between the different operation modes when the computing device switches between the first operation mode and the second operation mode, a responsiveness of the wireless communication circuitry when the computing device is in the first operation mode to be different than when the computing device is in the second operation mode.

Example 30 includes the non-transitory computer readable medium of example 29, wherein the instructions cause the computing device to switch to the first operation mode in response to input data indicative of ongoing interactions of the user with the computing device via a human machine interface.

Example 31 includes the non-transitory computer readable medium of any one of examples 29 or 30, wherein the instructions cause the computing device to switch to the first operation mode in response to detection of (1) the presence of the user and (2) an activity of a central processing unit of the computing device exceeding a threshold.

Example 32 includes the non-transitory computer readable medium of any one of examples 29-31, wherein the instructions cause the computing device to switch to the second operation mode in response to detection of (1) the presence of the user and (2) an activity of a central processing unit of the computing device being less than a threshold.

Example 33 includes the non-transitory computer readable medium of any one of examples 29-32, wherein the different operation modes of the wireless communication circuitry include an active mode and an idle mode, and the instructions cause the computing device to cause the wireless communication circuitry to switch between the active mode and the idle mode while the computing device is in the first operation mode, the wireless communication circuitry to switch between the active mode and the idle mode based on an activity of data traffic at least one of transmitted by or received by the wireless communication circuitry, the active mode consuming more power than the idle mode.

Example 34 includes the non-transitory computer readable medium of example 33, wherein the instructions cause the computing device to cause the wireless communication circuitry to switch to the idle mode in response to elapse of a timeout period during which no data traffic is transmitted or received by the wireless communication circuitry.

Example 35 includes the non-transitory computer readable medium of any one of examples 29-34, wherein the instructions cause the computing device to switch between either one of (a) the first or second operation modes and (b) a third operation mode based on at least one of the presence or engagement of the user, the third operation mode associated with a third performance level for the components and a third power level for the components, the second performance level being higher than the third performance level, the second power level being higher than the third power level, the responsiveness of the wireless communication circuitry when the computing device is in the third operation mode to operate with less power than when the computing device is in the first operation mode and different than when the computing device is in the second operation mode.

Example 36 includes the non-transitory computer readable medium of example 35, wherein the instructions cause the computing device to limit at least one of transmission or receipt of data traffic associated with a background task of the computing device in the third operation mode relative to when the computing device is in the first operation mode and when the computing device is in the second operation mode.

Example 37 includes the non-transitory computer readable medium of any one of examples 35 or 36, wherein the instructions cause the computing device to switch to the second operation mode in response to detection of ongoing execution of a user-initiated task on the computing device when the user is not present.

Example 38 includes the non-transitory computer readable medium of example 37, wherein the instructions cause the computing device to switch to the third operation mode when the user is not present and there is no ongoing execution of a user-initiated task on the computing device.

Example 39 includes a method comprising capturing an image with an image sensor of a computing device, and causing, by executing an instruction with at least one processor, wireless communication circuitry of the computing device to switch between different operation modes based on an analysis of the image, different ones of the operation modes to consume different amounts of power.

Example 40 includes the method of example 39, further including detecting a presence of a user of the computing device based on the analysis of the image, and causing the wireless communication circuitry to switch between the different operation modes based on the presence of the user.

Example 41 includes the method of example 40, further including detecting an engagement of the user relative to the computing device, and causing the wireless communication circuitry to switch between the different operation modes based on the engagement of the user.

Example 42 includes the method of example 41, further including causing the wireless communication circuitry to switch between the different operation modes depending on whether the user is actively engaged with the computing device or passively engaged with the computing device.

Example 43 includes the method of example 42, wherein the user is actively engaged when the user is interacting with the computing device via a human machine interface.

Example 44 includes the method of any one of examples 42 or 43, wherein the user is passively engaged when the computing device is within a field of view of the user and the user is not interacting with the computing device via a human machine interface.

Example 45 includes the method of example 44, further including determining a gaze direction of the user based on the analysis of the image, the field of view of the user determined based on the gaze direction.

Example 46 includes the method of any one of examples 42-45, wherein the user is passively engaged when the user not interacting with the computing device via a human machine interface and the computing device is executing a user-initiated task.

Example 47 includes the method of any one of examples 41-46, further including switching the computing device between a first operation mode and a second operation mode based on at least one of the presence or engagement of the user, the first operation mode associated with a first performance level for components of the computing device and a first power level for the components, the second operation mode associated with a second performance level for the components and a second power level for the components, the first performance level being higher than the second performance level, the first power level being higher than the second power level, the wireless communication circuitry to switch between the different operation modes when the computing device switches between the first operation mode and the second operation mode, a responsiveness of the wireless communication circuitry when the computing device is in the first operation mode to be different than when the computing device is in the second operation mode.

Example 48 includes the method of example 47, further including switching the computing device to the first operation mode in response to input data indicative of ongoing interactions of the user with the computing device via a human machine interface.

Example 49 includes the method of any one of examples 47 or 48, further including switching the computing device to the first operation mode in response to detection of (1) the presence of the user and (2) an activity of a central processing unit of the computing device exceeding a threshold.

Example 50 includes the method of any one of examples 47-49, further including switching the computing device to the second operation mode in response to detection of (1) the presence of the user and (2) an activity of a central processing unit of the computing device being less than a threshold.

Example 51 includes the method of any one of examples 47-50, wherein the different operation modes of the wireless communication circuitry include an active mode and an idle mode, the method further including switching the wireless communication circuitry between the active mode and the idle mode while the computing device is in the first operation mode, the wireless communication circuitry to switch between the active mode and the idle mode based on an activity of data traffic at least one of transmitted by or received by the wireless communication circuitry, the active mode consuming more power than the idle mode.

Example 52 includes the method of example 51, further including switching the wireless communication circuitry to the idle mode in response to elapse of a timeout period during which no data traffic is transmitted or received by the wireless communication circuitry.

Example 53 includes the method of any one of examples 47-52, further including switching the computing device between either one of (a) the first or second operation modes and (b) a third operation mode based on at least one of the presence or engagement of the user, the third operation mode associated with a third performance level for the components and a third power level for the components, the second performance level being higher than the third performance level, the second power level being higher than the third power level, the responsiveness of the wireless communication circuitry when the computing device is in the third operation mode to operate with less power than when the computing device is in the first operation mode and different than when the computing device is in the second operation mode.

Example 54 includes the method of example 53, further including limiting at least one of transmission or receipt of data traffic associated with a background task of the computing device in the third operation mode relative to when the computing device is in the first operation mode and when the computing device is in the second operation mode.

Example 55 includes the method of any one of examples 53 or 54, further including switching the computing device to the second operation mode in response to detection of ongoing execution of a user-initiated task on the computing device when the user is not present.

Example 56 includes the method of example 55, further including switching the computing device to the third operation mode when the user is not present and there is no ongoing execution of a user-initiated task on the computing device.

Example 57 includes a computing device comprising means for capturing images, means for wirelessly communicating, and means for controlling operation modes to cause the wireless communicating means to switch between different operation modes based on an analysis of the images generated by the images capturing means, different ones of the operation modes to consume different amounts of power.

Example 58 includes the computing device of example 57, further including means for detecting a presence of a user of the computing device based on the analysis of the images, the operation modes controlling means to cause the wireless communicating means to switch between the different operation modes based on the presence of the user.

Example 59 includes the computing device of example 58, further including means for detecting an engagement of the user relative to the computing device, the operation modes controlling means to cause the wireless communicating means to switch between the different operation modes based on the engagement of the user.

Example 60 includes the computing device of example 59, wherein the operation modes controlling means is to cause the wireless communicating means to switch between the different operation modes depending on whether the user is actively engaged with the computing device or passively engaged with the computing device.

Example 61 includes the computing device of example 60, wherein the user is actively engaged when the user is interacting with the computing device via a human machine interface.

Example 62 includes the computing device of any one of examples 60 or 61, wherein the user is passively engaged when the computing device is within a field of view of the user and the user is not interacting with the computing device via a human machine interface.

Example 63 includes the computing device of example 62, further including means for determining a gaze direction of the user based on the analysis of the images, the field of view of the user determined based on the gaze direction.

Example 64 includes the computing device of any one of examples 60-63, wherein the user is passively engaged when the user not interacting with the computing device via a human machine interface and the computing device is executing a user-initiated task.

Example 65 includes the computing device of any one of examples 59-64, wherein the operation modes controlling means is a first operation modes controlling means, the computing device further including second means for controlling operation modes to cause the computing device to switch between a first operation mode and a second operation mode based on at least one of the presence or engagement of the user, the first operation mode associated with a first performance level for components of the computing device and a first power level for the components, the second operation mode associated with a second performance level for the components and a second power level for the components, the first performance level being higher than the second performance level, the first power level being higher than the second power level, the wireless communicating means to switch between the different operation modes when the computing device switches between the first operation mode and the second operation mode, a responsiveness of the wireless communicating means when the computing device is in the first operation mode to be different than when the computing device is in the second operation mode.

Example 66 includes the computing device of example 65, wherein the second operation modes controlling means is to cause the computing device to switch to the first operation mode in response to input data indicative of ongoing interactions of the user with the computing device via a human machine interface.

Example 67 includes the computing device of any one of examples 65 or 66, wherein the second operation modes controlling means is to cause the computing device to switch to the first operation mode in response to detection of (1) the presence of the user and (2) an activity of a central processing unit of the computing device exceeding a threshold.

Example 68 includes the computing device of any one of examples 65-67, wherein the second operation modes controlling means is to cause the computing device to switch to the second operation mode in response to detection of (1) the presence of the user and (2) an activity of a central processing unit of the computing device being less than a threshold.

Example 69 includes the computing device of any one of examples 65-68, wherein the different operation modes of the wireless communicating means include an active mode and an idle mode, and the first operation modes controlling means is to cause the wireless communicating means to switch between the active mode and the idle mode while the computing device is in the first operation mode, the wireless communicating means to switch between the active mode and the idle mode based on an activity of data traffic at least one of transmitted by or received by the wireless communicating means, the active mode consuming more power than the idle mode.

Example 70 includes the computing device of example 69, wherein the first operation modes controlling means is to cause the wireless communicating means to switch to the idle mode in response to elapse of a timeout period during which no data traffic is transmitted or received by the wireless communicating means.

Example 71 includes the computing device of any one of examples 65-70, wherein the second operation modes controlling means is to cause the computing device to switch between either one of (a) the first or second operation modes and (b) a third operation mode based on at least one of the presence or engagement of the user, the third operation mode associated with a third performance level for the components and a third power level for the components, the second performance level being higher than the third performance level, the second power level being higher than the third power level, the responsiveness of the wireless communicating means when the computing device is in the third operation mode to operate with less power than when the computing device is in the first operation mode and different than when the computing device is in the second operation mode.

Example 72 includes the computing device of example 71, wherein at least one of transmission or receipt of data traffic associated with a background task of the computing device in the third operation mode is less limited than when the computing device is in the first operation mode and when the computing device is in the second operation mode.

Example 73 includes the computing device of any one of examples 71 or 72, wherein the second operation modes controlling means is to cause the computing device to switch to the second operation mode in response to detection of ongoing execution of a user-initiated task on the computing device when the user is not present.

Example 74 includes the computing device of example 73, wherein the second operation modes controlling means is to cause the computing device to switch to the third operation mode when the user is not present and there is no ongoing execution of a user-initiated task on the computing device.

Example 75 includes a computing device comprising at least one memory, and at least one processor to execute instructions to analyze an output of an image sensor, and cause wireless communication circuitry of the computing device to switch between different operation modes based on an analysis of the output, different ones of the operation modes to consume different amounts of power.

Example 76 includes the computing device of example 75, wherein the at least one processor is to detect a presence of a user of the computing device based on the analysis of the output, and cause the wireless communication circuitry to switch between the different operation modes based on the presence of the user.

Example 77 includes the computing device of example 76, wherein the at least one processor is to detect an engagement of the user relative to the computing device, and cause the wireless communication circuitry to switch between the different operation modes based on the engagement of the user.

Example 78 includes the computing device of example 77, wherein the at least one processor is to cause the wireless communication circuitry to switch between the different operation modes depending on whether the user is actively engaged with the computing device or passively engaged with the computing device.

Example 79 includes the computing device of example 78, wherein the user is actively engaged when the user is interacting with the computing device via a human machine interface.

Example 80 includes the computing device of any one of examples 78 or 79, wherein the user is passively engaged when the computing device is within a field of view of the user and the user is not interacting with the computing device via a human machine interface.

Example 81 includes the computing device of example 80, wherein the at least one processor is to determine a gaze direction of the user based on the analysis of the output, the field of view of the user determined based on the gaze direction.

Example 82 includes the computing device of any one of examples 78-81, wherein the user is passively engaged when the user not interacting with the computing device via a human machine interface and the computing device is executing a user-initiated task.

Example 83 includes the computing device of any one of examples 77-82, wherein the at least one processor is to cause the computing device to switch between a first operation mode and a second operation mode based on at least one of the presence or engagement of the user, the first operation mode associated with a first performance level for components of the computing device and a first power level for the components, the second operation mode associated with a second performance level for the components and a second power level for the components, the first performance level being higher than the second performance level, the first power level being higher than the second power level, the wireless communication circuitry to switch between the different operation modes when the computing device switches between the first operation mode and the second operation mode, a responsiveness of the wireless communication circuitry when the computing device is in the first operation mode to be different than when the computing device is in the second operation mode.

Example 84 includes the computing device of example 83, wherein the at least one processor is to cause the computing device to switch to the first operation mode in response to input data indicative of ongoing interactions of the user with the computing device via a human machine interface.

Example 85 includes the computing device of any one of examples 83 or 84, wherein the at least one processor is to cause the computing device to switch to the first operation mode in response to detection of (1) the presence of the user and (2) an activity of a central processing unit of the computing device exceeding a threshold.

Example 86 includes the computing device of any one of examples 83-85, wherein the at least one processor is to cause the computing device to switch to the second operation mode in response to detection of (1) the presence of the user and (2) an activity of a central processing unit of the computing device being less than a threshold.

Example 87 includes the computing device of any one of examples 83-86, wherein the different operation modes of the wireless communication circuitry include an active mode and an idle mode, and the at least one processor to cause the computing device to cause the wireless communication circuitry to switch between the active mode and the idle mode while the computing device is in the first operation mode, the wireless communication circuitry to switch between the active mode and the idle mode based on an activity of data traffic at least one of transmitted by or received by the wireless communication circuitry, the active mode consuming more power than the idle mode.

Example 88 includes the computing device of example 87, wherein the at least one processor is to cause the computing device to cause the wireless communication circuitry to switch to the idle mode in response to elapse of a timeout period during which no data traffic is transmitted or received by the wireless communication circuitry.

Example 89 includes the computing device of any one of examples 83-88, wherein the at least one processor is to cause the computing device to switch between either one of (a) the first or second operation modes and (b) a third operation mode based on at least one of the presence or engagement of the user, the third operation mode associated with a third performance level for the components and a third power level for the components, the second performance level being higher than the third performance level, the second power level being higher than the third power level, the responsiveness of the wireless communication circuitry when the computing device is in the third operation mode to operate with less power than when the computing device is in the first operation mode and different than when the computing device is in the second operation mode.

Example 90 includes the computing device of example 89, wherein the at least one processor is to cause the computing device to limit at least one of transmission or receipt of data traffic associated with a background task of the computing device in the third operation mode relative to when the computing device is in the first operation mode and when the computing device is in the second operation mode.

Example 91 includes the computing device of any one of examples 89 or 90, wherein the at least one processor is to cause the computing device to switch to the second operation mode in response to detection of ongoing execution of a user-initiated task on the computing device when the user is not present.

Example 92 includes the computing device of example 91, wherein the at least one processor is to cause the computing device to switch to the third operation mode when the user is not present and there is no ongoing execution of a user-initiated task on the computing device.

Example 93 includes a computing device comprising an image sensor, the image sensor having a plurality of different power modes, and an image mode controller to cause the image sensor to switch between ones of the different power modes based on an analysis of images captured by the image sensor.

Example 94 includes the computing device of example 93, wherein the image sensor is to capture the images at a frame rate of at least 1 frame per second while the computing device is powered on.

Example 95 includes the computing device of example 94, wherein the analysis of the images is performed in substantially real-time.

Example 96 includes the computing device of any one of examples 93-95, wherein the plurality of different power modes includes a standard mode and at least two low power modes, the image sensor to capture images when in the standard mode with a higher frame rate than when in the at least two low power modes, the image sensor to capture images when in the standard mode with a higher resolution than when in the at least two low power modes, the image sensor to consume more power in the standard mode than the at least two low power modes.

Example 97 includes the computing device of any one of examples 93-96, wherein the plurality of different power modes includes a wake-on-motion mode and a streaming mode, the computing device further including a motion detector to detect motion in the images when the image sensor is in the wake-on-motion mode, the image mode controller to cause the image sensor to switch to the streaming mode in response to detection of motion by the motion detector.

Example 98 includes the computing device of example 97, wherein the image sensor consumes more power in the streaming mode than in the wake-on-motion mode.

Example 99 includes the computing device of any one of examples 97 or 98, further including at least one of a user presence detector or a gaze detector to analyze the images when the image sensor is in the streaming mode, the at least one of the user presence detector or the gaze detector to consume more power when the image sensor is in the streaming mode than the motion detector consumes when the image sensor is in the wake-on-motion mode.

Example 100 includes the computing device of any one of examples 97-99, wherein the image sensor, when in the streaming mode, captures the images at less than 5 frames per second and at a resolution less than a full resolution of the image sensor.

Example 101 includes the computing device of any one of examples 97-100, further including a user presence detector to detect a presence of a user of the computing device when the image sensor is in the streaming mode, operation of the user presence detector to be suppressed when the image sensor is in the wake-on motion mode.

Example 102 includes the computing device of example 101, further including a gaze detector to detect a direction of gaze of the user in response to the detection of the presence of the user, the direction of gaze indicative of an engagement of the user with the computing device.

Example 103 includes the computing device of example 102, further including an operations controller to adjust performance parameters of the computing device based on at least one of the presence or the engagement of the user, the performance parameters unrelated to operation of the image sensor.

Example 104 includes the computing device of any one of examples 101-103, wherein the plurality of different power modes includes a pause mode, the computing device further including a user interaction detector to detect an interaction of the user with the computing device via a human machine interface, the image mode controller to cause the image sensor to switch to the pause mode in response to detection of the interaction of the user with the computing device.

Example 105 includes the computing device of example 104, wherein the image is to sensor consume more power in the streaming mode than in the wake-on-motion mode, and the image sensor is to consume more power in the wake-on-motion mode than in the pause mode.

Example 106 includes the computing device of any one of examples 104 or 105, wherein the image sensor is to stop capturing the images when in the pause mode.

Example 107 includes the computing device of any one of examples 104-106, wherein the image mode controller is to cause operation of both the motion detector and the user presence detector to be suppressed when the image sensor is in the pause mode.

Example 108 includes the computing device of any one of examples 101-107, further including an auto-exposure parameter generator to determine auto-exposure parameters associated with the images when the image sensor is in the wake-on-motion mode, and provide the auto-exposure parameters to the user presence detector in response to the image sensor switching from the wake-on-motion mode to the streaming mode.

Example 109 includes the computing device of any one of examples 93-108, further including wireless communication circuitry, and an operation mode controller to cause the wireless communication circuitry to switch between different operation modes based on the analysis of images, different ones of the operation modes to consume different amounts of power.

Example 110 includes the computing device of any one of examples 93-109, further including a microphone to capture audio corresponding to spoken words, and a speech analyzer to detect a keyword prompt from among the spoken words, the keyword prompt to precede a query statement of a user of the computing device, and identify topics associated with a subset of the spoken words, the subset of the spoken words captured by the microphone before the keyword prompt, and a communications interface to, in response to detection of the keyword prompt, transmit information indicative of the query statement and ones of the identified topics to a remote server.

Example 111 includes a non-transitory computer readable medium comprising instructions that, when executed, cause a computing device to at least capture images with an image sensor of the computing device, the image sensor having a plurality of different power modes, and switch the image sensor between the different power modes based on an analysis of the image data associated with the images captured by the image sensor.

Example 112 includes the non-transitory computer readable medium of example 111, wherein the instructions cause the computing device to perform the analysis of the image data in substantially real-time.

Example 113 includes the non-transitory computer readable medium of any one of examples 111 or 112, wherein the plurality of different power modes includes a standard mode and at least two low power modes, the image sensor to capture images when in the standard mode with a higher frame rate than when in the at least two low power modes, the image sensor to capture images when in the standard mode with a higher resolution than when in the at least two low power modes, the image sensor to consume more power in the standard mode than the at least two low power modes.

Example 114 includes the non-transitory computer readable medium of any one of examples 111-113, wherein the plurality of different power modes includes a wake-on-motion mode and a streaming mode, the instructions to cause the computing device to detect motion in the image data when the image sensor is in the wake-on-motion mode based on the analysis, and switch the image sensor to the streaming mode in response to detection of motion.

Example 115 includes the non-transitory computer readable medium of example 114, wherein the image sensor consumes more power in the streaming mode than in the wake-on-motion mode.

Example 116 includes the non-transitory computer readable medium of any one of examples 114 or 115, wherein the analysis of the image data consumes more power when the image sensor is in the streaming mode than in the wake-on-motion mode.

Example 117 includes the non-transitory computer readable medium of any one of examples 114-116, wherein the instructions cause the computing device to capture, when the image sensor is in the streaming mode, the images at less than 5 frames per second and at a resolution less than a full resolution of the image sensor.

Example 118 includes the non-transitory computer readable medium of any one of examples 114-117, wherein the instructions cause the computing device to detect a presence of a user of the computing device based on the analysis when the image sensor is in the streaming mode, and suppress detection of the presence of the user when the image sensor is in the wake-on motion mode.

Example 119 includes the non-transitory computer readable medium of example 118, wherein the instructions cause the computing device to detect a direction of gaze of the user in response to the detection of the presence of the user, the direction of gaze indicative of an engagement of the user with the computing device.

Example 120 includes the non-transitory computer readable medium of example 119, wherein the instructions cause the computing device to adjust performance parameters of the computing device based on at least one of the presence or the engagement of the user, the performance parameters unrelated to operation of the image sensor.

Example 121 includes the non-transitory computer readable medium of any one of examples 118-120, wherein the plurality of different power modes includes a pause mode, the instructions to cause the computing device to detect an interaction of the user with the computing device via a human machine interface, and switch the image sensor to the pause mode in response to detection of the interaction of the user with the computing device.

Example 122 includes the non-transitory computer readable medium of example 121, wherein the instructions cause the computing device to stop the image sensor from capturing the images when in the pause mode.

Example 123 includes the non-transitory computer readable medium of any one of examples 121 or 122, wherein the instructions cause the computing device to suppress both the detection of motion and the detection of the presence of the user when the image sensor is in the pause mode.

Example 124 includes the non-transitory computer readable medium of any one of examples 118-123, wherein the instructions cause the computing device to determine auto-exposure parameters associated with the image data when the image sensor is in the wake-on-motion mode, and use the auto-exposure parameters to detect the presence of the user when the image sensor switches from the wake-on-motion mode to the streaming mode.

Example 125 includes a method comprising capturing images with an image sensor of a computing device, the image sensor having a plurality of different power modes, and switching the image sensor between ones of the different power modes based on an analysis of the images captured by the image sensor.

Example 126 includes the method of example 125, further including performing the analysis of the images in substantially real-time.

Example 127 includes the method of any one of examples 125 or 126, wherein the plurality of different power modes includes a wake-on-motion mode and a streaming mode, the method further including detecting motion in the images when the image sensor is in the wake-on-motion mode based on the analysis, and switching the image sensor to the streaming mode in response to detection of motion.

Example 128 includes the method of example 127, wherein the capturing of the images in the streaming mode is performed at less than 5 frames per second and the images is captured at a resolution less than a full resolution of the image sensor.

Example 129 includes the method of any one of examples 127 or 128, further including detecting a presence of a user of the computing device based on the analysis when the image sensor is in the streaming mode, and suppressing detection of the presence of the user when the image sensor is in the wake-on motion mode.

Example 130 includes the method of example 129, further including detecting a direction of gaze of the user in response to the detection of the presence of the user, the direction of gaze indicative of an engagement of the user with the computing device.

Example 131 includes the method of example 130, further including adjusting performance parameters of the computing device based on at least one of the presence or the engagement of the user, the performance parameters unrelated to operation of the image sensor.

Example 132 includes the method of any one of examples 129-131, wherein the plurality of different power modes includes a pause mode, the method further including detecting an interaction of the user with the computing device via a human machine interface, and switching the image sensor to the pause mode in response to detection of the interaction of the user with the computing device.

Example 133 includes the method of example 132, further including stopping the image sensor from capturing the images when in the pause mode.

Example 134 includes the method of any one of examples 132 or 133, further including suppressing both the detection of motion and the detection of the presence of the user when the image sensor is in the pause mode.

Example 135 includes the method of any one of examples 129-134, further including determining auto-exposure parameters associated with the images when the image sensor is in the wake-on-motion mode, and using the auto-exposure parameters to detect the presence of the user when the image sensor switches from the wake-on-motion mode to the streaming mode.

Example 136 includes a computing device comprising means for capturing images, the images capturing means having a plurality of different power modes, and means for controlling operation modes to cause the images capturing means to switch between ones of the different power modes based on an analysis of images captured by the images capturing means.

Example 137 includes the computing device of example 136, wherein the images capturing means is to capture the images at a frame rate of at least 1 frame per second while the computing device is powered on.

Example 138 includes the computing device of example 137, wherein the analysis of the images is performed in substantially real-time.

Example 139 includes the computing device of any one of examples 136-138, wherein the plurality of different power modes includes a standard mode and at least two low power modes, the images capturing means to capture images when in the standard mode with a higher frame rate than when in the at least two low power modes, the images capturing means to capture images when in the standard mode with a higher resolution than when in the at least two low power modes, the images capturing means to consume more power in the standard mode than the at least two low power modes.

Example 140 includes the computing device of any one of examples 136-139, wherein the plurality of different power modes includes a wake-on-motion mode and a streaming mode, the computing device further including means for detecting motion in the images when the images capturing means is in the wake-on-motion mode based on the analysis, the operation modes controlling means to cause the images capturing means to switch to the streaming mode in response to detection of motion.

Example 141 includes the computing device of example 140, wherein the images capturing means consumes more power in the streaming mode than in the wake-on-motion mode.

Example 142 includes the computing device of any one of examples 140 or 141, further including means for detecting a presence of a user of the computing device when the images capturing means is in the streaming mode, the presence detecting means to consume more power than the motion detecting means consumes when the images capturing means is in the wake-on-motion mode.

Example 143 includes the computing device of any one of examples 140-142, wherein the images capturing means, when in the streaming mode, captures the images at less than 5 frames per second and at a resolution less than a full resolution of the images capturing means.

Example 144 includes the computing device of any one of examples 140-143, further including means for detecting a presence of a user of the computing device when the images capturing means is in the streaming mode based on the analysis, the operation modes controlling means to suppress the presence detecting means when the images capturing means is in the wake-on motion mode.

Example 145 includes the computing device of example 144, further including means for detecting a direction of gaze of the user in response to the detection of the presence of the user, the direction of gaze indicative of an engagement of the user with the computing device.

Example 146 includes the computing device of example 145, wherein operation modes controlling means is a first operation modes controlling means, the computing device further including second means for controlling operation modes to adjust performance parameters of the computing device based on at least one of the presence or the engagement of the user, the performance parameters unrelated to operation of the images capturing means.

Example 147 includes the computing device of any one of examples 144-146, wherein the plurality of different power modes includes a pause mode, the computing device further including means for detecting an interaction of the user with the computing device via a human machine interface, the operation modes controlling means to cause the images capturing means to switch to the pause mode in response to detection of the interaction of the user with the computing device.

Example 148 includes the computing device of example 147, wherein the images capturing means is to consume more power in the streaming mode than in the wake-on-motion mode, and the images capturing means is to consume more power in the wake-on-motion mode than in the pause mode.

Example 149 includes the computing device of any one of examples 147 or 148, wherein the images capturing means is to stop capturing the images when in the pause mode.

Example 150 includes the computing device of any one of examples 147-149, wherein the operation modes controlling means is to suppress both to motion detecting means and the presence detecting means when the images capturing means is in the pause mode.

Example 151 includes the computing device of any one of examples 144-150, further including means for determining auto-exposure parameters associated with the images when the images capturing means is in the wake-on-motion mode. the presence detecting means to use the auto-exposure parameters to detect the presence of the user when the images capturing means switches from the wake-on-motion mode to the streaming mode.

Example 152 includes a computing device comprising at least one memory, and at least one processor to execute instructions to cause an image sensor of the computing device to capture images, the image sensor having a plurality of different power modes, and cause the image sensor to switch between the different power modes based on an analysis of the image data associated with the images captured by the image sensor.

Example 153 includes the computing device of example 152, wherein the image sensor is to capture the images at a frame rate of at least 1 frame per second while the computing device is powered on.

Example 154 includes the computing device of example 153, wherein the at least one processor is to perform the analysis of the image data in substantially real-time.

Example 155 includes the computing device of any one of examples 152-154, wherein the plurality of different power modes includes a standard mode and at least two low power modes, the at least one processor to cause the image sensor to capture images when in the standard mode with a higher frame rate than when in the at least two low power modes, the at least one processor to cause the image sensor to capture images when in the standard mode with a higher resolution than when in the at least two low power modes, the image sensor to consume more power in the standard mode than the at least two low power modes.

Example 156 includes the computing device of any one of examples 152-155, wherein the plurality of different power modes includes a wake-on-motion mode and a streaming mode, the at least one processor is to detect motion in the image data when the image sensor is in the wake-on-motion mode based on the analysis, and cause the image sensor to switch to the streaming mode in response to detection of motion.

Example 157 includes the computing device of example 156, wherein the image sensor consumes more power in the streaming mode than in the wake-on-motion mode.

Example 158 includes the computing device of any one of examples 156 or 157, wherein the analysis of the image data consumes more power when the image sensor is in the streaming mode than in the wake-on-motion mode.

Example 159 includes the computing device of any one of examples 156-158, wherein the at least one processor is to cause the image sensor when in the streaming mode to capture the images at less than 5 frames per second and at a resolution less than a full resolution of the image sensor.

Example 160 includes the computing device of any one of examples 156-159, wherein the at least one processor is to detect a presence of a user of the computing device based on the analysis when the image sensor is in the streaming mode, and suppress detection of the presence of the user when the image sensor is in the wake-on motion mode.

Example 161 includes the computing device of example 160, wherein the at least one processor is to detect a direction of gaze of the user in response to the detection of the presence of the user, the direction of gaze indicative of an engagement of the user with the computing device.

Example 162 includes the computing device of example 161, wherein the at least one processor is to adjust performance parameters of the computing device based on at least one of the presence or the engagement of the user, the performance parameters unrelated to operation of the image sensor.

Example 163 includes the computing device of any one of examples 160 or 162, wherein the plurality of different power modes includes a pause mode, and the at least one processor is to detect an interaction of the user with the computing device via a human machine interface, and cause the image sensor to switch to the pause mode in response to detection of the interaction of the user with the computing device.

Example 164 includes the computing device of example 163, wherein the image sensor consumes more power in the streaming mode than in the wake-on-motion mode, and the image sensor consumes more power in the wake-on-motion mode than in the pause mode.

Example 165 includes the computing device of any one of examples 163 or 164, wherein the at least one processor is to stop the image sensor from capturing the images when in the pause mode.

Example 166 includes the computing device of any one of examples 163-165, wherein the at least one processor is to suppress both the detection of motion and the detection of the presence of the user when the image sensor is in the pause mode.

Example 167 includes the computing device of any one of examples 160-166, wherein the at least one processor is to determine auto-exposure parameters associated with the image data when the image sensor is in the wake-on-motion mode, and use the auto-exposure parameters to detect the presence of the user when the image sensor switches from the wake-on-motion mode to the streaming mode.

Example 168 includes a computing device comprising a microphone to capture audio corresponding to spoken words, a speech analyzer to detect a keyword prompt from among the spoken words, the keyword prompt to precede a query statement of a user of the computing device, and identify topics associated with a subset of the spoken words, the subset of the spoken words captured by the microphone before the keyword prompt, and a communications interface to, in response to detection of the keyword prompt, transmit information indicative of the query statement and ones of the identified topics to a remote server.

Example 169 includes the computing device of example 168, wherein the speech analyzer is to extract syllables from the audio, the syllables corresponding to the spoken words.

Example 170 includes the computing device of example 169, further including a database to store a subset of the syllables corresponding to the subset of the spoken words, the subset of the spoken words corresponding to a portion of the audio captured during a most recent period of time.

Example 171 includes the computing device of example 170, wherein the subset of the syllables is a first subset of the syllables and the portion of the audio is a first portion of the audio, the first subset of the syllables to replace a second subset of the syllables in the database, the second subset of the syllables corresponding to a second portion of the audio captured at a different period of time prior to the most recent period of time.

Example 172 includes the computing device of any one of examples 168-171, wherein the speech analyzer is to identify the topics before detection of the keyword prompt.

Example 173 includes the computing device of any one of examples 168-172, wherein the speech analyzer is to identify the topics in response to detection of the keyword prompt.

Example 174 includes the computing device of any one of examples 168-173, wherein the information includes the query statement and the ones of the identified topics.

Example 175 includes the computing device of any one of examples 168-174, further including a query generator to generate a modified query based on the query statement and the ones of the identified topics, the information including the modified query.

Example 176 includes the computing device of any one of examples 168-175, further including an image sensor to capture an image of the user, and an image analyzer to determine a visual context associated with the query statement based on the image.

Example 177 includes the computing device of any one of examples 168-176, further including an image sensor, wireless communication circuitry, and an operation mode controller to cause the wireless communication circuitry to switch between different operation modes based on an analysis of images captured by the image sensor, different ones of the operation modes to consume different amounts of power.

Example 178 includes the computing device of any one of examples 168-177, further including an image sensor, the image sensor having a plurality of different power modes, and an image mode controller to cause the image sensor to switch between ones of the different power modes based on an analysis of image data generated by the image sensor.

Example 179 includes a non-transitory computer readable medium comprising instructions that, when executed, cause a computing device to at least capture audio corresponding to spoken words with a microphone, detect a keyword prompt from among spoken words, the keyword prompt to precede a query statement of a user of the computing device, identify topics associated with a subset of the spoken words, the subset of the spoken words captured by the microphone before the keyword prompt, and in response to detection of the keyword prompt, transmit information indicative of the query statement and ones of the identified topics to a remote server.

Example 180 includes the non-transitory computer readable medium of example 179, wherein the instructions cause the computing device to extract syllables from the audio, the syllables corresponding to the spoken words.

Example 181 includes the non-transitory computer readable medium of example 180, wherein the instructions cause the computing device to store, in a database, a subset of the syllables corresponding to the subset of the spoken words, the subset of the spoken words corresponding to a portion of the audio captured during a most recent period of time.

Example 182 includes the non-transitory computer readable medium of example 181, wherein the subset of the syllables is a first subset of the syllables and the portion of the audio is a first portion of the audio, the first subset of the syllables to replace a second subset of the syllables in the database, the second subset of the syllables corresponding to a second portion of the audio captured at a different period of time prior to the most recent period of time.

Example 183 includes the non-transitory computer readable medium of any one of examples 179-182, wherein the instructions cause the computing device to identify the topics before detection of the keyword prompt.

Example 184 includes the non-transitory computer readable medium of any one of examples 179-183, wherein the instructions cause the computing device to identify the topics in response to detection of the keyword prompt.

Example 185 includes the non-transitory computer readable medium of any one of examples 179-184, wherein the information includes the query statement and the ones of the identified topics.

Example 186 includes the non-transitory computer readable medium of any one of examples 179-185, wherein the instructions cause the computing device to generate a modified query based on the query statement and the ones of the identified topics, the information including the modified query.

Example 187 includes the non-transitory computer readable medium of any one of examples 179-186, wherein the instructions cause the computing device capture, with an image sensor, an image of the user, and determine a visual context associated with the query statement based on the image.

Example 188 includes a method comprising detecting a keyword prompt from among spoken words captured by a microphone of a computing device, the keyword prompt to precede a query statement of a user of the computing device, identifying, by executing an instruction with at least one processor, topics associated with a subset of the spoken words, the subset of the spoken words captured by the microphone before the keyword prompt, and in response to detection of the keyword prompt, transmitting information indicative of the query statement and ones of the identified topics to a remote server.

Example 189 includes the method of example 188, further including extracting syllables from the audio, the syllables corresponding to the spoken words.

Example 190 includes the method of example 189, further including storing, in a database, a subset of the syllables corresponding to the subset of the spoken words, the subset of the spoken words corresponding to a portion of the audio captured during a most recent period of time.

Example 191 includes the method of example 190, wherein the subset of the syllables is a first subset of the syllables and the portion of the audio is a first portion of the audio, the first subset of the syllables to replace a second subset of the syllables in the database, the second subset of the syllables corresponding to a second portion of the audio captured at a different period of time prior to the most recent period of time.

Example 192 includes the method of any one of examples 188-191, further including identifying the topics before detection of the keyword prompt.

Example 193 includes the method of any one of examples 188-192, further including identifying the topics in response to detection of the keyword prompt.

Example 194 includes the method of any one of examples 188-193, wherein the information includes the query statement and the ones of the identified topics.

Example 195 includes the method of any one of examples 188-194, further including generating a modified query based on the query statement and the ones of the identified topics, the information including the modified query.

Example 196 includes the method of any one of examples 188-195, further including capturing, with an image sensor, an image of the user, and determining a visual context associated with the query statement based on the image.

Example 197 includes a computing device comprising means for capturing audio corresponding to spoken words, means for processing speech data to detect a keyword prompt from among spoken words captured by audio capturing means, the keyword prompt to precede a query statement of a user of the computing device, and identify topics associated with a subset of the spoken words, the subset of the spoken words captured by the audio capturing means before the keyword prompt, and means for transmitting information indicative of the query statement and ones of the identified topics to a remote server in response to detection of the keyword prompt.

Example 198 includes the computing device of example 197, wherein the speech data processing means is to extract syllables from the audio, the syllables corresponding to the spoken words.

Example 199 includes the computing device of example 198, further including means for storing a subset of the syllables corresponding to the subset of the spoken words, the subset of the spoken words corresponding to a portion of the audio captured during a most recent period of time.

Example 200 includes the computing device of example 199, wherein the subset of the syllables is a first subset of the syllables and the portion of the audio is a first portion of the audio, the first subset of the syllables to replace a second subset of the syllables in the storing means, the second subset of the syllables corresponding to a second portion of the audio captured at a different period of time prior to the most recent period of time.

Example 201 includes the computing device of any one of examples 197-200, wherein the speech data processing means is to identify the topics before detection of the keyword prompt.

Example 202 includes the computing device of any one of examples 197-201, wherein the speech data processing means is to identify the topics in response to detection of the keyword prompt.

Example 203 includes the computing device of any one of examples 197-202, wherein the information includes the query statement and the ones of the identified topics.

Example 204 includes the computing device of any one of examples 197-203, wherein the speech data processing means is to generate a modified query based on the query statement and the ones of the identified topics, the information including the modified query.

Example 205 includes the computing device of any one of examples 197-204, further including means for capturing an image of the user, and means for analyzing the image to determine a visual context associated with the query statement.

Example 206 includes a computing device comprising at least one memory, and at least one processor to execute instructions to detect a keyword prompt from among spoken words captured by a microphone, the keyword prompt to precede a query statement of a user of the computing device, identify topics associated with a subset of the spoken words, the subset of the spoken words captured by the microphone before the keyword prompt, and in response to detection of the keyword prompt, transmit information indicative of the query statement and ones of the identified topics to a remote server.

Example 207 includes the computing device of example 206, wherein the at least one processor is to extract syllables from the audio, the syllables corresponding to the spoken words.

Example 208 includes the computing device of example 207, wherein the at least one processor is to store, in a database, a subset of the syllables corresponding to the subset of the spoken words, the subset of the spoken words corresponding to a portion of the audio captured during a most recent period of time.

Example 209 includes the computing device of example 208, wherein the subset of the syllables is a first subset of the syllables and the portion of the audio is a first portion of the audio, the first subset of the syllables to replace a second subset of the syllables in the database, the second subset of the syllables corresponding to a second portion of the audio captured at a different period of time prior to the most recent period of time.

Example 210 includes the computing device of any one of examples 206-209, wherein the at least one processor is to identify the topics before detection of the keyword prompt.

Example 211 includes the computing device of any one of examples 206-210, wherein the at least one processor is to identify the topics in response to detection of the keyword prompt.

Example 212 includes the computing device of any one of examples 206-211, wherein the information includes the query statement and the ones of the identified topics.

Example 213 includes the computing device of any one of examples 206-212, wherein the at least one processor is to generate a modified query based on the query statement and the ones of the identified topics, the information including the modified query.

Example 214 includes the computing device of any one of examples 206-213, wherein the at least one processor is to cause an image sensor to capture an image of the user, and determine a visual context associated with the query statement based on the image.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing device comprising:
an image sensor;
wireless communication circuitry; and
an operations controller to:
detect a presence or an absence of a user of the computing device based on an analysis of image data generated by the image sensor; and
detect an engagement of the user relative to the computing device; and
a wireless communications mode controller to cause the wireless communication circuitry to switch between different ones of at least three operation modes based on the presence or the absence of the user and based on the engagement of the user, the at least three operation modes of the wireless communication circuitry including a first operation mode, a second operation mode, and a third operation mode, the first operation mode to consume a different amount of power than consumed by the second operation mode and a different amount of power than consumed by the third operation mode, the second operation mode to consume a different amount of power than consumed by the third operation mode, each of the first, second, and third operation modes to consume more power than consumed by an off mode of the wireless communication circuitry.

2. The computing device of claim 1, wherein the engagement of the user includes one of the user being actively engaged with the computing device, the user being passively engaged with the computing device, and the user not engaged with the computing device.

3. The computing device of claim 2, wherein the operations controller is to cause the wireless communication circuitry to switch between a first one of the at least three operation modes and a second one of the at least three operation modes when the engagement of the user switches between being actively engaged and passively engaged.

4. The computing device of claim 2, wherein the first and second operation modes are sub-modes for the wireless communication circuitry within an interactive mode of the computing device, the operations controller is to cause the computing device to switch between the interactive mode and a different mode of the computing device based on at least one of the presence, the absence, or the engagement of the user, the interactive mode associated with a first performance level for components of the computing device and a first power level for the components, the different mode associated with a second performance level for the components and a second power level for the components, the first performance level higher than the second performance level, the first power level higher than the second power level, the wireless communication circuitry to switch to the third operation mode when the computing device switches to the different mode, a responsiveness of the wireless communication circuitry when in the third operation mode to be different than when the wireless communication circuitry is in the first operation mode and different than when the wireless communication circuitry is in the second operation mode.

5. The computing device of claim 4, wherein the operations controller is to cause the computing device to switch to the interactive mode in response to detection of (1) the presence of the user and (2) an activity of a central processing unit of the computing device exceeding a threshold.

6. The computing device of claim 4, wherein the operations controller is to cause the computing device to switch to the different mode in response to detection of (1) the presence of the user and (2) an activity of a central processing unit of the computing device being less than a threshold.

7. The computing device of claim 4, wherein the operations controller is to cause the computing device to switch between either one of (a) the interactive mode or the different mode and (b) another mode based on at least one of the presence, the absence, or the engagement of the user, the other mode associated with a third performance level for the components and a third power level for the components, the second performance level higher than the third performance level, the second power level higher than the third power level, the wireless communication circuitry to operate with less power when the computing device is in the other mode than when the computing device is in the interactive mode and with a different amount of power than when the computing device is in the different mode.

8. The computing device of claim 7, wherein at least one of transmission or receipt of data traffic associated with a background task of the computing device in the other mode is less limited than when the computing device is in the interactive mode and when the computing device is in the different mode.

9. The computing device of claim 7, wherein the operations controller is to cause the computing device to switch to the different mode in response to detection of ongoing execution of a user-initiated task on the computing device when the user is not present.

10. The computing device of claim 9, wherein the operations controller is to cause the computing device to switch to the other mode when the user is not present and there is no ongoing execution of a user-initiated task on the computing device.

11. The computing device of claim 1, wherein the image sensor has a plurality of different power modes, and the operations controller is to cause the image sensor to switch between ones of the different power modes based on the analysis of the image data.

12. The computing device of claim 1, further including a microphone to capture audio corresponding to spoken words, the operations controller to:

detect a keyword prompt from among the spoken words, the keyword prompt to precede a query statement of a user of the computing device;
identify topics associated with a subset of the spoken words, the subset of the spoken words captured by the microphone before the keyword prompt; and
in response to detection of the keyword prompt, transmit information indicative of the query statement and ones of the identified topics to a remote server.

13. A non-transitory computer readable medium comprising instructions to cause a computing device to at least:
detect a presence or an absence of a user of the computing device based on an analysis of an output of an image sensor;
detect an engagement of the user relative to the computing device; and
switch wireless communication circuitry of the computing device between different ones of at least three operation modes based on the presence or the absence of the user and based on the engagement of the user, the at least three operation modes of the wireless communication circuitry including a first operation mode, a second operation mode, and a third operation mode, the first operation mode to consume a different amount of power than consumed by the second operation mode and a different amount of power than consumed by the third operation mode, the second operation mode to consume a different amount of power than consumed by the third operation mode, each of the first, second, and third operation modes to consume more power than consumed by an off mode of the wireless communication circuitry.

14. The non-transitory computer readable medium of claim 13, wherein the engagement of the user includes one of the user being actively engaged with the computing device, the user being passively engaged with the computing device, and the user not engaged with the computing device.

15. The non-transitory computer readable medium of claim 14, wherein the instructions cause the computing device to switch the wireless communication circuitry between a first one of the at least three operation modes and a second one of the at least three operation modes when the engagement of the user switches between being actively engaged and passively engaged.

16. The non-transitory computer readable medium of claim 14, wherein the first and second operation modes are sub-modes for the wireless communication circuitry within an interactive mode of the computing device, the instructions to cause the computing device to switch between the interactive mode and a different mode of the computing device based on at least one of the presence, the absence, or the engagement of the user, the interactive mode associated with a first performance level for components of the computing device and a first power level for the components, the different mode associated with a second performance level for the components and a second power level for the components, the first performance level higher than the second performance level, the first power level higher than the second power level, the wireless communication circuitry to switch to the third operation mode when the computing device switches to the different mode, a responsiveness of the wireless communication circuitry when in the third operation mode to be different than when the wireless communication circuitry is in the first operation mode and different than when the wireless communication circuitry is in the second operation mode.

17. A method comprising:
capturing an image with an image sensor of a computing device;
detecting a presence or an absence of a user of the computing device based on an analysis of the image;
determining an engagement of the user relative to the computing device; and
causing, by executing an instruction with at least one processor, wireless communication circuitry of the computing device to switch between different ones of at least three operation modes based on the presence or the absence of the user and based on the engagement of the user, the at least three operation modes of the wireless communication circuitry including a first operation mode, a second operation mode, and a third operation mode, the first operation mode to consume a different amount of power than consumed by the second operation mode and a different amount of power than consumed by the third operation mode, the second operation mode to consume a different amount of power than consumed by the third operation mode, each of the first, second, and third operation modes to consume more power than consumed by an off mode of the wireless communication circuitry.

18. The method of claim 17, wherein the engagement of the user includes one of the user being actively engaged with the computing device, the user being passively engaged with the computing device, and the user not engaged with the computing device.

19. The computing device of claim 2, wherein the user is actively engaged when the user is interacting with the computing device via a human machine interface.

20. The computing device of claim 2, wherein the user is passively engaged when the computing device is within a field of view of the user and the user is not interacting with the computing device via a human machine interface.

21. The computing device of claim 20, wherein the operations controller is to determine a gaze direction of the user based on the analysis of the image data, the field of view of the user determined based on the gaze direction.

22. The computing device of claim 2, wherein the user is passively engaged when the user is not interacting with the computing device via a human machine interface and the computing device is executing a user-initiated task.

23. An apparatus comprising:
an image sensor;
machine readable instructions; and
programmable circuitry to execute the machine readable instructions to:
detect a presence of a user of the apparatus based on analysis of image data generated by the image sensor;
detect an engagement of the user relative to the apparatus; and
cause wireless communication circuitry to switch from one of at least three operation modes to another of the three operation modes based on the presence of the user and based on the engagement of the user, the at least three operation modes of the wireless communication circuitry including a first operation mode, a second operation mode, and a third operation mode, the first operation mode to consume a different amount of power than consumed by the second operation mode and a different amount of power than consumed by the third operation mode, the second operation mode to consume a different amount of power than consumed by the third operation mode, each of the first, second, and third operation modes to consume more power than consumed by an off mode of the wireless communication circuitry.

24. The apparatus of claim 23, wherein the engagement of the user includes one of the user being actively engaged with the apparatus, the user being passively engaged with the apparatus, and the user not engaged with the apparatus.

25. The apparatus of claim 23, wherein the programmable circuitry is to cause the wireless communication circuitry to switch between a first one of the at least three operation modes and a second one of the at least three operation modes when the engagement of the user switches between actively engaged and passively engaged.

* * * * *